US007915332B2

(12) United States Patent
Chan et al.

(10) Patent No.: US 7,915,332 B2
(45) Date of Patent: Mar. 29, 2011

(54) COMPOSITIONS AND METHODS FOR POLYMER COMPOSITES

(75) Inventors: Kwok Pong Chan, Troy, NY (US); Joshua McClellan Croll, Evansville (IN); Balakrishnan Ganesan, Karnataka (IN); Marcus J. Harrigan, Frostburg, MD (US); Farid Fouad Khouri, Clifton Park, NY (US); Gurram Kishan, Banglaore (IN); Ritesh Mathur, Dwarka New Delhi (IN); Rachel Marie Suffield, Greenville, SC (US); Wenhul Wang, Auburndale, MA (US); James Mitchell White, Niskayuna, NY (US)

(73) Assignee: Sabic Innovative Plastics IP B.V. (NL)

( * ) Notice: Subject to any disclaimer, the term of this patent is extended or adjusted under 35 U.S.C. 154(b) by 740 days.

(21) Appl. No.: 11/766,227

(22) Filed: Jun. 21, 2007

(65) Prior Publication Data
US 2007/0299186 A1    Dec. 27, 2007

Related U.S. Application Data

(60) Provisional application No. 60/805,821, filed on Jun. 26, 2006, provisional application No. 60/945,150, filed on Jun. 20, 2007.

(51) Int. Cl.
C08K 3/34    (2006.01)
(52) U.S. Cl. ........ 524/445; 524/442; 524/447; 524/449; 524/450; 524/714; 524/706; 524/707; 524/709
(58) Field of Classification Search .................. 524/442, 524/445, 449
See application file for complete search history.

(56) References Cited

U.S. PATENT DOCUMENTS
4,910,288 A    3/1990 Dellacoletta
(Continued)

FOREIGN PATENT DOCUMENTS
EP    0 095 174 A2    11/1983
(Continued)

OTHER PUBLICATIONS
STIC structure search 11766227-SEARCH.pdf submitted May 20, 2010.*
(Continued)

Primary Examiner — Mark Eashoo
Assistant Examiner — Jane L Stanley
(74) Attorney, Agent, or Firm — Cantor Colburn LLP; Diderico van Eyl

(57) ABSTRACT

This invention relates to organic salt compositions useful in the preparation of organoclay compositions, polymer-organoclay composite compositions, and methods for the preparation of polymer nanocomposites. In one embodiment, the present invention provides an organoclay composition comprising alternating inorganic silicate layers and organic layers, said organic layers comprising a quaternary phosphonium cation having structure X

X

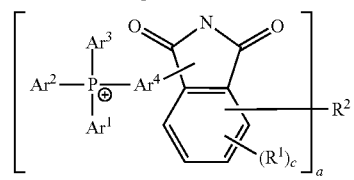

wherein $Ar^1$, $Ar^2$, and $Ar^3$ are independently $C_2$-$C_{50}$ aromatic radicals; $Ar^4$ is a bond or a $C_2$-$C_{50}$ aromatic radical; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a halogen atom, a $C_1$-$C_{20}$ aliphatic radical, a $C_5$-$C_{20}$ cycloaliphatic radical, a $C_2$-$C_{50}$ aromatic radical, or a polymer chain.

23 Claims, 1 Drawing Sheet

A resulting film of this invention having a nanosilicate loading of 7%, a machine direction CTE of 33.0 ppm/°C, and a Tg of 255°C

U.S. PATENT DOCUMENTS

| | | | | |
|---|---|---|---|---|
| 5,164,460 | A | * | 11/1992 | Yano et al. .................. 524/445 |
| 5,262,516 | A | | 11/1993 | Dellacoletta |
| 5,707,439 | A | * | 1/1998 | Takekoshi et al. ............ 106/483 |
| 5,807,629 | A | * | 9/1998 | Elspass et al. ................ 428/323 |
| 6,057,035 | A | * | 5/2000 | Singh et al. .................. 428/403 |
| 6,117,932 | A | * | 9/2000 | Hasegawa et al. ............ 524/445 |
| 6,232,388 | B1 | * | 5/2001 | Lan et al. ..................... 524/445 |
| 6,384,121 | B1 | * | 5/2002 | Barbee et al. ................. 524/445 |
| 6,410,142 | B1 | | 6/2002 | Chen et al. |
| 6,653,388 | B1 | * | 11/2003 | Barbee et al. ................. 524/445 |
| 2004/0127627 | A1 | * | 7/2004 | Gilmer et al. ................. 524/445 |
| 2007/0123682 | A1 | * | 5/2007 | Raj et al. ......................... 528/44 |
| 2007/0299187 | A1 | * | 12/2007 | Chan et al. .................... 524/445 |
| 2007/0299188 | A1 | * | 12/2007 | Chan et al. .................... 524/445 |
| 2007/0299189 | A1 | * | 12/2007 | Cao et al. ...................... 524/445 |
| 2008/0015330 | A1 | * | 1/2008 | Chan et al. .................... 528/168 |
| 2008/0021175 | A1 | * | 1/2008 | Chan et al. .................... 525/417 |
| 2009/0043024 | A1 | * | 2/2009 | Brunelle et al. .............. 524/262 |

FOREIGN PATENT DOCUMENTS

| | | |
|---|---|---|
| EP | 0 459 472 A1 | 12/1991 |
| EP | 0 495 472 A2 | 7/1992 |
| EP | 0 178 079 A1 | 4/1998 |
| EP | 1 350 815 A1 | 10/2003 |
| EP | 1 473 328 A1 | 11/2004 |
| JP | 2005298751 A * | 5/2005 |
| JP | 2005298751 A | 10/2005 |
| WO | 00 78540 A1 | 12/2000 |
| WO | 0078540 A2 | 12/2000 |

OTHER PUBLICATIONS

STIC structure search 11766227-342596-EICSEARCH.pdf submitted Sep. 13, 2010.*

International Searching Authority, International Search Report PCT/US2007/072069, Mailing Date: Jan. 8, 2008, 5 pages.

International Searching Authority, Written Opinion of the International Searching Authority PCT/US2007/072069, Mailing Date: Jan. 8, 2008, 8 pages.

Guillaumel, Jean et al, "Synthesis and biological activity of 6H-isoindolo[2,1-a]indol-6-ones, analogues of batracylin, and related compounds", European Journal of Medicinal Chemistry, Jan. 25, 2006, 8 pages.

Panek, G. et al, "Heterogeneity of the surfactant layer in organically modified silicates and polymer-layered silicate composites", Macromolecules, Feb. 28, 2006, 10 pages.

Sun, Xuehui et al, "Synthesis and properties of ionic, rigid-rod, and thermally stable polyimides containing bipyridinium triflates", Macromolecules, 1998, 6 pages.

Katritzky, Alan R. et al, "Polymers by the reaction of bis(pyrylium salts) with diamines: a novel approach to ionene polymers", Journal of Polymer Science, 1988, 14 pages.

Makowski, Michael P. et al, "Characterization of rigid rod poly(pyridinium salts) by conformational analysis, molecular dynamics, and steady-state and time resolved fluorescence", Polymer, 1993, 7 pages.

Laine, Philippe P. et al, "Conformationally Gated Photoinduced Processes within Photosensitizer-Acceptor Dyads Based on Osmium (II) Complexes with Triarylpyridinio-Functionalized Terpyridyl Ligands: Insights from Experimental Study", Journal of the American Chemical Society, May 18, 2006, 12 pages.

Tigelaar, Dean M. et al, "Synthesis and characterization of poly(pyridinium triflate)s with alkyl and aromatic spacer groups for potential use as nonlinear optic materials", High Performance Polymers, Institute of Physics Publishing, 2005, 17 pages.

Park, Cheol, "Polyimide/silica hybrid-clay nanocomposites", Polymer, Elsevier Science Publishers B.V., vol. 46, No. 23, Nov. 14, 2005, 8 pages.

JP2005298751, Polyester Resin Composition and Polyester Film, Publication Date: Oct. 27, 2005, Abstract, 1 page.

PCT International Search Report dated Mar. 25, 2008—International Application No. PCT/US2007/072070.

PCT Written Opinion dated Mar. 25, 2008—International Application No. PCT/US2007/072070.

Lertwimolnun, et al.; "Influence of Compatibilizer and Processing Conditions on the Dispersion of Nanoclay in a Polypropylene Matrix"; Polymer; 46; pp. 3462-3471; (2005).

Zhu et al.; "Effects of Process Conditions and Mixing Protocols on Structure of Extruded Polypropylene Nanocomposites"; Journal of Applied Polymer Science; 93, pp. 1891-1899; (2004).

Lee, et al.; "Exfoliation and Dispersion Enhancement in Polypropylene Nanocomposites by In-Situ Melt Phase Ultrasonication"; Polymer Engineering and Science, 44; No. 9; pp. 1773-1782; (2004).

Ton-That, et al.; "Polyolefin Nanocomposites: Formulation and Development"; Polymer Engineering and Science; 44; No. 7; pp. 1212-1219; (2004).

Lam, et al.; "Effect of Ultrasound Sonication in Nanoclay Clusters of Nanoclay/Epoxy Composites"; Materials Letters; 59; pp. 1369-1372; (2005).

Wang, et al.; "Sonochemical One-Directional Growth of Montomorillonite-Polystyrene Nanocomposite"; Ultrasonics Sonochemistry; 12; pp. 165-168; (2005).

Burgentzle, et al.; "Solvent-Based Nanocomposite Coatings I. Dispersion of Organophilic Montmorillonite in Organic Solvents"; Journal of Colloid and Interface Science; 278; pp. 26-39; (2004).

Chang, et al.; "Preparation and Characterization of Polimide Nanocomposites With Different Organo-Montmorillonites"; Polymer Engineering and Science; 41, No. 9; pp. 1514-1520; (2001).

Chen, et al.; "Synthesis of Disordered and Highly Exfoliated Epoxy/Clay Nanocomposites Using Organoclay with Catalytic Function via Acetone - Clay Slurry Method"; Chem. Mater.; 16; pp. 4864-4866; (2004).

Dasari et al.; "Clay Exfoliation and Organic Modification on Wear of Nylon 6 Nanocomposites Processed by Different Routes"; Composites Science and Technology; 65; pp. 2314-2328; (2005).

Hasegawa, et al.; "Nylon 6/Na—Montmorillonite Nanocomposites Prepared by Compounding Nylon 6 with Na Montmorillonite Slurry"; Polymer; 44; pp. 2933-2937; (2003).

Jeon et al.; "Characterization of Polyisoprene—Clay Nanocomposites Prepared by Solution Blending"; Polymer 44; pp. 5749-5758; (2003).

Kato, et al.; "Development of a New Production Method for a Polypropylene-Clay Nanocomposite"; Polymer Engineering and Science; 44; No. 7; pp. 1205-1211; (2004).

Ma, et al.; "A New Approach to PolymerMontmorillonite Nanocomposites"; Polymer; 44; pp. 4619-4624; (2003).

Perez-Maqueda, et al.; "The Influence of Sonication on the Thermal Behavior of Muscovite and Biotite"; Journal of the European Ceramic Society; 24; pp. 2793-2801; (2004).

Morgan, et al.; "Exfoliated Polystyrene-Clay Nanocomposites Synthesized by Solvent Blending with Sonication"; Polymer; 45; pp. 8695-8703; (2004).

Park, et al.; "Mechanism of Exfoliation of Nanoclay Particles in Epoxy—Clay Nanocomposites"; Macromolecules; 36; pp. 2758-2768; (2003).

Park, et al.; "Adverse Effects of Thermal Dissociation of Alkyl Ammonium Ions on Nanoclay Exfoliation in Epoxy-Clay Systems"; Polymer; 45; pp. 7673-7679; (2004).

Paul, et al.; "(Plasticized) Polylactide/(Organo-)Clay Nanocomposites by in Situ Intercalative Polymerization"; Macromol. Chem. Phys.; 206; pp. 484-498; (2005).

Wang, et al.; "Preparation of Highly Exfoliated Epoxy/Clay Nanocomposites by "Slurry Compounding": Process and Mechanisms"; Langmuir; 21; pp. 3613-3618; (2005).

Yu, et al.; "Water-Assisted Melt Compounding of Nylon-6/Pristine Montmorillonite Nanocomposites"; Journal of Polymer Science: Part B; Polymer Physics; 43; pp. 1100-1112 ; (2005).

Zhong, et al.; "Synthesis and Rheological Properties of Polystyrene/Layered Silicate Nanocomposite"; Polymer; 46; pp. 3006-3013; (2005).

Morgan, et al.; "Characterization of the Dispersion of Clay in a Polyetherimide Nanocomposites"; Macromolecules; 34; pp. 2735-2738; (2001).

Takekoshi, et al.; "Polyetherimides. I. Preparation of Dianhydrides Containing Aromatic Ether Groups"; Journal of Polymer Science: Polymer Chemistry Edition; vol. 23 (1985); pp. 1759-1769.

* cited by examiner

A resulting film of this invention having a nanosilicate loading of 7%, a machine direction CTE of 33.0 ppm/°C, and a Tg of 255°C

COMPOSITIONS AND METHODS FOR POLYMER COMPOSITES

RELATED APPLICATIONS AND CLAIMS OF PRIORITY

This non-provisional application claims priority to U.S. Provisional Applications having Ser. No. 60/805,821, filed Jun. 26, 2006, and Ser. No. 60/945,150, filed on Jun. 20, 2007; both of which are incorporated herein by reference in their entirety.

BACKGROUND

This invention relates to organic salt compositions useful in the preparation of organoclay compositions, polymer-organoclay composite compositions, and methods for the preparation of polymer nanocomposites.

Organoclays serve as useful additives in the preparation of polymer compositions possessing enhanced physical properties relative to unfilled polymeric materials, and relative to polymer composite compositions comprising inorganic clays. Organoclays are typically prepared by replacing the inorganic cations present in the galleries between the silicate layers of a typical inorganic clay with organic cations. A principal advantage of the organoclay compositions is that when they are combined within a polymer composition the organoclay is found to exfoliate and interact with the polymer matrix to a greater degree than in the case of a corresponding composition comprising a purely inorganic clay. The presence of organic moieties between the inorganic silicate layers present in the organoclay both swells the organoclay, i.e. increases the d-spacing in the organoclay relative to the d-spacing in the corresponding inorganic clay, and enhances the tendency of the organoclay to exfoliate when subjected to shearing forces within a polymer matrix. In some instances exfoliation occurs so completely that a polymeric composition comprising very highly dispersed silicate layers results, and the organoclay-containing polymer composition is referred to as a nanocomposite.

Despite impressive advances in this field over the past decade, improved organoclay compositions are actively sought after and are highly prized when discovered. One deficiency in many organoclays is the thermal instability of the organic cation(s) present, making them unsuitable in applications wherein the polymer-organoclay composition must be processed at high temperature, as is the case in organoclay-containing polymer compositions comprising "high heat" polymers such as polyetherimide. Another deficiency of many known organoclay compositions is that the organoclay compositions may interact unfavorably with the polymer matrix when the organoclay composition is dispersed in a polymer matrix and marginal performance of the organoclay-containing polymer composition may result. For example, when the organic cation is a primary ammonium cation and the polymer matrix is sensitive to amine groups, degradation of the polymer matrix may result during melt mixing, for example, of the polymer matrix with the organoclay composition.

Thus, there is keen interest in the development of organoclay compositions which are both thermally stable and which interact favorably with the polymer matrix in organoclay-containing polymer compositions. The instant invention addresses these and other technical challenges.

BRIEF DESCRIPTION

In various embodiments, the present invention provides novel quaternary organophosphonium salts and novel quaternary pyridinium salts which are useful in the preparation of organoclay compositions. Thus, in one embodiment, the present invention provides novel organoclay compositions prepared using the novel organic salts provided by the present invention. In yet another aspect, the present invention provides novel polymer-organoclay composite compositions comprising the organoclay compositions disclosed herein. In yet still another aspect, the present invention provides novel methodology for the preparation of polymer-organoclay composite compositions. These and other aspects of the invention are disclosed in detail herein.

DETAILED DESCRIPTION

Figure 1:
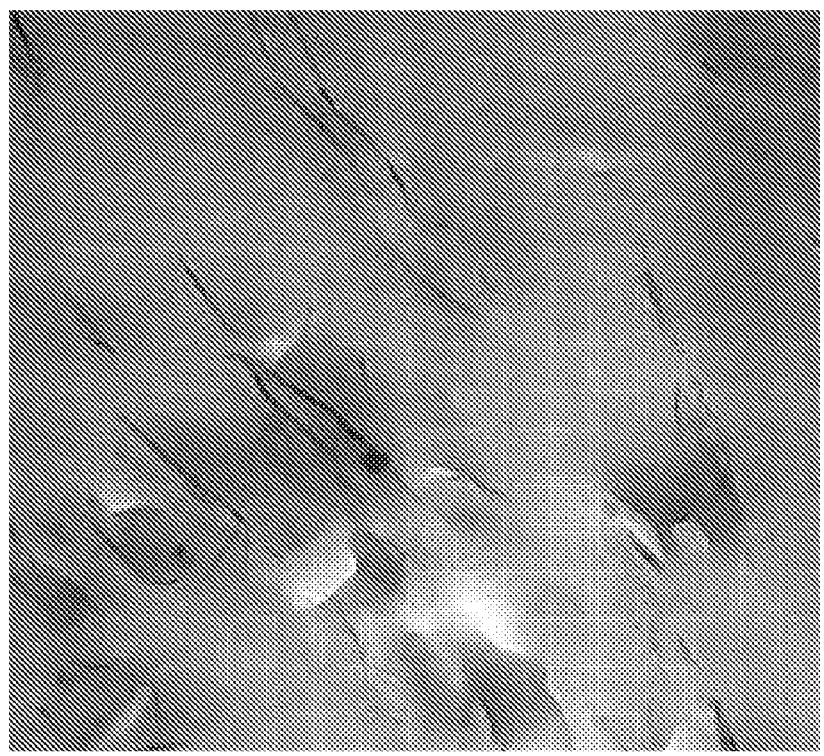
FIG. 1 shows a resulting film of this invention having a nanosilicate loading of 7%, a machine direction CTE of 33.0 ppm/° C., and a Tg of 255° C.

In the following specification and the claims, which follow, reference will be made to a number of terms, which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "solvent" can refer to a single solvent or a mixture of solvents.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC(CF$_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis (phenyl), and the like. The term "a $C_3$-$C_{10}$ aromatic radical" includes aromatic radicals containing at least three but no more than 10 carbon atoms. The aromatic radical 1-imidazolyl ($C_3$H$_2$N$_2$—) represents a $C_3$ aromatic radical. The benzyl radical ($C_7$H$_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6$H$_{11}$CH$_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcycloot-1-yl, 2-chlorodifluoromethylcyclohex-1-yl, hexafluoroisopropylidene-2,2-bis(cyclohex-4-yl) (i.e., —C$_6$H$_{10}$C(CF$_3$)$_2$C$_6$H$_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcy-clopent-1-yl, 2-bromopropylcyclohex-1-yloxy (e.g., CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$C$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis (cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a $C_4$ cycloaliphatic radical. The cyclohexylmethyl radical (C$_6$H$_{11}$CH$_2$—) represents a $C_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a $C_1$-$C_{10}$ aliphatic radical contains at least one but no more than 10 carbon atoms. A methyl group (i.e., $CH_3$—) is an example of a $C_1$ aliphatic radical. A decyl group (i.e., $CH_3(CH_2)_9$—) is an example of a $C_{10}$ aliphatic radical.

In one embodiment, the present invention provides an organophosphonium salt having structure I

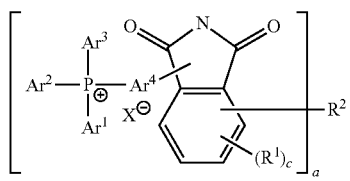

wherein $Ar^1$, $Ar^2$, and $Ar^3$ are independently $C_2$-$C_{50}$ aromatic radicals; $Ar^4$ is a bond or a $C_2$-$C_{50}$ aromatic radical; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; $R^2$ is a halogen atom, a $C_1$-$C_{20}$ aliphatic radical, a $C_5$-$C_{20}$ cycloaliphatic radical, a $C_2$-$C_{50}$ aromatic radical, or a polymer chain; and $X^-$ is a charge balancing counterion.

Representative organophosphonium salts encompassed by generic structure I are illustrated in Table I. One of ordinary skill in the art will appreciate the relationship between generic structure I and the individual structures of Entries 1a-1j of Table I. For example, the structure of Entry 1a represents a species encompassed by generic structure I wherein, each of $Ar^1$-$Ar^3$ is a phenyl radical ($C_6H_5$—), $Ar^4$ is a meta-phenylene radical, the variable "c" is zero, the variable "a" is 2, $X^-$ is iodide, and the group $R^2$ is the divalent $C_{15}$ aromatic radical —$OC$-$C_6H_4C_3H_6C_6H_4O$—.

TABLE I

Organophosphonium Salts

| Entry | Structure |
|---|---|
| 1a | |
| 1b | |
| 1c | |
| 1d | |

TABLE I-continued
Organophosphonium Salts
| Entry | Structure |
|---|---|
| 1e | 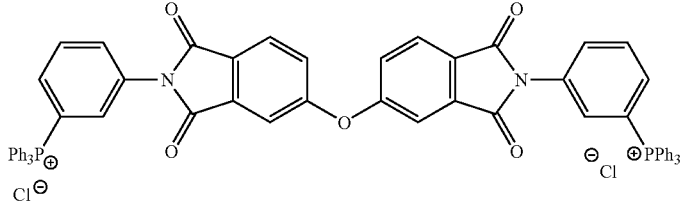 |
| 1f | 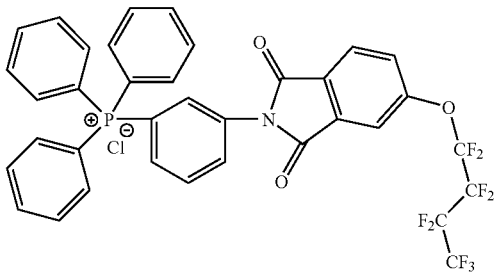 |
| 1g | 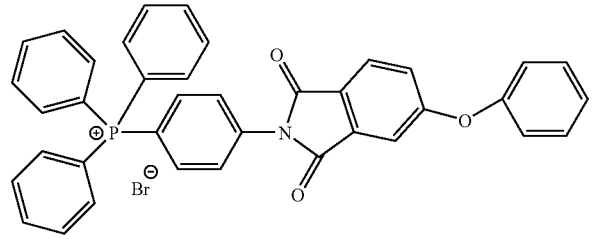 |
| 1h | 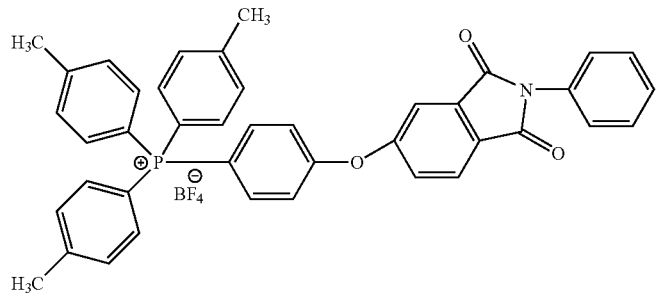 |
| 1i | 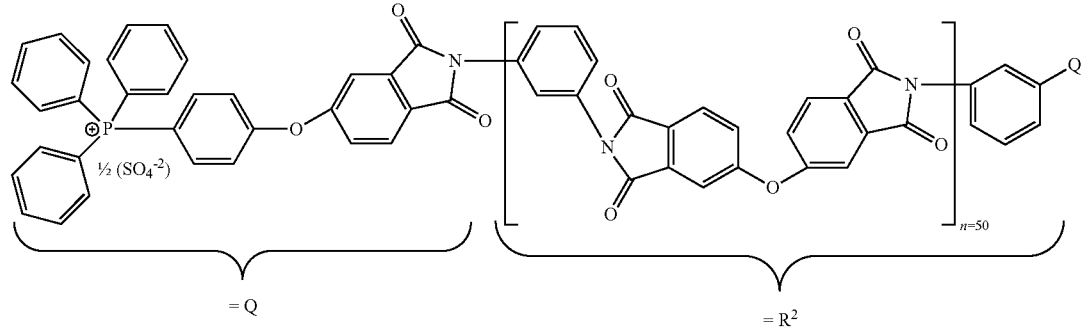 |

TABLE I-continued

Organophosphonium Salts

| Entry | Structure |
|---|---|
| 1j | (structure shown) |

By way of further example, Entry 1f of Table I illustrates an organophosphonium salt wherein $Ar^1$-$Ar^3$ are phenyl; $Ar^4$ is m-phenylene, "a"=1, "c" is 0, $R^2$ is the $C_4$ aliphatic radical $C_4F_9O$—, and $X^-$ is chloride ion.

Entry 1g of Table I illustrates an organophosphonium salt wherein $Ar^1$-$Ar^3$ are phenyl; $Ar^4$ is p-phenylene, "a"=1, "c" is 0, $R^2$ is the $C_6$ aromatic radical $C_6H_5O$— (phenoxy), and $X^-$ is bromide ion.

Entry 1h of Table I illustrates an organophosphonium salt wherein $Ar^1$-$Ar^3$ are phenyl; $Ar^4$ is p-phenylenoxy, "a"=1, "c" is 0, $R^2$ is the $C_6$ aromatic radical $C_6H_5$—(phenyl), and $X^-$ is the terafluorborate ion, $BF_4^-$.

Entry 1i of Table I illustrates an organophosphonium salt wherein $Ar^1$-$Ar^3$ are phenyl; $Ar^4$ is p-phenylenoxy, "a"=2, "c" is 0, $R^2$ is a polyetherimide chain represented by the bracketed structure modified by subscript "n" which for the purposes of this exemplary organophosphonium salt is equal to 50 together with the meta-phenylene moiety situated between the right hand bracket and the group Q. In various other embodiments, "n" is a number from 1 to about 500. The counterion $X^-$ is sulfate ($SO_4^=$).

In one embodiment, the group represented by $R^2$ in structure I is a polyetherimide polymer chain (See for example Entry 1i of Table I). In another embodiment, the group represented by $R^2$ in structure I is a polyether ketone polymer chain. In yet another embodiment, the group represented by $R^2$ in structure I is a polyether sulfone polymer chain In embodiments wherein $R^2$ is a polymer chain, the polymer chain may be of high molecular weight or low molecular weight. High molecular weight polymer chains are those having a number average molecular weight ($M_n$) of greater than 8,000 grams per mole as measured by gel permeation chromatography using polystyrene molecular weight standards. Low molecular weight polymer chains are those having a number average molecular weight ($M_n$) of 8,000 grams per mole or less as measured by gel permeation chromatography using polystyrene molecular weight standards. In one embodiment, the present invention provides a organophosphonium salt having structure I wherein $R^2$ is a polymer chain having a number average molecular weight $M_n$ in a range from about 1000 to about 50,000 grams per mole as determined by gel permeation chromatography. In another embodiment, $R^2$ is a polymer chain having a number average molecular weight $M_n$ in a range from about 1000 to about 20,000 grams per mole as determined by gel permeation chromatography. In yet another embodiment, $R^2$ is a polymer chain having a number average molecular weight $M_n$ in a range from about 1000 to about 5,000 grams per mole as determined by gel permeation chromatography.

In one embodiment, the present invention provides an organophosphonium salt having structure II

II

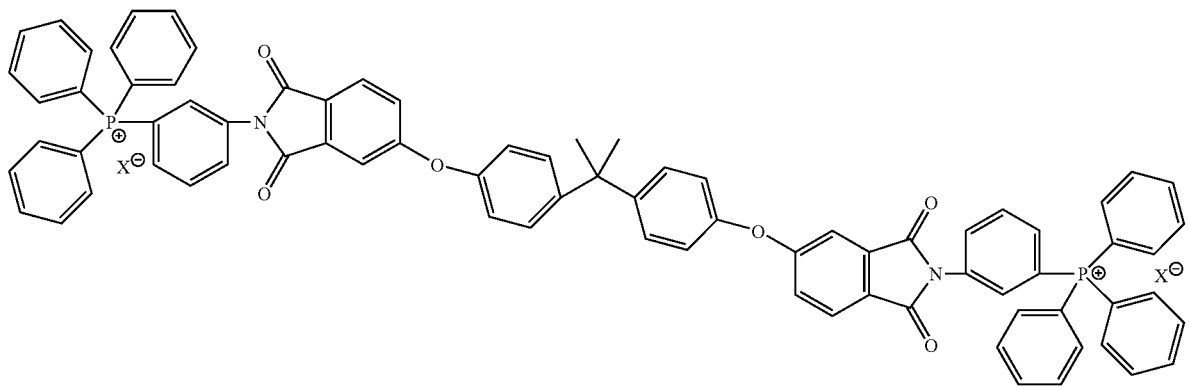

wherein $X^-$ is a charge balancing counterion.

In another embodiment, the present invention provides an organophosphonium salt having structure III

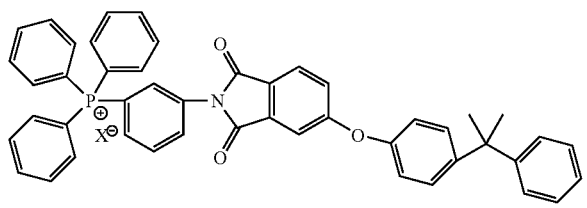

wherein X⁻ is a charge balancing counterion.

In yet another embodiment, the present invention provides an organophosphonium salt having structure IV

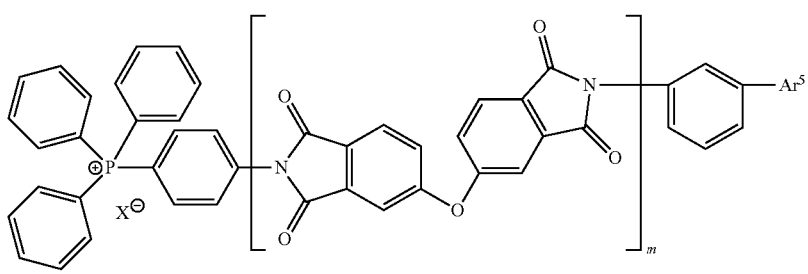

wherein X⁻ is a charge balancing counterion, m is a number in a range from about 10 to about 1000, and $Ar^5$ is a $C_2$-$C_{50}$ aromatic radical, or a polymer chain.

In one embodiment, the present invention provides an organophosphonium salt having structure IV wherein the group $Ar^5$ has structure V

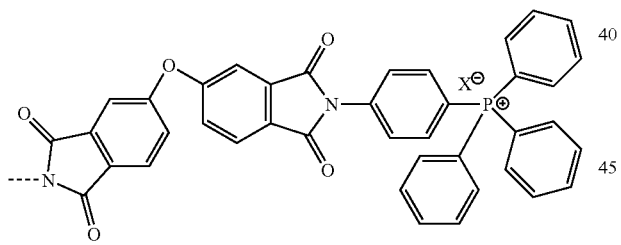

wherein X⁻ is a charge balancing counterion.

In structure I and elsewhere in this disclosure, the group X⁻ represents a charge balancing counterion. As one of ordinary skill in the art will appreciate, a wide variety of charge balancing counterions are available. Typically, X⁻ represents a charge balancing counterion which is a monovalent, divalent, or trivalent anionic species. For example, in one embodiment, X⁻ is selected from the group consisting of fluoride, chloride, bromide, iodide, sulfate, sulfite, carbonate, bicarbonate, acetate, oxalate, and combinations thereof. The inorganic anions fluoride, chloride, bromide, iodide, and bicarbonate are examples of monovalent anions. The inorganic anions carbonate and sulfate and the organic anion oxalate are examples of divalent anions. The trianion of Kemp's triacid is an example of a trivalent anion.

The novel organophosphonium salts provided by the present invention may be prepared by a variety of methods. The experimental section of this disclosure provides a number of specific methods and conditions for the preparation of organophosphonium salts having structure I. In one embodiment, the organophosphonium salt may be prepared by reacting an aryl halide with a triarylphosphine, optionally in the presence of a catalyst, such as palladium(II) acetate. In an alternate embodiment, an amine-substituted phosphonium salt is reacted with an anhydride to provide an imide-containing product comprising a phosphonium salt moiety.

In one embodiment, the present invention provides a method for the preparation of an organophosphonium salt comprising (a) contacting an amine-substituted phosphonium salt having structure VI

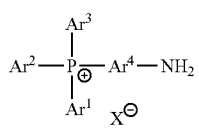

wherein $Ar^1$, $Ar^2$, $Ar^3$ and $Ar^4$ are independently $C_2$-$C_{50}$ aromatic radicals, and X⁻ is a charge balancing counterion; with an anhydride compound having structure VII "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a $C_1$-$C_{20}$ aliphatic radical, a $C_5$-$C_{20}$ cycloaliphatic radical, a $C_2$-$C_{50}$ aromatic radical, or a polymer chain; and (b) isolating the product organophosphonium salt.

In one embodiment, compound VI is an aniline bearing a triphenylphosphonium moiety meta to the amine ($NH_2$) group, and wherein the charge balancing counterion is iodide. In another embodiment, compound VI is an aniline bearing a triphenylphosphonium moiety para to the amine ($NH_2$) group, and wherein the charge balancing counterion is chloride.

In one embodiment, the anhydride compound VII is selected from the group consisting of bisphenol A dianhydride (BPADA), 4,4'-biphenyl dianhydride, and 4,4'-oxydiphthalic anhydride (4,4'-ODPA). In one embodiment, anhydride compound VII is bisphenol A dianhydride. In another embodiment, the anhydride compound VII is a polymeric dianhydride comprising anhydride terminal groups, said polymeric dianhydride being a polyetherimide derived from BPADA and meta-phenylene diamine, said polymeric dianhydride having a number average molecular weight $M_n$ of about 10,000 grams per mole.

Typically, the reaction ("contacting") between the amine-substituted phosphonium salt having structure VI and the anhydride compound having structure VII takes place in a solvent at a temperature in excess of 100° C. with the removal of water formed as a by-product in the condensation reaction. In one embodiment, the reaction is carried out in an organic solvent at temperature in a range from about 120° C. to about 160° C. In another embodiment, the reaction is carried out in a melt.

In certain instances it may be advantageous to conduct the reaction in the presence of a catalyst such as are used in imidization reactions, for example sodium phenyl phosphinate (SPP).

Suitable solvents include oDCB (orthodichorobenzene), toluene, xylene, chlorobenzene, anisole, veratrole, and combinations thereof.

In one embodiment, the present invention provides a method for the preparation of an organophosphonium salt comprising (a) contacting an amine-substituted phosphonium salt having structure IX

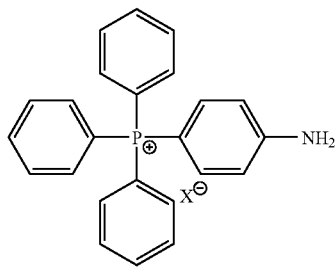

IX wherein $X^-$ is a charge balancing counterion, with an anhydride compound having structure VII

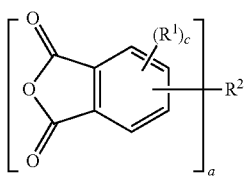

VII wherein "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a halogen atom, a $C_1$-$C_{20}$ aliphatic radical, a $C_5$-$C_{20}$ cycloaliphatic radical, a $C_2$-$C_{50}$ aromatic radical, or a polymer chain; and (b) isolating the product organophosphonium salt.

In one embodiment, the anhydride compound having structure VII is selected from the group consisting of 4,4'-oxydiphthalic anhydride, 3,4'-oxydiphthalic anhydride, 3,3'-oxydiphthalic anhydride, bisphenol A dianhydride, 6F-dianhydride, 3,4'-biphenyl dianhydride, 4,4'-biphenyl dianhydride, and combinations thereof.

In yet another embodiment, the present invention provides a method of preparing an organophosphonium salt comprising (a) contacting an aromatic amine with a halogen-substituted anhydride to provide a halogen-substituted imide; (b) reacting said halogen-substituted imide with a triarylphosphine to effect a nucleophilic substitution of halogen by triarylphosphine; and (c) isolating the product organophosphonium salt.

In one embodiment, the halogen-substituted anhydride is selected from the group consisting of 3-chlorophthalic anhydride (3-ClPA), 4-chlorophthalic anhydride (4-ClPA), 3-fluorophthalic anhydride, and 4-fluorophthalic anhydride. In another embodiment, the halogen-substituted anhydride comprises 4-chlorophthalic anhydride. In yet another embodiment, the halogen-substituted anhydride comprises a mixture of 3-chlorophthalic anhydride and 4-chlorophthalic anhydride.

The aromatic amine may be a monoamine or a polyamine. In one embodiment, the aromatic amine is a polymer comprising amine groups. Monoamines are illustrated by aniline, 1-aminonaphthalene, 3-chloroaniline, 4-chloroaniline, 2,4-dichloroaniline, 4-chloro-4'-aminobiphenyl, and the like.

Suitable triarylphosphines include triphenylphosphine, tolylphosphine, trixylylphosphine, tris(4-t-butoxyphenyl)phosphine, and the like.

Suitable reaction conditions for the preparation of the halogen-substituted imide and its subsequent reaction with a triarylphosphine are provided in the experimental section of this disclosure.

In one embodiment, the present invention provides novel pyridinium salt having structure XV

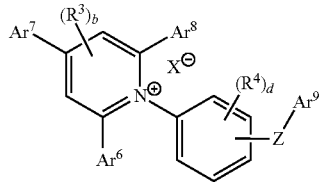

XV wherein $Ar^6$, $Ar^7$, and $Ar^8$ are independently $C_2$-$C_{50}$ aromatic radicals; "b" is a number from 0 to 2; "d" is a number from 0 to 4; $R^3$ and $R^4$ are independently at each occurrence a halogen atom, a $C_1$-$C_{20}$ aliphatic radical, a $C_5$-$C_{20}$ cycloaliphatic radical, or a $C_2$-$C_{20}$ aromatic radical; Z is a bond, a divalent $C_1$-$C_{20}$ aliphatic radical, a divalent $C_5$-$C_{20}$ cycloaliphatic radical, a divalent $C_2$-$C_{20}$ aromatic radical, an oxygen linking group, a sulfur linking group, a $SO_2$ linking group, or a Se linking group; $Ar^9$ is a $C_{10}$-$C_{200}$ aromatic radical, or a polymer chain comprising at least one aromatic group; and $X^-$ is a charge balancing counterion.

As is demonstrated herein, pyridinium salts encompassed by structure XV are useful in the preparation of organoclay compositions and polymer-organoclay composite compositions. Representative pyridinium salts encompassed by generic structure XV are illustrated in Table II.

TABLE II

Exemplary Pyridinium Salts XV

| Entry | Structure |
|---|---|
| 2a | |
| 2b | |
| 2c | |
| 2d | |

One of ordinary skill in the art will appreciate that the pyridinium salt of Entry 2a of Table II represents a pyridinium salt having structure XV wherein $Ar^6$, $Ar^7$, and $Ar^8$ are each phenyl; "b" is 0; "d" is 2; $R^4$ is methyl; Z is an oxygen linking group; $Ar^9$ is a $C_{12}$ aromatic radical; and $X^-$ is a chloride ion. Similarly, the pyridinium salt of Entry 2b of Table II represents a pyridinium salt having structure XV wherein $Ar^6$, $Ar^7$, and $Ar^8$ are phenyl; "b" is 0; "d" is 0; Z is an oxygen linking group; $Ar^9$ is a $C_{12}$ aromatic radical; and $X^-$ is an acetate ion.

In one embodiment, the present invention provides a pyridinium salt having structure XV wherein $Ar^9$ is a polyetherimide polymer chain. In another embodiment, the present invention provides a pyridinium salt having structure XV wherein $Ar^9$ is a polyether ketone polymer chain. In one embodiment, $Ar^9$ is a polymer chain having a number average molecular weight $M_n$ in a range from about 1000 to about 50,000 grams per mole. In another embodiment, $Ar^9$ is a polymer chain having a number average molecular weight $M_n$ in a range from about 1000 to about 20,000 grams per mole. In yet another embodiment, $Ar^9$ is a polymer chain having a number average molecular weight $M_n$ in a range from about 1000 to about 5,000 grams per mole. In another embodiment, $Ar^9$ is a polyetherimide polymer chain having a number average molecular weight $M_n$ in a range from about 1000 to about 20,000 grams per mole.

In a particular embodiment, $Ar^9$ is a polyetherimide polymer chain having a number average molecular weight $M_n$ in a range from about 1000 to about 50,000 grams per mole.

In one embodiment, the present invention provides a pyridinium salt encompassed by generic structure XV having structure XVI

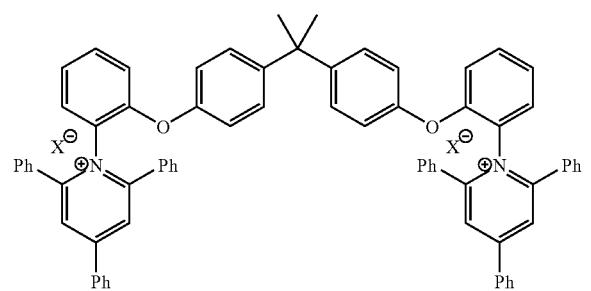

XVI wherein $X^-$ is independently at each occurrence a charge balancing counterion. In a particular embodiment $X^-$ is $BF_4^-$.

In one embodiment, the present invention provides a pyridinium salt having structure XVII

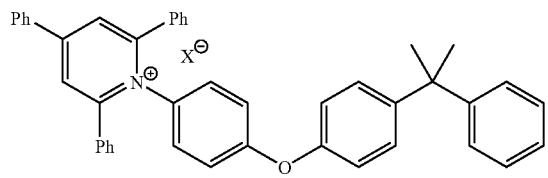

wherein $X^-$ is independently at each occurrence a charge balancing counterion. In a particular embodiment $X^-$ is acetate.

In yet another embodiment, the present invention provides a pyridinium salt having structure XVIII

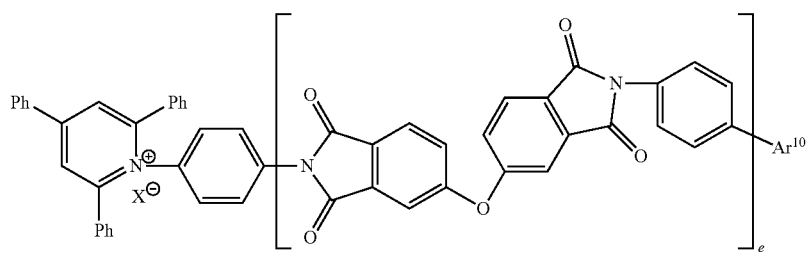

XVIII wherein $X^-$ is a charge balancing counterion; "e" is a number in a range from about 10 to about 1000; and $Ar^{10}$ is a $C_2$-$C_{50}$ aromatic radical, or a polymer chain. In a particular embodiment, $X^-$ is the tetrafluoroborate ($BF_4^-$) anion, the variable "e" is about 100, and $Ar^{10}$ is the $C_{25}$-aromatic radical 2,4,6-triphenylpyridinium tetrafluoroborate. One of ordinary skill in the art will appreciate that an aromatic radical may include an associated counterion, here $BF_4^-$, and still fall within the definition of the term aromatic radical as defined herein. Similarly, aliphatic radicals and cycloaliphatic radicals may include an associated counterion as well. Where a radical comprises multiple charges requiring the presence of a charge balancing counterion, a plurality of charge balancing counterions may be comprised within the radical. Those of ordinary skill in the art will appreciate as well that a fractional part of a charge balancing counterion may be comprised within a radical as well. For example in compositions in which a single positive charge is balanced by a divalent anion such as sulfate ($SO_4^=$) a single sulfate anion may be associated with two individual molecules or radicals. Thus, in one embodiment, $Ar^{10}$ is an aromatic radical comprising $½(SO_4^=)$. In one embodiment, $Ar^{10}$ is an aromatic radical having structure XIX

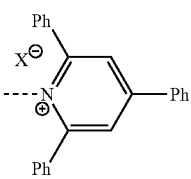

XIX wherein $X^-$ is a charge balancing counterion. In a particular embodiment, $X^-$ is a fractional part of a divalent ion selected from the group consisting of sulfate, carbonate, and oxalate. In one embodiment, $X^-$ is $½(CO_3^=)$, a fractional part of a carbonate anion.

Charge balancing counterions which may be present in pyridinium salt structure XV include those disclosed herein for structure I. In one embodiment, the charge balancing counterion is selected from the group consisting of fluoride, chloride, bromide, iodide, sulfate, sulfite, carbonate, bicarbonate, acetate, oxalate, and combinations thereof.

In one embodiment, the present invention provides a method for the preparation of a pyridinium salt having structure XV comprising (a) contacting an aromatic amine having structure XX

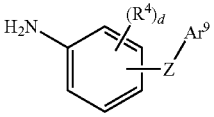

XX wherein "d" is a number from 0 to 4; $R^4$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; Z is a bond, a divalent $C_1$-$C_{20}$ aliphatic radical, a divalent $C_5$-$C_{20}$ cycloaliphatic radical, a divalent $C_2$-$C_{20}$ aromatic radical, an oxygen linking group, a sulfur linking group, a $SO_2$ linking group, or a Se linking group; $Ar^9$ is a $C_{10}$-$C_{200}$ aromatic radical, or a polymer chain comprising at least one aromatic group; and $X^-$ is a charge balancing counterion; with a pyrilium salt having structure XXI

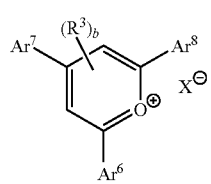

XXI wherein $Ar^6$, $Ar^7$, and $Ar^8$ are independently $C_2$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $X^-$ is a charge balancing counterion; and (b) isolating the product pyridinium salt having structure XV.

The reaction brought about by contacting aromatic amine XX with pyrilium salt XXI typically involves contacting these reactants at a temperature in a range from about –20° C. to about 150° C. Although a solvent is typically employed, the reaction may be carried out in a melt as well.

In one embodiment, the present invention provides a polymeric pyridinium salt and a method for its preparation. The polymeric pyridinium salt may be prepared by (a) reacting (contacting) a polymeric aromatic diamine with a pyrilium salt having structure XXI, and (b) isolating the product polymeric pyridinium salt.

In one embodiment, the said polymeric aromatic diamine comprises structural units derived from at least one non-polymeric aromatic diamine and at least one dianhydride. For example, a molar excess of a diamine such as 4,4'-oxydianiline (4,4'-ODA) may be reacted with 4,4'-oxydiphthalic anhydride (4,4'-ODPA) in orthodichorobenzene (oDCB) at reflux to provide an amine terminated polyetherimide. Reaction of the amine terminated polyetherimide with a pyrilium salt having structure XXI affords the product polymeric pyridinium salt which may be isolated by, for example, antisolvent precipitation.

In one embodiment, the non-polymeric aromatic diamine is meta-phenylenediamine. In one embodiment, the non-polymeric aromatic diamine is meta-phenylenediamine and the dianhydride is BPADA. In one embodiment, the dianhydride employed is a mixture of BPADA and 4,4'-ODPA.

In one embodiment, the present invention provides a polymeric pyridinium salt having structure XXII

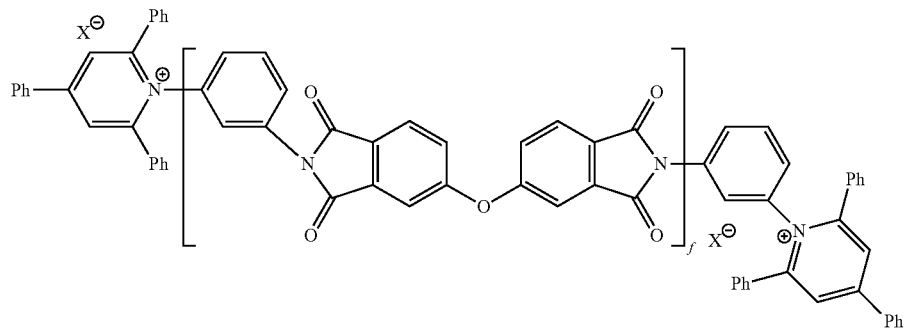

XXII wherein "f" is a number from 10 to about 1000, and $X^-$ is a charge balancing counterion.

Thus, in one embodiment, the present invention provides a method comprising (a) contacting a polymeric aromatic diamine having structure XXIII

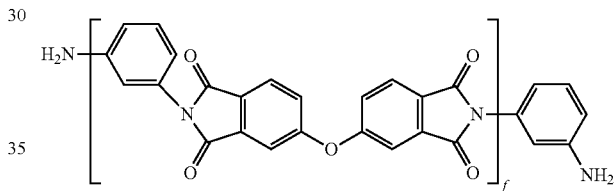

XXIII wherein variable "f" is a number from 10 to about 1000; with a pyrilium salt having structure XXIV

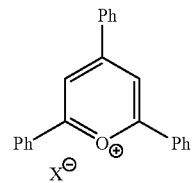

XXIV wherein $X^-$ is a charge balancing counterion; and
(b) isolating the product polymeric pyridinium salt having structure XXII.

As discussed herein, polymeric diamines such as XXIII may be prepared by reacting an excess of an aromatic diamine with a dianhydride under condensation polymerization conditions (for example refluxing oDCB). One of ordinary skill in the art will recognize that diamine XXIII may be prepared by reacting excess meta-phenylene diamine with 4,4'-ODPA under condensation polymerization conditions. Pyrilium salts such as XXIV are available commercially or may be prepared by methods known in the art. In one embodiment, the present invention provides a polymeric pyridinium salt having structure XXII wherein the variable "f" is a number from 10 to about 100.

In addition to providing novel organophosphonium salts I and pyridinium salts XV, the present invention provides access to other organic salts useful in the preparation of organoclay compositions and polymer-organoclay composite composition derived from said organoclay compositions.

Thus, in one embodiment, the present invention provides access to pyridinium salts comprising cation XXV

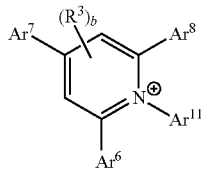

XXV wherein $Ar^6$, $Ar^7$, and $Ar^8$ are independently $C_2$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $Ar^{11}$ is a $C_2$-$C_{200}$ aromatic radical, or a polymer chain comprising at least one aromatic group.

Pyridinium salts comprising cation XXV are illustrated in Table III. Pyridinium salts comprising cation XXV may be prepared and incorporated into organoclay compositions and polymer-organoclay composite compositions using methods disclosed herein. For example those methods suitable for the preparation and use of pyridinium salts having structure XV, may be applied to the preparation and use of pyridinium salts comprising cation XXV.

TABLE III

Illustrative Pyridinium Salts Comprising Cation XXV

| Entry | $Ar^6$ | $Ar^7$ | $Ar^8$ | $Ar^{11}$ | $R^3$ | "b" | Counterion $X^-$ |
|---|---|---|---|---|---|---|---|
| 3a | Ph | Ph | Ph | Ph | — | 0 | $BF_4^-$ |
| 3b | Ph | H | Ph | 4-ClPh | MeO | 2 | $Cl^-$ |
| 3c | Ph | Ph | Ph | 4-$CF_3$Ph | — | 0 | $BF_4^-$ |
| 3d | Ph | Ph | Ph | 2-pyridyl | — | 0 | $BF_4^-$ |

In another aspect, the present invention provides access to phenone-containing organic salts useful in the preparation of organoclay compositions and polymer-organoclay composite compositions derived from said organoclay compositions. Thus, in one embodiment, the present invention provides access to phenone-containing salts comprising quaternary phosphonium cations having structure XXXIII

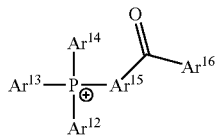

XXXIII wherein $Ar^{12}$, $Ar^{13}$, $Ar^{14}$ and $Ar^{15}$ are independently $C_2$-$C_{50}$ aromatic radicals; and $Ar^{16}$ is a $C_2$-$C_{200}$ aromatic radical, or a polymer chain comprising at least one aromatic group.

Phenone-containing salts comprising a quaternary phosphonium cation having structure XXXIII are illustrated in Table IV. Phenone-containing salts comprising quaternary phosphonium cation XXXIII may be prepared as disclosed herein. Phenone-containing salts comprising quaternary phosphonium cation XXXIII may be incorporated into organoclay compositions and polymer-organoclay composite compositions using methods disclosed herein and shown to be suitable for organophosphonium salts I and pyridinium salts XV. For example those methods suitable for the incorporation of the cationic component of organophosphonium salts I into organoclay compositions may be applied to the use of phenone-containing salts comprising quaternary phosphonium cation XXXIII in the preparation of organoclay compositions.

TABLE IV

Illustrative Phenone-Containing Salts Comprising Cation XXXIII

| Entry | $Ar^{12}$ | $Ar^{13}$ | $Ar^{14}$ | $Ar^{15}$ | $Ar^{16}$ | Counterion $X^-$ |
|---|---|---|---|---|---|---|
| 4a | Ph | Ph | Ph | 1,4-phenylene | Ph | $Cl^-$ |
| 4b | Ph | Ph | Ph | 1,3-phenylene | Ph | $Cl^-$ |
| 4c | o-tolyl | o-tolyl | o-tolyl | 1,4-phenylene | 2-napthyl | $I^-$ |
| 4d | 3,4-xylyl | 3,4-xylyl | 3,4-xylyl | pyridine-2,6-diyl | Ph | $CF_3SO_3^-$ |

In one embodiment, the present invention provides access to a phenone-containing salt comprising quaternary phosphonium cation XXXIII wherein $Ar^{16}$ is a polyether ketone polymer chain. Such salt compositions may be prepared, for example by reacting a polyetherketone comprising one or more terminal chlorobenzoyl groups with a triarylphosphine, for example triphenylphosphine, in a solvent and optionally in the presence of a catalyst.

In one embodiment, the present invention provides access to a phenone-containing salt comprising quaternary phosphonium cation XXXIII wherein $Ar^{16}$ is a polymer chain having a number average molecular weight $M_n$ in a range from about 1000 to about 50,000 grams per mole. In another embodiment, the present invention provides access to a phenone-containing salt comprising quaternary phosphonium cation XXXIII wherein $Ar^{16}$ is a polymer chain having a number average molecular weight $M_n$ in a range from about 1000 to about 20,000 grams per mole. In yet another embodiment, the present invention provides access to a phenone-containing salt comprising quaternary phosphonium cation XXXIII wherein $Ar^{16}$ is a polymer chain having a number average molecular weight $M_n$ in a range from about 1000 to about 5,000 grams per mole.

In one embodiment, the present invention provides access to a phenone-containing salt comprising quaternary phosphonium cation XXXIII wherein $Ar^{16}$ is a polyetherimide polymer chain having a number average molecular weight $M_n$ in a range from about 1000 to about 50,000 grams per mole. In another embodiment, the present invention provides access to a phenone-containing salt comprising quaternary phosphonium cation XXXIII wherein $Ar^{16}$ is a polyetherimide polymer chain having a number average molecular weight $M_n$ in a range from about 1000 to about 20,000 grams per mole.

In one particular aspect, the present invention provides access to a phenone-containing salt comprising quaternary phosphonium cation XXXIV. One of ordinary skill in the art will recognize that cation falls within the scope of the genus defined by structure XXXIII. Thus, structure XXXIV represents the case wherein $Ar^{15}$ of structure XXXIII is orthophenyleneoxy and $Ar^{16}$ is 4-(2-triphenylphosphonium phenyleneoxy)phenyl.

In another particular embodiment, the present invention provides access to a phenone-containing salt comprising quaternary phosphonium cation XXXV.

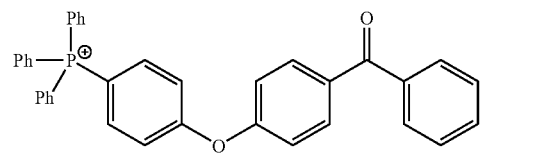

XXXV

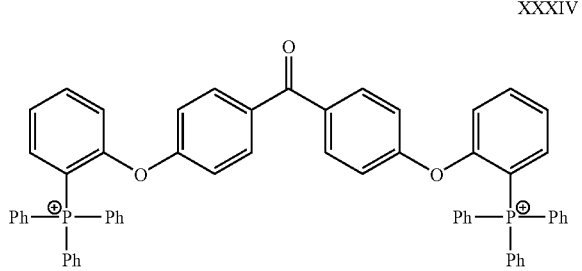

XXXIV

In one embodiment, the present invention provides a polymeric phenone-containing salt comprising a polymeric quaternary phosphonium cation having structure XXXVII

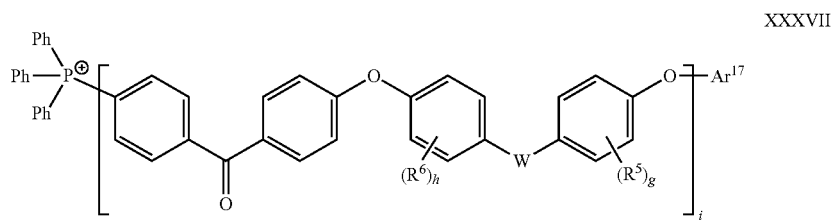

XXXVII wherein "g" and "h" are independently a number from 0 to 4; W is a bond, a divalent $C_1$-$C_{20}$ aliphatic radical, a divalent $C_5$-$C_{20}$ cycloaliphatic radical, a divalent $C_2$-$C_{20}$ aromatic radical, an oxygen linking group, a sulfur linking group, a $SO_2$ linking group, or a Se linking group; $R^5$ and $R^6$ are independently at each occurrence a halogen atom, a $C_1$-$C_{20}$ aliphatic radical, a $C_5$-$C_{20}$ cycloaliphatic radical, or a $C_2$-$C_{20}$ aromatic radical; "i" is a number from about 10 to about 1000; and $Ar^{17}$ is a $C_{10}$-$C_{200}$ aromatic radical, or a polymer chain comprising at least one aromatic group.

Polymeric phenone-containing salts comprising a polymeric quaternary phosphonium cation having structure XXXVII are illustrated in Table V below.

TABLE V

| Entry | Structure |
|---|---|
| 5a |  |

TABLE V-continued

| Entry | Structure |
|---|---|
| 5b | [structure: (Ph)₃P⁺—Ar—C(=O)—Ar—O—Ar—C(CH₃)₂—Ar—O—Ar—C(=O)—Ar—P⁺(Ph)₃, 2 Cl⁻, subscript 35] |
| 5c | [structure with (Ph)₃P⁺, Cl⁻ on left; repeating unit subscript 5; terminal Cl on right] |
| 5d | [structure with (Ph)₃P⁺, F⁻ on left; repeating unit subscript 65; terminal F on right] |
| 5e | [structure with (Ph)₃P⁺, F⁻ on left; methyl-substituted aromatics with H₃C groups; repeating unit subscript 65; terminal F on right] |

As Entries 5a and 5b in Table V make clear, in one embodiment $Ar^{17}$ is an aromatic radical comprising structure XXXVIII.

XXXVIII

[structure: aromatic ring—C(=O)—aromatic ring—P⁺(Ph)(Ph)(Ph)]

Polymeric phenone-containing salts such as those illustrated in Table V may be prepared by from the corresponding halogen-substituted polyetherketones by reaction with a triarylphosphine as described herein. Halogen-substituted polyetherketones are available by methods known to one of ordinary skill in the art and can be prepared, for example, by reacting the disodium salt of a bisphenol (e.g. the disodium salt of bisphenol A) with a molar excess (e.g. 5 mole percent excess) of a dihalo benzophenone (e.g. 4,4'-difluorobenzophenone) in an inert solvent (e.g. orthodichorobenzene) at elevated temperature (e.g. 130-180° C.) in the presence of phase transfer catalyst (e.g. hexaethyl guanidinium chloride).

In one embodiment, the present invention provides an organoclay composition comprising a quaternary organic cation. The quaternary organic cation may be a quaternary phosphonium cation, a quaternary ammonium cation, or a combination thereof. Quaternary organic cations are the cationic components of the various quaternary organic salts disclosed herein. Thus, organophosphonium salt I is a quaternary organic salt comprising the quaternary organic cation X

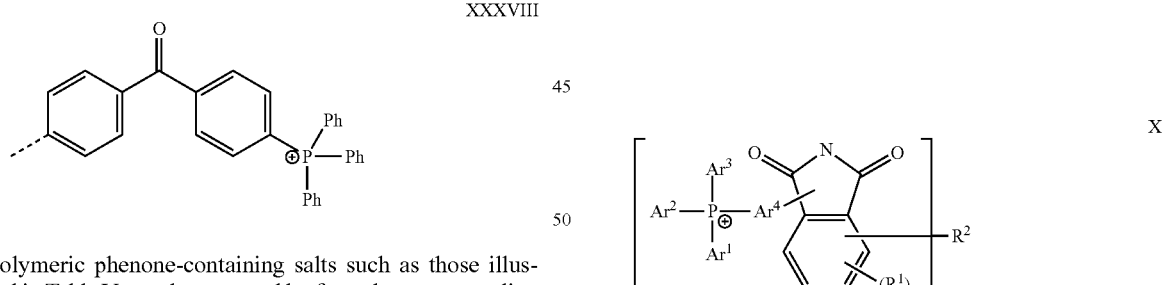

X wherein $Ar^1$, $Ar^2$, and $Ar^3$ are independently $C_2$-$C_{50}$ aromatic radicals; $Ar^4$ is a bond or a $C_2$-$C_{50}$ aromatic radical; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a halogen atom, a $C_1$-$C_{20}$ aliphatic radical, a $C_5$-$C_{20}$ cycloaliphatic radical, a $C_2$-$C_{50}$ aromatic radical, or a polymer chain.

Similarly, pyridinium salt XV is a quaternary organic salt comprising the quaternary organic cation XXVI

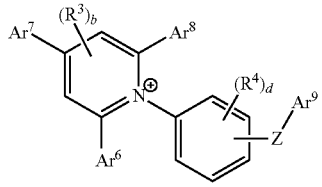

XXVI wherein $Ar^6$, $Ar^7$, and $Ar^8$ are independently $C_2$-$C_{50}$ aromatic radicals; "b" is a number from 0 to 2; "d" is a number from 0 to 4; $R^3$ and $R^4$ are independently at each occurrence a halogen atom, a $C_1$-$C_{20}$ aliphatic radical, a $C_5$-$C_{20}$ cycloaliphatic radical, or a $C_2$-$C_{20}$ aromatic radical; Z is a bond, a divalent $C_1$-$C_{20}$ aliphatic radical, a divalent $C_5$-$C_{20}$ cycloaliphatic radical, a divalent $C_2$-$C_{20}$ aromatic radical, an oxygen linking group, a sulfur linking group, a $SO_2$ linking group, or a Se linking group; and $Ar^9$ is a $C_{10}$-$C_{200}$ aromatic radical, or a polymer chain comprising at least one aromatic group.

In this same vein, pyridinium salt XXXI

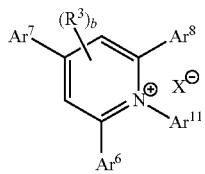

XXXI wherein $Ar^6$, $Ar^7$, and $Ar^8$ are independently $C_2$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; $Ar^{11}$ is a $C_2$-$C_{200}$ aromatic radical, or a polymer chain comprising at least one aromatic group; and $X^-$ is a charge balancing counterion;

is a quaternary organic salt comprising quaternary organic cation XXV

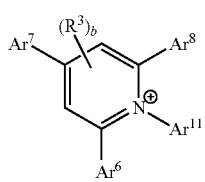

XXV wherein $Ar^6$, $Ar^7$, and $Ar^8$ are independently $C_2$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $Ar^{11}$ is a $C_2$-$C_{200}$ aromatic radical, or a polymer chain comprising at least one aromatic group.

Similarly, phenone-containing organophosphonium salt XXXVI

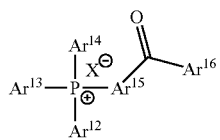

XXXVI wherein $Ar^{12}$, $Ar^{13}$, $Ar^{14}$ and $Ar^{15}$ are independently $C_2$-$C_{50}$ aromatic radicals; $Ar^{16}$ is a $C_2$-$C_{200}$ aromatic radical, or a polymer chain comprising at least one aromatic group; and $X^-$ is a charge balancing counterion; is a quaternary organic salt comprising a quaternary organic cation having structure

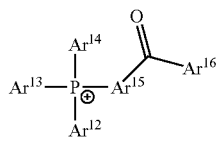

XXXIII wherein $Ar^{12}$, $Ar^{13}$, $Ar^{14}$ and $Ar^{15}$ are independently $C_2$-$C_{50}$ aromatic radicals; and $Ar^{16}$ is a $C_2$-$C_{200}$ aromatic radical, or a polymer chain comprising at least one aromatic group.

From the foregoing discussion and as one of ordinary skill in the art will appreciate, the structural features present in the various quaternary organic salts disclosed herein are reproduced in the corresponding quaternary organic cations. For example, the aromatic radical $Ar^1$ as defined in organophosphonium salt I, has the same meaning as aromatic radical $Ar^1$ in organophosphonium cation X. Thus, if $Ar^1$ is a phenyl group in organophosphonium salt I, it is also a phenyl group in organophosphonium cation X.

The organoclay compositions of the present invention comprise alternating inorganic silicate layers and organic layers. The inorganic silicate layers may be derived from any suitable source, for example natural clay. In one embodiment, the inorganic silicate layers are derived from synthetic clay. Suitable clays include kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, and combinations thereof. In a particular embodiment, the inorganic silicate layers are derived from montmorillonite clay.

The organoclay compositions provided by the present invention are characterized by an interlayer distance between the inorganic silicate layers of from 5 to about 100 Angstroms. In one embodiment, the organoclay compositions provided by the present invention are characterized by an interlayer distance between the inorganic silicate layers of from 10 to about 100 angstroms, and in another embodiment from about 20 to about 100 angstroms.

In one embodiment, the organoclay composition provided by the present invention are prepared by (a) contacting in a first reaction mixture a quaternary organic salt with a layered silicate in the presence of a solvent, and (b) isolating the product organoclay composition. In one embodiment, the quaternary organic salt is a organophosphonium salt having structure I. In another embodiment, the quaternary organic salt is a pyridinium salt having structure XV. In yet another embodiment, the quaternary organic salt is a pyridinium salt having structure XXXI. In yet still another embodiment, the quaternary organic salt is a phenone-containing organophosphonium salt having structure XXXVI.

As noted, the organoclay compositions provided by the present invention may be prepared by contacting a quaternary organic salt with a layered silicate in the presence of a solvent. In one embodiment, the layered silicate is a natural clay. In another embodiment, the layered silicate is a synthetic clay. In one embodiment, the layered silicate comprises an inorganic clay selected from the group consisting of kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, and combinations thereof. In another embodiment, the layered silicate comprises montmorillonite clay.

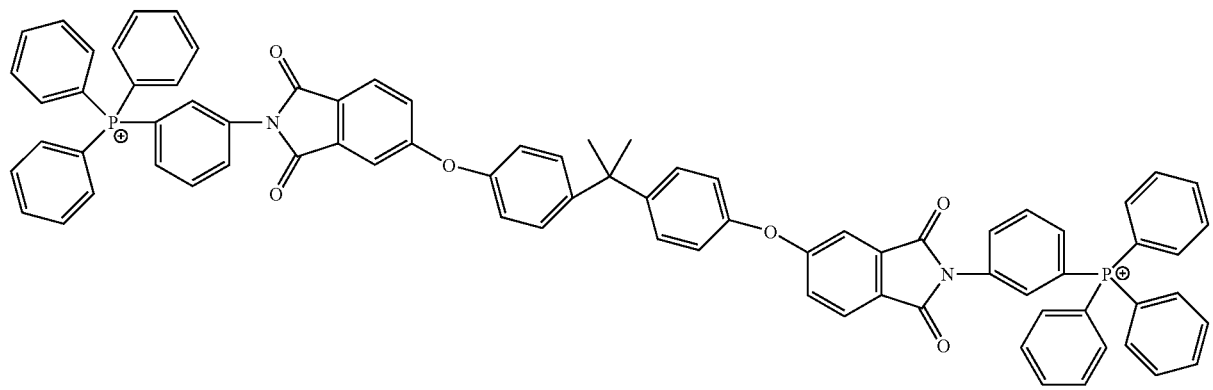

As noted, the organoclay compositions provided by the present invention may be prepared by contacting a quaternary organic salt with a layered silicate in the presence of a solvent. In one embodiment, the solvent employed comprises an organic solvent, for example acetone. In another embodiment, the solvent employed comprises water. In yet another embodiment, the solvent employed comprises both water and an organic solvent, for example aqueous methanol containing about 10 percent by weight water and about 90 percent by weight methanol.

The organoclay composition may be isolated using conventional techniques such as filtration, centrifugation, antisolvent precipitation, decantation, and the like. Various techniques suitable for isolating the organoclay compositions provided by the present invention are disclosed in the experimental part of this disclosure.

In one embodiment, the present invention provides an organoclay composition comprising alternating inorganic silicate layers and organic layers, said organic layers comprising a quaternary phosphonium cation having structure X

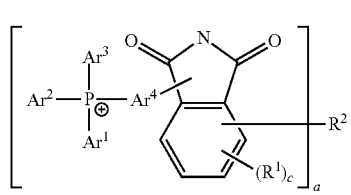

wherein $Ar^1$, $Ar^2$, and $Ar^3$ are independently $C_2$-$C_{50}$ aromatic radicals; $Ar^4$ is a bond or a $C_2$-$C_{50}$ aromatic radical; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a halogen atom, a $C_1$-$C_{20}$ aliphatic radical, a $C_5$-$C_{20}$ cycloaliphatic radical, a $C_2$-$C_{50}$ aromatic radical, or a polymer chain.

Organophosphonium cations X are illustrated by the cationic components of the organophosphonium salts disclosed in Table I.

In one embodiment, the quaternary phosphonium cation has structure XI.

In another embodiment, the quaternary phosphonium cation has structure XII.

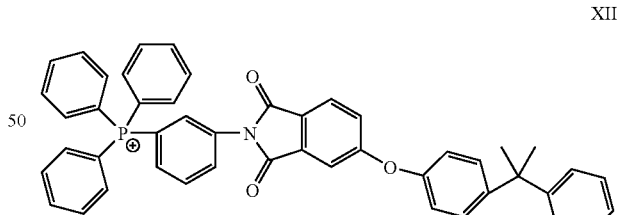

In one embodiment, the present invention provides an organoclay composition comprising a polymeric quaternary phosphonium cation. In one embodiment, the present invention provides an organoclay composition comprising a polymeric quaternary phosphonium cation having structure XIII

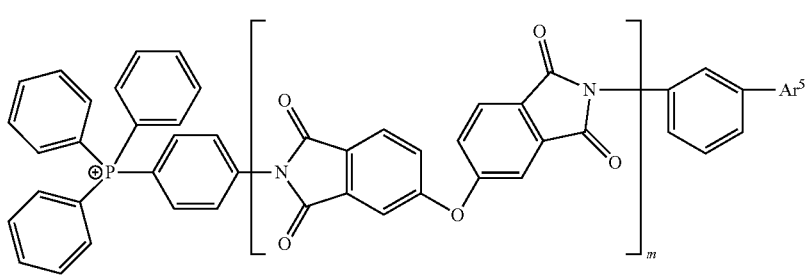

wherein m is a number in a range from about 10 to about 1000; and $Ar^5$ is a $C_2$-$C_{50}$ aromatic radical, or a polymer chain. In one embodiment, $Ar^5$ is an aromatic radical having structure XIV.

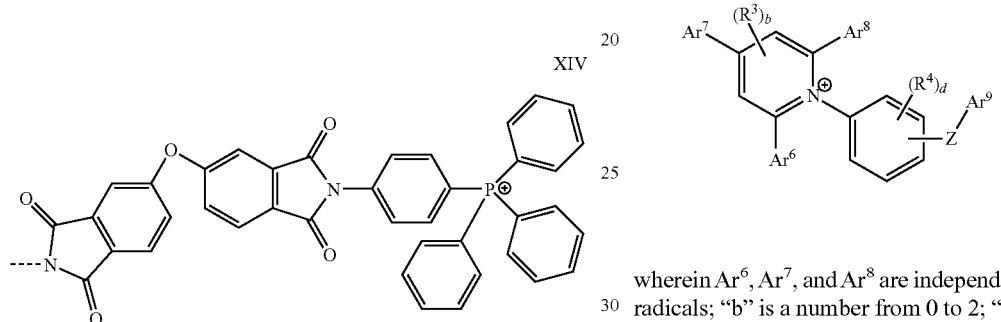

In one embodiment, the present invention provides an organoclay composition comprising alternating inorganic silicate layers and organic layers, said organic layers comprising a pyridinium cation having structure XXV

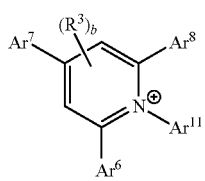

wherein $Ar^6$, $Ar^7$, and $Ar^8$ are independently $C_2$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $Ar^{11}$ is a $C_2$-$C_{200}$ aromatic radical, or a polymer chain comprising at least one aromatic group.

Pyridinium cations having structure XXV are illustrated by the cationic components of the pyridinium salts disclosed in Table III herein.

In one embodiment, the present invention provides an organoclay composition comprising alternating inorganic silicate layers and organic layers, said organic layers comprising a pyridinium cation having structure XXVI wherein $Ar^6$, $Ar^7$, and $Ar^8$ are independently $C_2$-$C_{50}$ aromatic radicals; "b" is a number from 0 to 2; "d" is a number from 0 to 4; $R^3$ and $R^4$ are independently at each occurrence a halogen atom, a $C_1$-$C_{20}$ aliphatic radical, a $C_5$-$C_{20}$ cycloaliphatic radical, or a $C_2$-$C_{20}$ aromatic radical; Z is a bond, a divalent $C_1$-$C_{20}$ aliphatic radical, a divalent $C_5$-$C_{20}$ cycloaliphatic radical, a divalent $C_2$-$C_{20}$ aromatic radical, an oxygen linking group, a sulfur linking group, a $SO_2$ linking group, or a Se linking group; and $Ar^9$ is a $C_{10}$-$C_{200}$ aromatic radical, or a polymer chain comprising at least one aromatic group.

Pyridinium cations having structure XXVI are illustrated by the cationic components of the pyridinium salts disclosed in Table II herein.

In one embodiment, the present invention provides an organoclay composition comprising a pyridinium cation having structure XXVII.

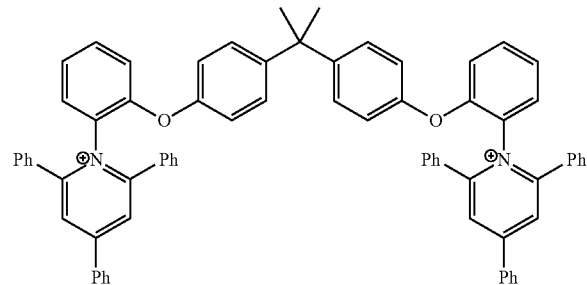

In another embodiment, the present invention provides an organoclay composition comprising a pyridinium cation having structure XXVIII.

XXVIII

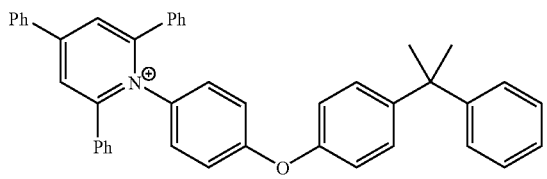

In one embodiment, the organoclay composition provided by the present invention comprises a polymeric quaternary organic cation which is a polymeric pyridinium cation. In one embodiment, the polymeric pyridinium cation comprises structure XXIX

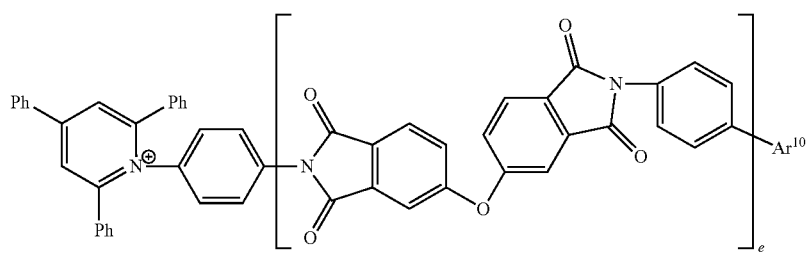

wherein the variable "e" is a number from about 10 to about 1000; and $Ar^{10}$ is a $C_2$-$C_{50}$ aromatic radical, or a polymer chain. In one embodiment, $Ar^{10}$ is a $C_{23}$ aromatic radical having structure XXX.

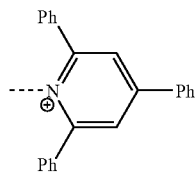

In another embodiment, the present invention provides an organoclay composition comprising a polymeric pyridinium cation having structure XXXII wherein "f" is a number from about 10 to about 1000. In a particular embodiment, "f" has a value of about 10. In another particular embodiment, "f" has a value of about 30.

In one embodiment, the present invention provides an organoclay composition comprising alternating inorganic silicate layers and organic layers, said organic layers comprising a quaternary phosphonium cation having structure XXXIII

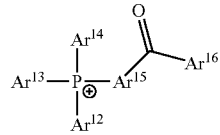

wherein $Ar^{12}$, $Ar^{13}$, $Ar^{14}$ and $Ar^{15}$ are independently $C_2$-$C_{50}$ aromatic radicals; and $Ar^{16}$ is a $C_2$-$C_{200}$ aromatic radical, or a polymer chain comprising at least one aromatic group.

Quaternary phosphonium cation having structure XXXIII are at times herein referred to as "phenone-containing organophosphonium cations". Quaternary phosphonium cations having structure XXXIII are illustrated by the cationic components of the organophosphonium salts disclosed in Table IV herein.

In one embodiment, the present invention provides an organoclay composition comprising a quaternary phosphonium cation having structure XXXIV.

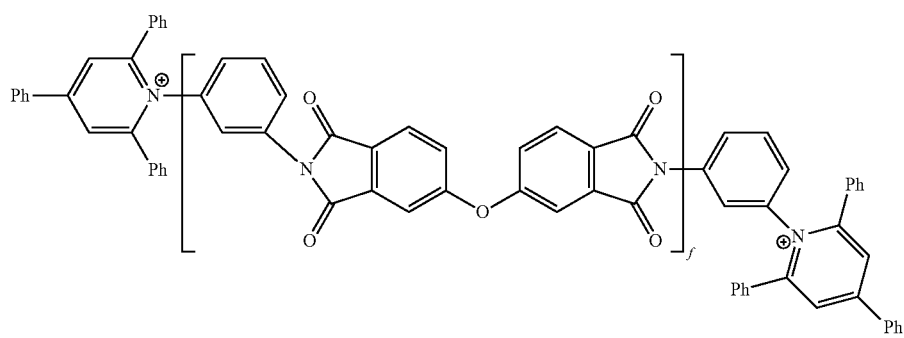

XXXIV

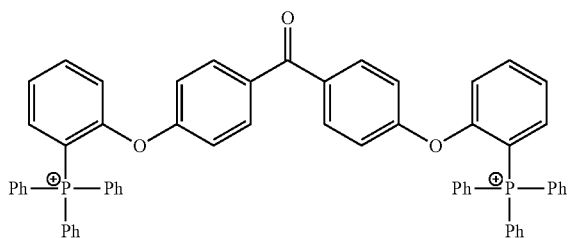

In another embodiment, the present invention provides an organoclay composition comprising a quaternary phosphonium cation having structure XXXV.

XXXV

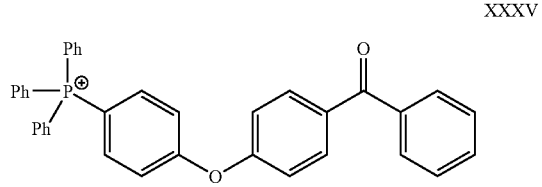

In yet another embodiment, the present invention provides an organoclay composition comprising a polymeric quaternary phosphonium cation having structure XXXVII Polymeric quaternary phosphonium cations having structure XXXVII are illustrated by the cationic components of the polymeric organophosphonium salts disclosed in Table V herein.

In one embodiment, the present invention provides a polymer-organoclay composite composition comprising (a) a polymeric resin and (b) an organoclay composition comprising alternating inorganic silicate layers and organic layers, wherein the organic layers comprise a quaternary organic cation.

In one embodiment, the polymeric resin comprises an amorphous thermoplastic polymer. In another embodiment, the polymeric resin comprises a crystalline thermoplastic polymer. In another embodiment, the polymeric resin comprises an amorphous thermoplastic polymer and a crystalline thermoplastic polymer. Amorphous thermoplastic polymers are illustrated by PPSU (polyphenylene sulfone), PEI (polyetherimide), PES (polyethersulfone), PC (Polycarbonate), PPO (polyphenylene ether), PMMA (poly methyl methacrylate), ABS, (acrylonitrile butadiene styrene), and PS (polystyrene). Crystalline thermoplastic resins are illustrated by PFA (perfluoro alkoxyalkane), MFA (co-polymer of tetrafluoro ethylene and perfluorinated vinyl ether), FEP (fluorinated ethylene propylene polymers), PPS (polyphenylene sulfide), PEK (polyether ketone), PEEK (polyether-ether ketone), ECTFE (ethylene chloro trifluoro ethylene), PVDF (polyvinylidene fluoride), PTFE (polytetrafluoroethylene), PET (polyethylene terephthalate), POM (polyacetal), PA (polyamide), UHMW-PE (ultra high molecular weight poly-

XXXVII

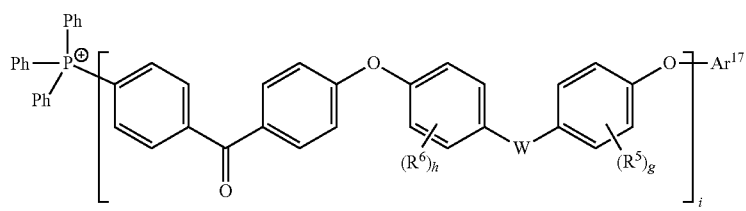

wherein "g" and "h" are independently a number from 0 to 4; W is a bond, a divalent $C_1$-$C_{20}$ aliphatic radical, a divalent $C_5$-$C_{20}$ cycloaliphatic radical, a divalent $C_2$-$C_{20}$ aromatic radical, an oxygen linking group, a sulfur linking group, a $SO_2$ linking group, or a Se linking group; $R^5$ and $R^6$ are independently at each occurrence a halogen atom, a $C_1$-$C_{20}$ aliphatic radical, a $C_5$-$C_{20}$ cycloaliphatic radical, or a $C_2$-$C_{20}$ aromatic radical; "i" is a number from about 10 to about 1000; and $Ar^{17}$ is a $C_{10}$-$C_{200}$ aromatic radical, or a polymer chain comprising at least one aromatic group. In one embodiment, $Ar^{17}$ is an aromatic radical having structure XXXVIII.

ethylene), PP (polypropylene), PE (polyethylene), HDPE (high density polyethylene), LDPE (low density polyethylene) and advanced engineering resins such as PBI (polybenzimidazole) and PAI (polyamide-imide), polyphenylenes, polybenzoxazoles, polybenzthiazoles, as well as blends and co-polymers thereof.

In one embodiment, the polymeric resin is selected from the group consisting of polyetherimides, polyamides, polyesters, polyarylene sulfides, polyarylene ethers, polyether sulfones, polyether ketones, polyether ether ketones, polyphenylenes, polycarbonates, and a combination comprising at least one of the foregoing polymers. In a particular embodiment, the polymeric resin comprises a polyetherimide resin, for example ULTEM, available from GE Plastics, Inc. In another particular embodiment, the polymeric resin comprises a polyphenylene resin, for example PRIMOSPIRE, available through Solvay, Inc. In yet another particular embodiment, the polymeric resin comprises polyether sulfone, for example RADEL A, available from Solvay, Inc. In still yet another particular embodiment, the polymeric resin comprises a polyether ketone.

The organoclay composition present in the polymer-organoclay composite composition is preferably highly exfoliated, meaning that the distance between inorganic silicate layers is large relative to the distance between the correspond-

XXXVIII

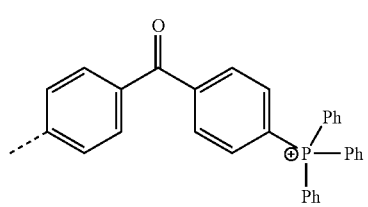

ing silicate layers in the same organoclay composition prior to its incorporation into the polymer matrix of the polymer-organoclay composite composition. The organoclay compositions provided by the present invention are designed to promote relatively facile separation of the silicate layers as the organoclay composition is subjected to a shearing force in the presence of a polymeric resin or a solvent. Thus, in one embodiment, the polymer-organoclay composite composition provided by the present invention comprises an organoclay composition comprising alternating inorganic silicate layers and organic layers wherein the alternating inorganic silicate layers are highly dispersed relative to the organoclay composition from which the silicate layers of the polymer-organoclay composite composition are derived.

In one embodiment, the polymer-organoclay composite composition provided by the present invention comprises inorganic silicate layers derived from an inorganic clay selected from the group consisting of kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, and combinations thereof. In one embodiment, the inorganic clay is first converted to an organoclay composition and the intermediate organoclay composition is then used in the preparation of the polymer-organoclay composite composition. In one embodiment, the organoclay composition employed in the preparation of the polymer-organoclay composite composition is characterized by an interlayer distance of from about 5 to about 100 Angstroms. Although a substantial amount of the organoclay composition employed may be highly exfoliated in the polymer-organoclay composite composition, at least a portion of the organoclay composition employed retains an interlayer distance in the 5 to about 100 Angstrom range.

In one embodiment, the present invention provides an article comprising a polymer-organoclay composite composition provided by the present invention. In one embodiment, the article is a film. In a particular embodiment, the article is an extruded film. In another particular embodiment, the article is a solvent cast film. Extruded films can be prepared using techniques described herein. Solvent cast films comprising a polymer-organoclay composite composition of the present invention may be prepared by art recognized methods.

In a particular embodiment, the present invention provides a solvent cast film comprising a polyetherimide having a dianhydride component and a diamine component and a glass transition temperature (Tg) between about 180° C. and 450° C., and wherein the film has: a) a CTE of less than 70 ppm/° C.; b) a thickness of between about 0.1 μm and 250 μm; and, c) contains less than 5% residual solvent by weight.

In one embodiment, the present invention provides a polymer-organoclay composite composition comprising a polymeric resin which is a polyetherimide having a dianhydride component and a diamine component. This means that the polyetherimide comprises structural units derived from at least one dianhydride and at least one diamine. Polyetherimides having a dianhydride component and a diamine component and a required Tg can be prepared by reacting one or more diamines with one or more dianhydrides under condensation polymerization conditions (e.g. refluxing orthodichorobenzene in a reaction vessel equipped to remove water of reaction in the presence of a catalyst sodium phenyl phosphinate (SPP)).

Suitable dianhydrides include:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy)diphenyl-2,2-propane dianhydride;
4-(2,3-dicarboxyphenoxy)-4'-(3,4-dicarboxyphenoxy)diphenyl ether dianhydride;
4-(2,3-dicarboxyphenoxy)-4'-(3,4-dicarboxyphenoxy)diphenyl sulfide dianhydride;
4-(2,3-dicarboxyphenoxy)-4'-(3,4-dicarboxyphenoxy)benzophenone dianhydride;
4-(2,3-dicarboxyphenoxy)-4'-(3,4-dicarboxyphenoxy)diphenyl sulfone dianhydride;
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride;
cyclobutane tetracarboxylic dianhydride;
cyclopentane tetracarboxylic dianhydride;
cyclohexane-1,2,5,6-tetracarboxylic dianhydride;
2,3,5-tricarboxycyclopentylacetic dianhydride;
5-(2,5-dioxotetrahydrofural)-3-methyl-3-cyclohexene-1,2-dicarboxylic dianhydride;
1,3,3a,5-dioxo-3-furanyl)-naphtho[1,2,-c]-furan-1,3-dione;
3,5,6-tricarboxynorbornane-2-acetic dianhydride;
2,3,4,5-tetrahydrofuran tetracarboxylic dianhydride;
3,3',4,4'-diphenyl tetracarboxylic dianhydride;
3,3',4,4'-benzophenonetetracarboxylic dianhydride;
naphthalic dianhydrides such as (2,3,6,7-naphthalic dianhydride etc.);
3,3',4,4'-biphenylsulphonictetracarboxylic dianhydride;
3,3',4,4'-biphenylethertetracarboxylic dianhydride;
3,3',4,4'-dimethyldiphenylsilane tetracarboxylic dianhydride;
4,4'-bis(3,4-dicarboxyphenoxy)diphenylsulfide dianhydride;
4,4'-bis(3,4-dicarboxyphenoxy)diphenylsulphone dianhydride;
4,4'-bis(3,4-dicarboxyphenoxy)diphenylpropane dianhydride;
3,3',4,4'-perfluoropyridenediphthalic dianhydride;
3,3', 4,4'-biphenyltetracarboxylic dianhydride;
bis(phthalic)phenylsulphineoxide dianhydride;
p-phenylene-bis(triphenylphthalic)dianhydride;
m-phenylene-bis(triphenylphthalic)dianhydride;
bis(triphenylphthalic)-4,4'-diphenylether dianhydride;
bis(triphenylphthalic)-4,4'-diphenylmethane dianhydride;
2,2'-bis-(3,4-dicarboxyphenyl)hexafluoro-propane dianhydride;
4,4'-oxydiphthalic anhydride;
pyromellitic dianhydride;
3,3',4,4'-diphenylsulfone tetracarboxylic dianhydride;
4',4'-bisphenol a dianhydride;
hydroquinnone diphthalic anhydride;

ethylene glycol bis trimellitic anhydride;
6,6'-bis(3,4-dicarboxyphenoxy)-2,2',3,3'-tetrahydro-3,3,3',3'-tetramethyl-1,1'-spirobi[1h-indene]dianhydride;
7,7'-bis(3,4-dicarboxyphenoxy)-3,3',4,4'-tetrahydro-4,4,4',4'-tetramethyl-2,2'-spirobi[2h-1-benzopyran]dianhydride;
1,1'-bis[1-(3,4-dicarboxyphenoxy)-2-methyl-4-phenyl]cyclohexane dianhydride;
3.3',4,4'-diphenylsulfone tetracarboxylic dianhydride;
3.3',4,4'-diphenylsulfide tetracarboxylic dianhydride;
3.3',4,4'-diphenylsulfoxide tetracarboxylic dianhydride;
3,4'-oxydiphthalic anhydride;
3,3'-oxydiphthalic anhydride;
3,3'-benzophenone tetracarboxylic dianhydride;
4,4'-carbonyldiphthalic anhydride;
3.3',4,4'-diphenylmethane tetracarboxylic dianhydride;
2,2-bis(4-(3,3-dicarboxyphenyl)propane dianhydride;
2,2-bis(4-(3,3-dicarboxyphenyl)hexafluoropropane dianhydride;
(3,3',4,4'-diphenyl)phenylphosphine tetracarboxylic dianhydride;
(3,3',4,4'-diphenyl)phenylphosphineoxide tetracarboxylic dianhydride;
2,2'-dichloro-3,3',4,4'-biphenyltetracarboxylic dianhydride;
2,2'-dimethyl-3,3',4,4'-biphenyltetracarboxylic dianhydride;
2,2'-dicyano-3,3',4,4'-biphenyltetracarboxylic dianhydride;
2,2'-dibromo-3,3',4,4'-biphenyltetracarboxylic dianhydride;
2,2'-diiodo-3,3',4,4'-biphenyltetracarboxylic dianhydride;
2,2'-ditrifluoromethyl-3,3',4,4'-biphenyltetracarboxylic dianhydride;
2,2'-bis(1-methyl-4-phenyl)-3,3',4,4'-biphenyltetracarboxylic dianhydride;
2,2'-bis(1-trifluoromethyl-2-phenyl)-3,3',4,4'-biphenyltetracarboxylic dianhydride;
2,2'-bis(1-trifluoromethyl-3-phenyl)-3,3',4,4'-biphenyltetracarboxylic dianhydride;
2,2'-bis(1-trifluoromethyl-4-phenyl)-3,3',4,4'-biphenyltetracarboxylic dianhydride;
2,2'-bis(1-phenyl-4-phenyl)-3,3',4,4'-biphenyltetracarboxylic dianhydride;
4,4'-bisphenol a dianhydride;
5,5'-[1,4-phenylenebis(oxy)]bis[1,3-isobenzofurandione];
3,3',4,4'-diphenylsulfoxide tetracarboxylic dianhydride;
4,4'-carbonyldiphthalic anhydride;
3,3',4,4'-diphenylmethane tetracarboxylic dianhydride;
2,2'-bis(1,3-trifluoromethyl-4-phenyl)-3,3',4,4'-biphenyltetracarboxylic dianhydride;
isomers thereof; and combinations thereof.

Suitable diamines include: ethylenediamine; propylenediamine; trimethylenediamine; diethylenetriamine; triethylenetetramine; hexamethylenediamine; heptamethylenediamine; octamethylenediamine; nonamethylenediamine; decamethylenediamine; 1,12-dodecanediamine; 1,18-octadecanediamine; 3-methylheptamethylenediamine; 4,4-dimethylheptamethylenediamine; 4-methylnonamethylenediamine; 5-methylnonamethylenediamine; 2,5-dimethylhexamethylenediamine; 2,5-dimethylheptamethylenediamine; 2,2-dimethylpropylenediamine; N-methyl-bis(3-aminopropyl)amine; 3-methoxyhexamethylenediamine; 1,2-bis(3-aminopropoxy)ethane; bis(3-aminopropyl)sulfide; 1,4-cyclohexanediamine; bis-(4-aminocyclohexyl)methane; m-phenylenediamine; p-phenylenediamine; 2,4-diaminotoluene; 2,6-diaminotoluene; m-xylylenediamine; p-xylylenediamine; 2-methyl-4,6-diethyl-1,3-phenylene-diamine; 5-methyl-4,6-diethyl-1,3-phenylene-diamine; benzidine; 3,3'-dimethylbenzidine; 3,3'-dimethoxybenzidine; 1,5-diaminonaphthalene; bis(4-aminophenyl)methane; bis(2-chloro-4-amino-3,5-diethylphenyl)methane; bis(4-aminophenyl)propane; 2,4-bis(b-amino-t-butyl) toluene; bis(p-b-amino-t-butylphenyl)ether; bis(p-b-methyl-o-aminophenyl)benzene, bis(p-b-methyl-o-aminopentyl)benzene, 1,3-diamino-4-isopropylbenzene, bis(4-aminophenyl)sulfide, bis(4-aminophenyl)sulfone, bis(4-aminophenyl)ether, and, 1,3-bis(3-aminopropyl)tetramethyldisiloxane; 4,4'-diaminodiphenylpropane; 4,4'-diaminodiphenylmethane (4,4'-methylenedianiline); 4,4'-diaminodiphenyl sulfide; 4,4'-diaminodiphenyl sulfone; 3,3'-diaminodiphenyl sulfone; 4,4'-diaminodiphenyl sulfide; 3,3'-diaminodiphenyl sulfide; 4,4'-diaminodiphenyl ether (4,4'-oxydianiline); 1,5-diaminonaphthalene; 3,3'dimethylbenzidine; 3-methylhaptamethylenediamine; 4,4-dimethylhaptamethylenediamine; 2,11-dodecanediamine; octamethylenediamine; bis(3-aminopropyl)tetramethyldisiloxane; bis(4-aminobutyl)tetramethyldisiloxane; bis(p-amino-t-butylphenyl)ether; bis(p-methyl-o-aminophenyl)benzene; bis(p-methyl-o-aminopentyl)benzene; 2,2',3,3'-tetrahydro-3,3,3',3'-tetramethyl-1,1'-spirobi[1H-indene]-6,6'-diamine; 3,3',4,4'-tetrahydro-4,4,4',4'-tetramethyl-2,2'-spirobi[2H-1-benzopyran]-7,7'-diamine; 1,1'-bis[1-amino-2-methyl-4-phenyl]cyclohexane; isomers thereof, and combinations thereof.

The polymer-organoclay composite compositions provided by the present invention comprise an organoclay composition. In one embodiment, the organoclay compositions employed are those organoclay compositions provided by the present invention. Thus, in one embodiment, the polymer-organoclay composite composition comprises at least one organoclay composition comprising a quaternary organic cation selected from the group consisting of organophosphonium cations having structure X, pyridinium cations having structure XXV, pyridinium cations having structure XXVI, and phenone-containing organophosphonium cations having structure XXXIII.

Thus, in one embodiment, the present invention provides a polymer-organoclay composite composition (a) a polymeric resin; and (b) an organoclay composition comprising alternating inorganic silicate layers and organic layers, said organic layers comprising a quaternary phosphonium cation having structure X. In another embodiment, the present invention provides a polymer-organoclay composite composition (a) a polymeric resin; and (b) an organoclay composition comprising alternating inorganic silicate layers and organic layers, said organic layers comprising a quaternary phosphonium cation having structure XI. In yet another embodiment, the present invention provides a polymer-organoclay composite composition (a) a polymeric resin; and (b) an organoclay composition comprising alternating inorganic silicate layers and organic layers, said organic layers comprising a quaternary phosphonium cation having structure XII.

In one embodiment, the present invention provides an article comprising a polymer-organoclay composite composition, said composition comprising (a) a polymeric resin; and (b) an organoclay composition comprising alternating inorganic silicate layers and organic layers, said organic layers comprising a quaternary phosphonium cation having structure X.

In another embodiment, the present invention provides a method for the preparation of a polymer-organoclay composite composition, said method comprising contacting under melt mixing conditions a polymeric resin and an organoclay composition comprising alternating inorganic silicate layers and organic layers, said organic layers comprising a quaternary phosphonium cation having structure X.

In one embodiment, the present invention provides a polymer-organoclay composite composition (a) a polymeric resin; and (b) an organoclay composition comprising alternating inorganic silicate layers and organic layers, said organic layers comprising a pyridinium cation having structure XXV. In another embodiment, the present invention provides a polymer-organoclay composite composition (a) a polymeric resin; and (b) an organoclay composition comprising alternating inorganic silicate layers and organic layers, said organic layers comprising a pyridinium cation having structure XXVI. In yet another embodiment, the present invention provides a polymer-organoclay composite composition (a) a polymeric resin; and (b) an organoclay composition comprising alternating inorganic silicate layers and organic layers, said organic layers comprising a pyridinium cation having structure XXVII. In still yet another embodiment, the present invention provides a polymer-organoclay composite composition (a) a polymeric resin; and (b) an organoclay composition comprising alternating inorganic silicate layers and organic layers, said organic layers comprising a pyridinium cation having structure XXVIII.

In one embodiment, the present invention provides an article comprising a polymer-organoclay composite composition, said composition comprising (a) a polymeric resin; and (b) an organoclay composition comprising alternating inorganic silicate layers and organic layers, said organic layers comprising a pyridinium cation having structure XXV. In another embodiment, the present invention provides an article comprising a polymer-organoclay composite composition, said composition comprising (a) a polymeric resin; and (b) an organoclay composition comprising alternating inorganic silicate layers and organic layers, said organic layers comprising a pyridinium cation having structure XXVI.

In another embodiment, the present invention provides a method for the preparation of a polymer-organoclay composite composition, said method comprising contacting under melt mixing conditions a polymeric resin and an organoclay composition comprising alternating inorganic silicate layers and organic layers, said organic layers comprising a pyridinium cation having structure XXV. In another embodiment, the present invention provides a method for the preparation of a polymer-organoclay composite composition, said method comprising contacting under melt mixing conditions a polymeric resin and an organoclay composition comprising alternating inorganic silicate layers and organic layers, said organic layers comprising a pyridinium cation having structure XXVI.

Thus, in one embodiment, the present invention provides a polymer-organoclay composite composition (a) a polymeric resin; and (b) an organoclay composition comprising alternating inorganic silicate layers and organic layers, said organic layers comprising a quaternary phosphonium cation having structure XXXIII. In another embodiment, the present invention provides a polymer-organoclay composite composition (a) a polymeric resin; and (b) an organoclay composition comprising alternating inorganic silicate layers and organic layers, said organic layers comprising a quaternary phosphonium cation having structure XXXIV. In yet another embodiment, the present invention provides a polymer-organoclay composite composition (a) a polymeric resin; and (b) an organoclay composition comprising alternating inorganic silicate layers and organic layers, said organic layers comprising a quaternary phosphonium cation having structure XXXV.

In one embodiment, the present invention provides an article comprising a polymer-organoclay composite composition, said composition comprising (a) a polymeric resin; and (b) an organoclay composition comprising alternating inorganic silicate layers and organic layers, said organic layers comprising a quaternary phosphonium cation having structure XXXIII.

In another embodiment, the present invention provides a method for the preparation of a polymer-organoclay composite composition, said method comprising contacting under melt mixing conditions a polymeric resin and an organoclay composition comprising alternating inorganic silicate layers and organic layers, said organic layers comprising a quaternary phosphonium cation having structure XXXIII.

Melt Mixing Routes to Polymer-Organoclay Composite Composition

In one embodiment, the present invention provides a method for the preparation of a polymer-organoclay composite composition comprising melt mixing a quaternary organoclay composition comprising alternating inorganic silicate layers and organic layers, said organic layers comprising a quaternary organic cation with a polymeric resin at a temperature in a range between about 300° C. and about 450° C. to provide a polymer-organoclay composite composition, said polymer-organoclay composite composition being characterized by a percent exfoliation of at least 10 percent. A quaternary organoclay composition is an organoclay composition comprising a quaternary organic cation, for example, an organophosphonium cation having structure X.

There is no particular limitation on the quaternary organic cation employed, other than it must be sufficiently stable during the melt mixing step to enable a significant level of exfoliation of the organoclay composition in the polymer matrix. A quaternary organic cation is considered stable if more than about 90 percent of the quaternary organic cation remains following a melt mixing step of duration and intensity sufficient to achieve a percent exfoliation of at least 10 percent. In one embodiment, the quaternary organic cation has structure XXXIX

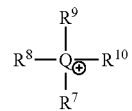

XXXIX wherein Q is nitrogen or phosphorous; and $R^7$, $R^8$, $R^9$, and $R^{10}$ are independently a $C_1$-$C_{20}$ aliphatic radical, a $C_5$-$C_{20}$ cycloaliphatic radical, a $C_2$-$C_{20}$ aromatic radical, or a polymer chain. In one embodiment, the quaternary organic cation having structure XXXIX is a quaternary phosphonium cation, for example the tetraphenyl phosphonium cation, TPP. In another embodiment, the quaternary organic cation having structure XXXIX is a quaternary phosphonium cation having structure X. In yet another embodiment, the quaternary organic cation having structure XXXIX is a quaternary phosphonium cation having structure XXXIII.

In one embodiment, the quaternary organic cation having structure XXXIX is a quaternary ammonium cation, for example the tetraphenylammonium cation, TPA.

In one embodiment, the quaternary organic cation is a pyridinium cation having structure XXV. In another embodiment, the quaternary organic cation is a pyridinium cation having structure XXVI.

In one embodiment, the inorganic silicate layers are derived from an inorganic clay selected from the group consisting of kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite chlorite, and combinations thereof. Typically, the inorganic clay is first converted to an organoclay composition comprising the quaternary organic cation. In some embodiments, the organoclay composition may be prepared in the presence of the polymeric resin. Suitable organoclay compositions include those organoclay compositions disclosed herein. In one embodiment, the organoclay composition employed is characterized by an interlayer distance of from about 5 to about 100 Angstroms. Under such circumstances, at least a portion of the product polymer-organoclay composite composition will be characterized by a an interlayer distance of from about 5 to about 100 Angstroms as well.

In one embodiment, the polymer-organoclay composite composition prepared by melt mixing a quaternary organoclay composition comprising a quaternary organic cation with a polymeric resin at a temperature in a range between about 300° C. and about 450° C. comprises a polyarylene sulfide, for example polyphenylene sulfide (PPS). In another embodiment, the polymer-organoclay composite composition prepared by melt mixing a quaternary organoclay composition comprising a quaternary organic cation with a polymeric resin at a temperature in a range between about 300° C. and about 450° C. comprises a polyethersulfone, for example a copolymer comprising structural units derived from bisphenol A and bis(4-chlorophenyl)sulfone. In yet another embodiment, the polymer-organoclay composite composition prepared by melt mixing a quaternary organoclay composition comprising a quaternary organic cation with a polymeric resin at a temperature in a range between about 300° C. and about 450° C. comprises a polyether ketone, for example a copolymer comprising structural units derived from bisphenol A and 4,4'-dichlorobenzophenone.

The melt mixing may be carried out using any melt mixing technique which combines the ability to heat the organoclay composition and the polymeric resin at a temperature in a range between about 300° C. and about 450° C. under sufficient shear to achieve a percent exfoliation of the organoclay composition in the polymeric resin of at least 10 percent. Typically, an extruder may be used to effect melt mixing. In one embodiment, the extruder is a vented, twin-screw extruder. In another embodiment, the extruder is a vented, single screw reciprocating extruder. In one embodiment, melt mixing is carried out in a kneader. In one embodiment, melt mixing is of sufficient duration and intensity to achieve a percent exfoliation of the organoclay composition in the polymeric resin of at least 20 percent. In yet another embodiment, melt mixing is of sufficient duration and intensity to achieve a percent exfoliation of the organoclay composition in the polymeric resin of at least 30 percent.

In one embodiment, the present invention provides an article comprising a polymer-organoclay composite composition prepared by melt mixing (a) a quaternary organoclay composition comprising alternating inorganic silicate layers and organic layers, the organic layers comprising a quaternary organic cation; with (b) a polymeric resin a temperature in a range between about 300° C. and about 450° C. under sufficient shear to achieve a percent exfoliation of the organoclay composition in the polymeric resin of at least 10 percent.

In one embodiment, the present invention provides a method of making a polymer-organoclay composite composition comprising melt mixing a quaternary organoclay composition comprising alternating inorganic silicate layers and organic layers, said organic layers comprising a quaternary organic cation with a polymeric resin comprising at least one polymer selected from the group consisting of polyamides, polyesters, polyarylene sulfides, polyarylene ethers, polyether sulfones, polyether ketones, polyether ether ketones, polyphenylenes, and polycarbonates, said polymeric resin being substantially free of polyetherimides; said melt mixing being carried out at a temperature in a range between about 300° C. and about 450° C. to provide a polymer-organoclay composite composition, said polymer-organoclay composite composition being characterized by a percent exfoliation of at least 10 percent. A polymeric resin is substantially free of polyetherimides when it contains less than 5 weight percent polyetherimide based upon a total weight of the polymeric resin. Polymeric resins which contain 0 weight percent polyetherimide are also said to be substantially free of polyetherimides.

In another embodiment, the present invention provides an article comprising a polymer-organoclay composite composition, the polymer-organoclay composite composition comprising (a) a quaternary organoclay composition comprising alternating inorganic silicate layers and organic layers, the organic layers comprising a quaternary organic cation; and (b) a polymeric resin comprising at least one polymer selected from the group consisting of polyamides, polyesters, polyarylene sulfides, polyarylene ethers, polyether sulfones, polyether ketones, polyether ether ketones, polyphenylenes, and polycarbonates; the polymeric resin being substantially free of polyetherimides; wherein the polymer-organoclay composite composition is characterized by a percent exfoliation of at least 10 percent. In one embodiment, the article is a film. In another embodiment, the article is a solvent cast film comprising a polyetherimide having a dianhydride component and a diamine component and a Tg of between about 180° C. and 450° C., and wherein the film has: a) a CTE of less than 70 ppm/° C.; b) a thickness of between about 0.1 µm and 250 µm; and, c) contains less than 5% residual solvent by weight.

In one embodiment, the present invention provides a method for making a polymer-organoclay composite composition comprising melt mixing in an extruder, a quaternary organoclay composition comprising alternating inorganic silicate layers and organic layers, said organic layers comprising a quaternary organic cation with a polymeric resin comprising a polyether sulfone, said polymeric resin being substantially free of polyetherimide; said melt mixing being carried out at a temperature in a range between about 300° C. and about 450° C. to provide a polymer-organoclay composite composition, said polymer-organoclay composite composition being characterized by a percent exfoliation of at least 10 percent. In one embodiment, the quaternary organic cation has structure X. In another embodiment, the quaternary organic cation has structure XXV. In another embodiment, the quaternary organic cation has structure XXVI. In yet another embodiment, the quaternary organic cation has structure XXXIII.

In one embodiment, the present invention provides a method of making a polymer-organoclay composite composition comprising melt mixing a quaternary organoclay composition comprising alternating inorganic silicate layers and organic layers, said organic layers comprising a quaternary organic cation with a polyetherimide composition; said melt mixing being carried out at a temperature in a range between about 300° C. and about 450° C. to provide a polymer-organoclay composite composition, said polymer-organoclay composite composition being characterized by a percent exfoliation of at least 10 percent. In one embodiment, the quaternary organic cation has structure X. In another embodiment, the quaternary organic cation has structure XXV. In another embodiment, the quaternary organic cation has structure XXVI. In yet another embodiment, the quaternary organic cation has structure XXXIII. In one embodiment, the polyetherimide composition further comprises at least one polymer selected from the group consisting of polyvinyl chloride, a polyolefin, a polyester, a polyamide, a polysulfone, a polyether sulfone, a polyphenylene sulfide, a polyether ketone, a polyether ether ketone, an ABS, a polystyrene, a polybutadiene, a poly(acrylate), a poly(alkylacrylate), a polyacrylonitrile, a polyacetal, a polycarbonate, a polyphenylene ether, an ethylene-vinyl acetate copolymer, a polyvinyl acetate, a liquid crystal polymer, an aromatic polyester, an ethylene-tetrafluoroethylene copolymer, a polyvinyl fluoride, a polyvinylidene fluoride, a polyvinylidene chloride, a polytetrafluoroethylene, and a combination comprising at least one of the foregoing polymers. In one embodiment, the polyetherimide composition comprises a polyether sulfone. In another embodiment, the polyetherimide composition comprises a polyether ketone.

In one embodiment, the present invention provides an article comprising a polymer-organoclay composite composition (a) a quaternary organoclay composition comprising alternating inorganic silicate layers and organic layers, the organic layers comprising a quaternary organic cation; and (b) a polyetherimide composition, wherein the polymer-organoclay composite composition is characterized by a percent exfoliation_of at least 10 percent. Suitable polyetherimide compositions include ULTEM polyetherimide available from GE Plastics.

In one embodiment, the present invention provides a method of making a polymer-organoclay composite composition comprising melt mixing in an extruder, a quaternary organoclay composition comprising alternating inorganic silicate layers and organic layers, said organic layers comprising a quaternary organic cation, with a polyetherimide composition comprising at least one polyetherimide and at least one additional polymer selected from the group consisting of polyamides, polyesters, polyarylene sulfides, polyarylene ethers, polyether sulfones, polyether ketones, polyether ether ketones, polyphenylenes, and polycarbonates; said melt mixing being carried out at a temperature in a range between about 300° C. and about 450° C. to provide a polymer-organoclay composite composition, said polymer-organoclay composite composition being characterized by a percent exfoliation of at least 10 percent. In one embodiment, the quaternary organic cation has structure X. In another embodiment, the quaternary organic cation has structure XXV. In another embodiment, the quaternary organic cation has structure XXVI. In yet another embodiment, the quaternary organic cation has structure XXXIII.

In Situ Polymerization Route to Polymer-Organoclay Composite Compositions

In one embodiment, the present invention provides methodology for the preparation of polymer-organoclay composite compositions using in situ polymerization techniques to create a polymeric resin in the presence of an organoclay composition. The methodology developed presents various advantages, among them intimate contact between the organoclay composition and the nascent polymeric resin.

Thus in one aspect the present invention provides a method of making a polymer-organoclay composite composition, said method comprising (a) contacting under condensation polymerization conditions a first monomer, a second monomer, a solvent, and an organoclay composition, said organoclay composition comprising alternating inorganic silicate layers and organic layers, to provide a first polymerization reaction mixture, wherein one of said first monomer and second monomers is a diamine and the other is a dianhydride; (b) carrying out a stoichiometry verification step on the first polymerization reaction mixture; (c) optionally adding additional reactant to the first polymerization reaction mixture to provide a second polymerization reaction mixture; and (d) removing solvent from the first polymerization reaction mixture or the second polymerization reaction mixture to provide a first polymer-organoclay composite composition comprising a polymer component and an organoclay component wherein the organoclay component is at least 10% exfoliated. In one embodiment, the polymer component is a polyetherimide.

In one embodiment, the polymerization is carried out in the presence of a catalyst, for example sodium phenyl phosphinate (SPP).

In one embodiment, the first monomer is a dianhydride and the second monomer is a diamine. Suitable diamines and dianhydrides include those disclosed herein, for example BPADA and metaphenylene diamine.

Suitable solvents include aromatic solvents such as orthodichorobenzene, toluene, xylene, chlorobenzene, and combinations of the foregoing solvents.

The organoclay composition can be any of the organoclay compositions disclosed herein.

The verification of stoichiometry step may be carried out using any analytical technique suitable for determining accurately the ratio of the first monomer to the second monomer in the first reaction mixture. For example the ratio of the first monomer to the second monomer in the first reaction mixture may be determined by infrared analysis of a film prepared from an aliquot sample take from the first reaction mixture as described in the experimental section of the present disclosure. Alternatively, the ratio of the first monomer to the second monomer in the first reaction mixture may be determined by art recognized techniques such as high performance liquid chromatography (HPLC), Nuclear Magnetic Resonance (NMR), and end-group titration. The verification of stoichiometry step is important since careful control of the reaction stoichiometry must be exercised in order to achieve one or more target characteristics of the product polymer-organoclay composite composition. In one embodiment, the stoichiometry verification step comprises determining an amine to anhydride ratio.

If after the verification of stoichiometry step a deficiency in one the monomers is detected, additional monomer can be added. Alternatively, the verification of stoichiometry step can signal the need for the addition of another reagent such as a chain stopper. When additional reactant is added to the first polymerization reaction mixture, it is deemed to constitute a second polymerization reaction mixture which may be further reacted by heating, for example.

Following completion of the polymerization reaction, solvent is removed to provide a first polymer-organoclay composite composition comprising a polymer component and an organoclay component wherein the organoclay component is at least 10% exfoliated. Solvent removal may be effected by art recognized techniques such as distillation, filtration, antisolvent precipitation followed by filtration and the like. In one embodiment, removing the solvent from the first polymerization reaction mixture or the second polymerization reaction mixture is carried out using a devolatilizing extruder, a wiped film evaporator, or a combination thereof.

In one embodiment, the first polymer-organoclay composite composition is further subjected to a step of melt mixing at a temperature in a range between about 300° C. and about 450° C. In certain embodiments such melt mixing further enhances the degree of exfoliation of the organoclay component of the polymer-organoclay composite composition.

In one embodiment, contacting under condensation polymerization conditions comprises heating at a temperature greater than 100° C. In an alternate embodiment, contacting under condensation polymerization conditions comprises heating at a temperature less than 100° C. In another embodiment, contacting under condensation polymerization conditions comprises heating in the presence of a solvent and a catalyst at a temperature greater than 100° C. In an alternate embodiment, contacting under condensation polymerization conditions comprises heating in the presence of a solvent and a catalyst at a temperature less than 100° C.

In one embodiment, the first monomer is a dianhydride having structure XL

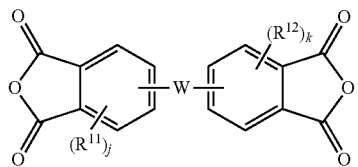

XL wherein "j" and "k" are independently a number from 0 to 3; $R^{11}$ and $R^{12}$ are independently at each occurrence a halogen atom, a $C_1$-$C_{20}$ aliphatic radical, a $C_5$-$C_{20}$ cycloaliphatic radical, or a $C_2$-$C_{20}$ aromatic radical; and W is a bond, a divalent $C_1$-$C_{20}$ aliphatic radical, a divalent $C_5$-$C_{20}$ cycloaliphatic radical, a divalent $C_2$-$C_{20}$ aromatic radical, an oxygen linking group, a sulfur linking group, a $SO_2$ linking group, or a Se linking group.

In one embodiment, the dianhydride XL is selected from the group consisting of bisphenol A dianhydride (BPADA), 4,4'-oxydiphthalic anhydride (4,4'-ODPA), 3,4'-oxydiphthalic anhydride (3,4'-ODPA), 3,3'-oxydiphthalic anhydride (3,3'-ODPA), 4,4'-biphenyl dianhydride, 3,4'-biphenyl dianhydride, combinations thereof.

In another embodiment, the dianhydride employed is any of the dianhydrides disclosed herein.

In one embodiment, the second monomer is a diamine selected from any of the diamines disclosed herein, for example meta-phenylenediamine. In one embodiment, the second monomer is an aromatic diamine. In one embodiment, the aromatic diamine is selected from the group consisting of metaphenylene diamine, paraphenylene diamine, 4,4'-diaminodiphenyl sulfone, and 4,4'-oxydianiline.

In one embodiment, the organoclay composition comprises a quaternary organic cation. In one embodiment, the quaternary organic cation has structure XXXIX

XXXIX

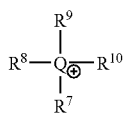

wherein Q is nitrogen or phosphorous; and $R^7$, $R^8$, $R^9$, and $R^{10}$ are independently a $C_1$-$C_{20}$ aliphatic radical, a $C_5$-$C_{20}$ cycloaliphatic radical, a $C_2$-$C_{20}$ aromatic radical, or a polymer chain. Organoclay compositions comprising quaternary organic cations XXXIX are in certain instances commercially available. Alternatively, organoclay composition comprising quaternary organic cations XXXIX may be prepared using techniques disclosed herein.

In one embodiment, the quaternary organic cation is selected from the group consisting of decyl trimethyl ammonium cation, dodecyl trimethyl ammonium cation, tetradecyl trimethyl ammonium cation, hexadecyl trimethyl ammonium cation, octadecyl trimethyl ammonium cation, and combinations thereof.

In one embodiment, the organoclay composition comprises a non-quaternary organic cation, for example a protonated aromatic amine.

As noted, the organoclay composition, employed comprises alternating inorganic silicate layers and organic layers. The inorganic silicate layers, as taught herein may be derived from inorganic clay materials. In one embodiment, the inorganic silicate layers are derived from an inorganic clay selected from the group consisting of kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, and combinations thereof.

In one embodiment, the present invention provides a method of making a polymer-organoclay composite composition comprising (a) contacting a dianhydride with a diamine in a solvent at a temperature in a range between about 105° C. and about 250° C. in the presence of an organoclay composition, said organoclay composition comprising alternating inorganic silicate layers and organic layers, to provide a first polymerization reaction mixture; (b) determining an amine to anhydride ratio in the first polymerization reaction mixture; (c) optionally adding additional dianhydride or diamine to the first polymerization reaction mixture to provide a second polymerization reaction mixture; and (d) removing solvent from the first polymerization reaction mixture or the second polymerization reaction mixture using a devolatilizing extruder to provide a first polymer-organoclay composite composition comprising a polymer component and an organoclay component wherein the organoclay component is at least 10% exfoliated. In one embodiment, the method further comprises a step of melt mixing the first polymer-organoclay composition at a temperature in a range between about 300° C. and about 450° C.

In one embodiment, the present invention provides a method of making a polyetherimide-organoclay composite composition comprising (a) contacting bisphenol A dianhydride (BPADA) with a diamine in orthodichlorobenzene at a temperature in a range between about 125° C. and about 250° C. in the presence of an organoclay composition, said organoclay composition comprising alternating inorganic silicate layers and organic layers, to provide a first polymerization reaction mixture; (b) determining an amine to anhydride ratio in the first polymerization reaction mixture; (c) optionally adding additional dianhydride or diamine to the first polymerization reaction mixture to provide a second polymerization reaction mixture; and (d) removing orthodichlorobenzene from the first polymerization reaction mixture or the second polymerization reaction mixture using a devolatilizing extruder to provide a first polymer-organoclay composite composition comprising a polymer component and an organoclay component wherein the organoclay component is at least 10% exfoliated. In one embodiment, the organoclay composition has structure X.

In one embodiment, the present invention provides a method of making a polyetherimide-organoclay composite composition comprising (a) contacting 4,4'-oxydiphthalic anhydride (4,4'-ODPA) with a diamine in orthodichlorobenzene at a temperature in a range between about 125° C. and about 250° C. in the presence of an organoclay composition, said organoclay composition comprising alternating inorganic silicate layers and organic layers, to provide a first polymerization reaction mixture; (b) determining an amine to anhydride ratio in the first polymerization reaction mixture; (c) optionally adding additional dianhydride or diamine to the first polymerization reaction mixture to provide a second polymerization reaction mixture; and (d) removing orthodichlorobenzene from the first polymerization reaction mixture or the second polymerization reaction mixture using a devolatilizing extruder to provide a first polymer-organoclay composite composition comprising a polymer component and an organoclay component wherein the organoclay component is at least 10% exfoliated.

EXAMPLES

The following examples are intended only to illustrate methods and embodiments in accordance with the invention, and as such should not be construed as imposing limitations upon the claims.

Bisphenol A dianahydride (BPADA, CAS No. 38103-06-9) (97.7% purity) was obtained from GE Plastics. 4,4'-Oxydiphthalicanhydride (ODPA, CAS No. 1823-59-2) (99% purity) was from Chriskev Company, Lenexa, Kans., USA.

2,4,6-triphenyl-pyrylium tetrafluoroborate, aniline, 4-phenoxyaniline, 4-cumylphenol, potassium carbonate, 1-fluoro-4-nitro-benzene, palladium on carbon, and ammonium formate were procured from Aldrich.

The organoclay compositions (organically modified clays) were made with Kunipia F montmorillonite unless indicated otherwise. See for example those organoclay compositions made with Nanocor PGN. Kunipia F montmorillonite was purchased from Kunimine Industries Co. The manufacturer's reported cation exchange capacity (CEC) is 115 meq/100 g. Un-dried Kunipia F contains 8 wt % of moisture at room temperature, and a sodium analysis of an un-dried Kunipia F sample gave a sodium content of 23,850 (±500) ppm, which indicated a CEC of 103.7 meq/100 g for un-dried sample.

For the purposes of this disclosure a cation exchange capacity value of 100 meq/100 g was used for all calculations and material preparations. The aspect ratio for Kunipia F montmorillonite is 320 (average), 80 (minimum), 1120 (maximum). Comparable montmorillonites may be obtained from Nanocor. Products PGV and PGN which have aspect ratios of 150-200 and 300-500 nm respectively. The cation exchange capacities of PGV and PGN clays are 145 (+10%) and 120 (+10%) meq/100 g respectively.

Sonication of organically modified montmorillonites in solvent was performed using a 450 W model of Branson Sonifier 450 with a 0.5" diameter solid probe. For large scale sonication (>100 g clays), a 1500 W model of Autotune Series High Intensity Ultrsonic Processor from Sonics & Materials inc. was used.

TGA measurements were performed on a Perkin Elmer TGA 7 using Pyris software. A temperature ramp spanning 25 to 900° C. at a rate of 20° C./minute was used for all ramped samples. Isothermal runs were performed at 400° C. to examine thermal stability at the target processing/extrusion temperature. Thermal stabilities are reported as the onset temperature of mass loss and % weight retention at 30 minutes for isothermal runs.

Thermal Mechanical Analysis (TMA) was used to measure the CTE of film samples. Film samples were cut with 2 razor blades spaced to 4 mm in a custom jig. The analysis was performed on a TMA Q400 Thermo Mechanical Analyzer, serial number 0400-0007, available from TA Instruments. Experimental parameters were set at 0.050 N of force, 5.000 g static weight, nitrogen purge at 50.0 mL/min, and 0.5 sec/pt sampling interval. CTE calibration was performed with an aluminum standard at a 5° C./min ramp rate under nitrogen purge from 0 to 200° C. Temperature calibration was performed with an indium standard at a 5° C./min ramp rate under nitrogen purge. Following calibration, the CTE calibration was verified to be within 1 ppm/° C. and the temperature calibration was verified to be within 0.5° C. of expected values.

Transmission Electron Microscopy (TEM) measurements were performed on film samples embedded in epoxy an epoxy matrix and then microtomed at room temperature to a thickness of ·100 nm using a Reichert Ultracut E microtome. The microtomed sections were collected on copper grids and then imaged using a Philps CM100-(100KV) transmission electron microscope.

X-ray Diffraction (XRD) (Low angle XRD) measurements were carried out on a Bruker D8 advance diffractometer using Θ-Θ geometry. Ni-filtered Cu Kα radiation was used with a M-Braun PSD-50m position-sensitive-detector and an incident slit of 0.6 mm. The scanning range was from 1.4-25 degrees 2Θ.

Sodium content analysis was performed using solution nebulization inductively coupled plasma emission spectrometry (ICP-AES, Varian Liberty II). Combustion analyses (C—H analysis) on organoclay compositions (modified clays) were performed at LECO Corporation (Web: www.leco.com). Small-scale melt-mixing experiments of polymer and modified clays were performed on a Haake Rheomix 600 instrument.

Percent Exfoliation is defined as follows. Inorganic fillers have a volumetric effect on the Coefficient of Thermal Expansion (CTE). For each volume % of filler incorporated into a polymer matrix, there is a corresponding % reduction in CTE. Therefore, when an organoclay composition is added to a polymeric resin, any decrease in CTE above the volumetric effect is directly related to the exfoliation of the organoclay composition in the polymer matrix. A percent exfoliation can be calculated as the ratio of the normalized CTE (CTE due to volumetric filling) to the experimentally measured CTE. To calculate the normalized CTE, the weight percent silicate added was converted to a volume % using the density of the silicate (2.86 g/cc according to the suppliers technical datasheet) and the density of standard polyetherimide (1.27 g/cc according to the suppliers technical datasheet). Therefore, each wt % silicate can be translated into a volume % by multiplication by 0.00444. Thus, $$\text{Normalized CTE} = \text{CTE unfilled} - (0.00444 * \text{CTE unfilled} * \text{wt\% silicate}),$$

and the percent exfoliation is given by $$\% \text{ Exfoliation} = \text{CTE filled(experimental measurement)} / \text{Normalized CTE}.$$

Preparation Of Quaternary Phosphonium Salts

Example 1

Preparation of (3-Aminophenyl)triphenylphosphonium Iodide, 1

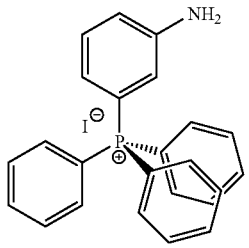

To a 3000 mL 3-necked round-bottomed flask fitted with a condenser, mechanical stirrer and gas inlet, about 329.33 g (1.25 mol) of triphenylphosphine (PPh3), Pd(acetate)2 (2.82 g, 0.0126 mol) and 1600 mL of de-gassed xylene was added. The mixture was stirred under argon until the PPh3 is dissolved. m-Iodoaniline (about 275.00 g; 1.25 mol) was added and the yellow-orange solution was refluxed for around 80 minutes. The product phosphonium compound ((3-Aminophenyl)triphenylphosphonium Iodide) separated from solution as a yellow-orange solid. Excessive refluxing was avoided to prevent discoloration of the product phosphonium compound. The progress of the reaction was monitored using thin layer chromatography (TLC) with a 50/50 hexane/ethyl acetate developing solution. After the reflux, the product was filtered. The product 1 was reslurried with hot toluene, and stirred for 15 minutes. The solution was then filtered and rinsed with additional toluene/xylene. After drying in a 150° C. vacuum oven for 20 hours, 585.01 g of off-white product was obtained in a 96% yield. The melting point and NMR data are consistent with the structure of product 1. MP: 316.0° C. 1H NMR (δ, D6-DMSO): 8-6.6 (m, 19H, aromatics), 5.88 (s, 2H).

Example 2

Preparation of 4-(4-Cumyl)-phenoxy-phthalonitrile, 2

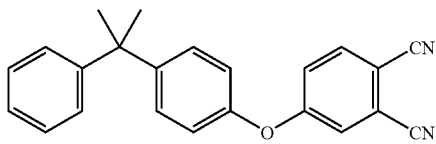

A 3 liter flask was charged with 4-cumylphenol (170.9 g, 0.80 mole), 4-nitrophthalonitrile (150 g, 0.87 mole), potassium carbonate (155.8 g, 1.13 mole), and dimethylforamide (1.4 L). The solution was heated under nitrogen with stirring to about 90° C. for about 100 minutes. The progress of reaction was monitored by thin layer chromatography. The dark brown reaction mixture was cooled and 2M HCl solution (600 mL) was added with stirring. The organic layer was extracted with chloroform (3×300 mL). The chloroform layer was separated, and washed with water (3×100 mL), and dried (MgSO4). The mixture was filtered and the solvent was evaporated on a hot oil bath at a temperature of greater than about 100° C. to afford crude nitrile 2 as viscous green oil (278 g, 84% yield). $^1$H NMR (δ, D6-DMSO): 8.09 (d, 1H), 7.78 (d, 1H), 7.40-7.15 (m, 8H), 7.10 (d, 2H), 1.66 (s, 6H, Me).

Example 3

Preparation of 4-(4-Cumyl)phenoxy-phthalic anhydride, 3

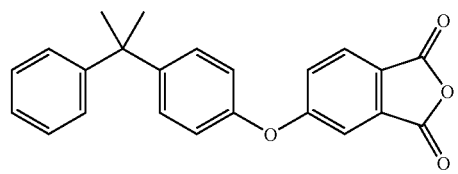

A 3 L 3-necked round-bottomed flask was equipped with a condenser, mechanical stirrer, and an addition funnel. The flask was charged with 4-(4-cumylphenoxy)-phthalonitrile (278 g, 0.82 mole) and acetic acid (1.6 L). The addition funnel was filled with 70% sulfuric acid (670 mL). The solution was heated to 120° C., and then sulfuric was added drop-wise into the reaction mixture over 2 hours. The resulting mixture was refluxed overnight (12 hours). The reaction mixture was cooled to room temperature, and poured into an ice-water mixture (1 kg). The product was extracted with ethyl acetate (3×300 mL). The ethyl acetate layer was isolated and dried with anhydrous MgSO4. The solution was filtered to remove the MgSO4 and the solvent was removed on a rotary evaporator. The resulting brown liquid was dried in a vacuum oven at 160° C. overnight. This yielded the desired anhydride as viscous brown oil (276 g, 94% yield). $^1$H-NMR (δ, D6-DMSO): 7.96 (d, 1H), 7.50-7.20 (m, 9H), 7.03 (d, 2H), 1.76 (s, 6H, Me).

Example 4

Synthesis of CumylPA-mATPP-I, 4

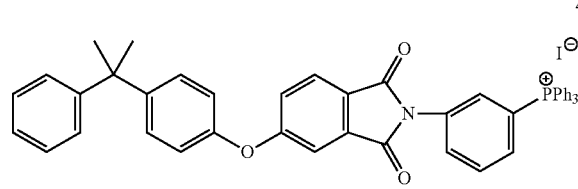

A 500 mL glass reaction vessel fitted with a mechanical stirrer, nitrogen inlet and gas outlet was charged with 66.27 g (0.1848 mol) 4-(4-cumyl)phenyoxy-phthalic anhydride 3 and 88.97 g (0.1848 mol) 3-aminophenyl)triphenylphosphonium Iodide (mATPP iodide) 1. The vessel was then placed in a heating mantle enclosure and heated to about 300° C. to produce a molten reaction mixture. After stirring for about three minutes, vacuum was applied to remove water formed as a byproduct. After about 15 minutes total reaction time, the reaction mixture was poured into a Teflon tray and cooled to provide compound 4 (145.19 g, 95.6%) as a smooth brown glass. $^1$H NMR (δ, D6-DMSO): 8.07-7.08 (31H, aromatic), 1.68 (s, 6H).

Alternate Synthesis of CumylPA-mATPP-I

The reagents, m-aminotetraphenylphosphonium iodide, 22.14 g (0.046 mol), and 4-chlorophthalic anhydride, 8.40 g (0.046) were weighed out and added to a 250 ml round bottom flask equipped with a Dean-Stark condenser and dissolved in 150 mL of o-dichlorobenzene. The contents were heated to reflux and the water was removed by azeotropic distillation and a nitrogen purge. After 4 h at reflux, 10.78 g of sodium cumylphenolate (0.046 mol) was added and the contents stirred and heated for an additional 4 h. After cooling to room temperature, the solution was poured into 400 mL of ethyl ether and the resulting solid was collected by vacuum filtration. The solid was redissolved in 100 mL of chloroform and the resulting solution poured into 300 mL of ethyl ether. The resulting solid was collected by vacuum filtration and dried under vacuum overnight. $^{13}$C-NMR was consistent with the structure. Overall yield: about 60%.

Example 5

Synthesis of BPADAPA-mATPP-I, 5

About 58.0 g (0.1114 mol) of bisphenol A dianhydride (BPADA) and 107.27 g (0.2229 mol) 3-aminophenyl)triphenylphosphonium Iodide (mATPP-I) 1 were shaken together. The dry mixture was then added to a glass reaction flask using a long paper funnel to prevent the reagents from sticking to the upper inside of the flask. The reaction flask was evacuated and backfilled with nitrogen twice. The external heater was turned on and set to about 300° C. As the reagents melted, a brown solution formed. After the reagents had been melted for 3-5 minutes, the reaction flask was evacuated to remove water. The pressure was initially set to 600 milibar (mb) and successively lowered to 10 mb. When the reaction was complete, the pressure was set back to 1000 mb and the stirrer was turned off. The product diphosphonium bisimide 5 was cooled to yield 158.48 g (98.28%) of a brown glass. 1H NMR (δ, D6-DMSO): 8.1-7.1 (m, 52H, aromatics), 1.73 (s, 6H).

Example 6

Synthesis of Bis(chlorophthalimide) of AMS Dimer Diamine, 6

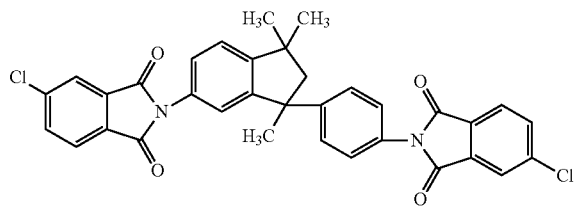

6

To 29 g (0.1 mol) AMS dimer diamine in a 3 neck round bottom flask fitted with stirrer, nitrogen inlet and Dean-Stark apparatus fitted with a condenser, was added 38.34 g (0.22 mol) of 4-chloro-phthalic anhydride (4-ClPA) and 300 ml ortho-dichlorobenzene. The mixture was heated to 190-200 deg. C. for 4 hours under nitrogen flow with removal of water. The reaction mixture was cooled to ambient temperature and the product bis(chlorophthalimide) 6 was precipitated by the addition of methanol (1500 ml). The product was filtered and dried in an oven at 100 deg. C. to constant weight. Yield 40 g (91%).

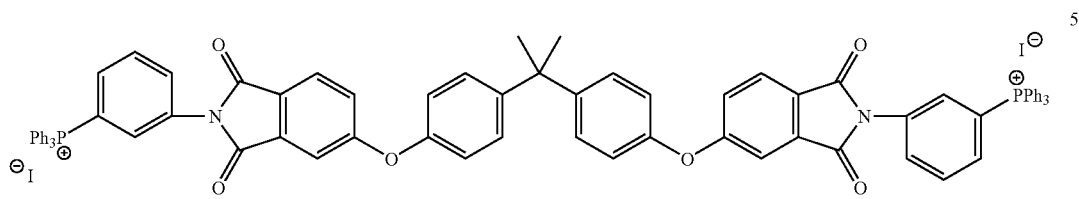

5

Example 7

Synthesis of Bis(phosphonium phthalimide), 7

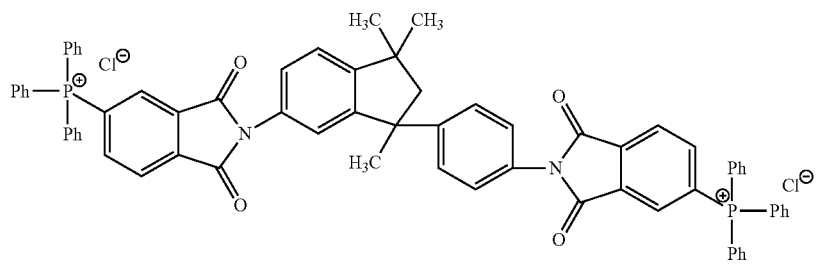

7

To 20 g (0.05 mol) bis(chlorophthalimide) 6 in a 3 neck flask fitted with stirrer, nitrogen inlet and a condenser was added 24.5 g (0.09 mol) of triphenyl phosphine and 6.05 g anhydrous nickel chloride. The mixture was then heated to 300 deg. C for 4 hours under nitrogen flow. During this time the entire mass of reactants became a greenish-blue liquid form. The reaction mass was cooled to ambient temperature and solidified as a glassy greenish-blue solid mass to which dichloromethane (250 ml) was added. The mixture was heated to dissolve most of the solid and water (200 ml) was added. The organic layer was separated and washed repeatedly until the aqueous layer remained colorless (200 ml×4 washes). The solvent was removed under reduced pressure to afford the product bisphosphonium salt as an oil. Toluene (100 ml) was added to provide a solid. The toluene was the removed under reduced pressure. The toluene addition and removal was repeated 4 times to assure removal of water. Finally, a last portion of toluene (100 ml) was added to produce a slurry of the bisphosphonium salt 7. The solid was filtered and dried in an oven at 100 deg. C. to constant weight. Yield 30.3 g (60%).

Example 8

Synthesis of Bis(phosphonium naphthalimide), 8

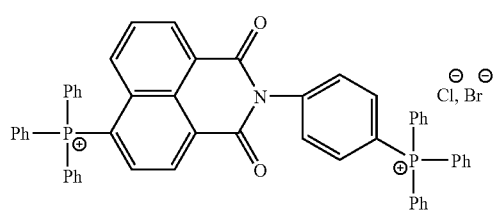

8

To 28 g (0.1 mol) bromonaphthoic anhydride in a reaction flask equipped with a stirrer, nitrogen inlet and Dean-Stark apparatus fitted with a condenser was added 13.54 g (0.11 mol) of 4-chloro-aniline and 300 ml ortho-dichlorobenzene. The mixture was heated to 190-200 deg. C. for 4 hours under nitrogen flow with removal of water. The reaction mixture was cooled to ambient temperature and the product was precipitated from 1500 ml of methanol. The product was filtered and dried in an oven at 100 deg. C. to constant weight. Yield 35 g (89%). To 15 g (0.04 mol) of the product imide above in a flask fitted with stirrer, nitrogen inlet and a condenser was added 20.5 g (0.08 mol) of triphenyl phosphine and 5 g anhydrous nickel chloride. The mixture was heated to 220 deg. C. for 4 hours under nitrogen flow to afford a greenish-blue liquid. The reaction mixture was cooled to ambient temperature to afford a solid mass. The product bisphosphonium salt was purified and isolated as in Example 7 to afford bisphosphonium salt 8. Yield 30.5 g (75%).

Examples 9-10

Synthesis of Amine-Substituted Phosphonium Salts 9 and 10

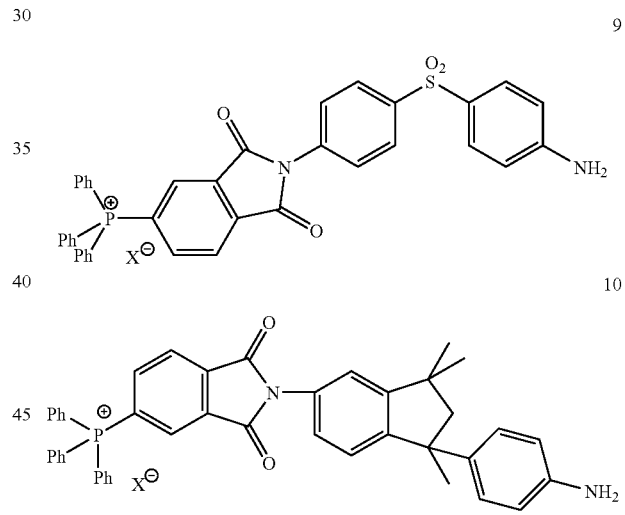

The diamine (4,4'-diaminodiphenyl sulfone (DDS) or alpha-methyl styrene dimmer diamine (AMSDDA) (0.3 mol)) was added to a round bottom flask fitted with a stirrer, nitrogen inlet, Dean-Stark apparatus and a condenser. About 0.1 mole (18.26 g) of 4-chlorophthalic anhydride was added to the diamine along with about 300 ml of ortho-dichlorobenzene. The round bottom flask was heated to about 190-200° C. for 4 hours under nitrogen with removal of water. The reaction mixture was then cooled to room temperature and added with stirring to about 1500 ml of hexane. The product monochlorophalimide was collected and dried in an oven at 100° C.

The monochloroimide (0.1 mol) was added to a flask fitted with a stirrer, nitrogen inlet, and condenser. Triphenyl phosphine (TPP) (26.2 g, 0.1 mol) and nickel(II) chloride 0.05 mol (6.5 gm) was added and the mixture was heated to the required temperature for 6 hours under nitrogen. The reaction mixture was then cooled to room temperature and stirred in about 1000 ml of dichloromethane and water (1000 ml). The layers were separated and the organic layer was washed until it free of nickel chloride color. The solvent was removed under vacuum and toluene was added to the sticky residue and subsequently the toluene was removed under reduced pressure. The toluene addition and removal was repeated until a solid product was obtained. The final product was then dried under vacuum. The structures of products 9 and 10 were confirmed by $^1$H-NMR.

Example 11

Synthesis of Bis(phosphonium imide), 11

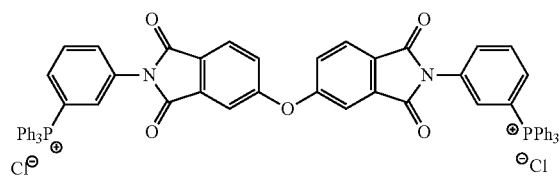

11

The dianhydride (oxydiphtahlic anhydride (0.1 mol)), 3-chloroaniline (26.77 g, 0.21 mol), and ortho-dichorobenzene (300 ml) were charged to a reaction flask fitted with a stirrer, nitrogen inlet, Dean-Stark apparatus and condenser. The reaction mixture was heated to about 190-200° C. for 4 hours under nitrogen with removal of water. The reaction mixture was then cooled to room temperature and added to about 1500 ml of methanol. The intermediate bis(chloro-imide) was then filtered and dried in an oven at 100° C. to constant weight. The bis(chloro-imide) was converted to the bis(phosphonium imide) 11 as in Examples 9 and 10.

Example 12

Synthesis of Bisimide-Monophosphonium Salt 12

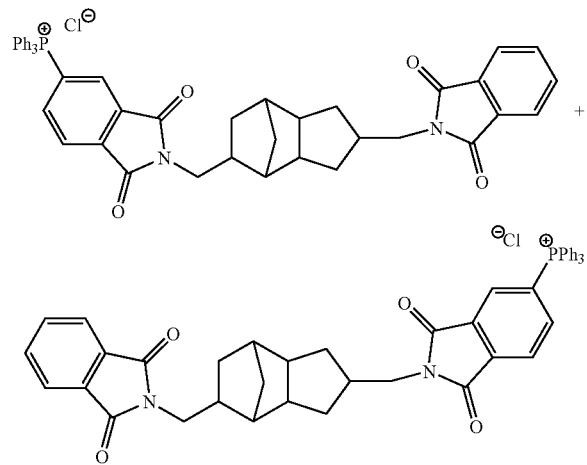

12

The diamine (tricyclododecyl diamine (0.3 mol)) phthalic anhydride (0.1 mol) and orthodichorobenzene (300 ml) were charged to a reaction flask fitted with a stirrer, nitrogen inlet, Dean-Stark and condenser. The mixture was heated to about 190-200° C. for 4 hours under nitrogen with removal of water. The reaction mixture was then cooled to room temperature and stirred into about 1500 ml of hexane/methanol to afford the intermediate monophthalimide as a mixture of isomers which was dried at 100° C. to constant weight.

The monophthalimide (0.1 mol), 4-chlorophthalic anhydride (0.1 mol) and orthodichorobenzene (300 ml) were charged to flask equipped as above. The mixture was heated to about 190-200° C. for 4 hours under nitrogen with removal of water. The reaction mixture was then cooled to room temperature and stirred into about 1500 ml of hexane/methanol to afford the intermediate monophthalimide-monochlorophthalimide as a mixture of isomers which was dried at 100° C. to constant weight.

The monophthalimide-monochlorophthalimide intermediate was reacted with triphenylphospine in the presence of nickel(II) chloride as described in Example 8 to afford the product bisimide-monophosphonium salt 12 as a mixture of isomers.

Preparation of Organoclay Compositions Comprising Quaternary Phosphonium Cations Example 13

Organoclay Composition Comprising Phosphonium Cation 13

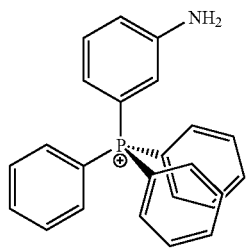

13

To a 1-liter beaker was charged phosphonium salt 1 (Example 1, 17.36 g, 0.036 mol) and methanol (900 ml) and heated to about 64° C. In a separate flask sodium montmorillonite clay (Na-MMT/Kunipia F clay, 30.00 g, 0.030 mol equivalents) was stirred with about 2.1 L of deionized water. When the clay was dispersed, the slurry was heated to about 65° C. and added to a large preheated blender. The salt solution in methanol was slowly added to the clay slurry in the blender while stirring vigorously. Initially, a thick foam formed which then dispersed. The mixture was blended vigorously for about 10 minutes and then more slowly for an additional 20 minutes. The temperature was about 65° C. After about 30 minutes of blending, the mixture was filtered using a large fine fritted funnel. The solid clay was re-slurried in hot (80° C.) water, stirred for 15 minutes and filtered. The solid clay was then slurried in hot (64° C.) methanol and then filtered. The purified clay was dried under vacuum at room temperature until it could be ground into a powder. The moist powder was dried at 150° C. for about 12 hours under vacuum and ground again to obtain about 30 g of dry organoclay composition clay in 76% yield.

Example 14

Organoclay Composition Comprising Phosphonium Cation 14

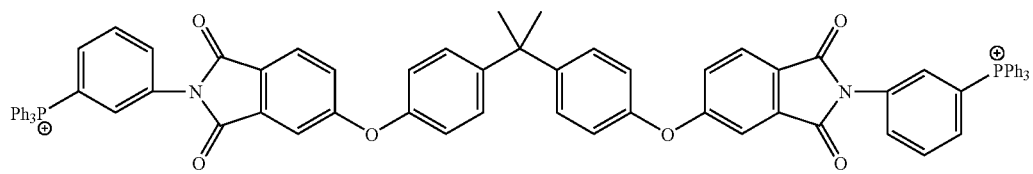

14

In a 5000 mL round-bottomed flask was charged with 2000 mL of deionized (DI) water and stirred using a mechanical stirrer. Then, about 25.00 g (0.025 equiv) of Kunipia F clay was slowly added, stirred until the clay dispersed fully. The dispersed clay solution was then heated to about 80° C. Separately, 20.80 g (0.01437 mol, 15% excess) BPADA-mATPP iodide 5 was dissolved in 410 mL acetonitrile and heated to about 80° C. The BPADA-mATPP iodide salt solution was then added to the clay dispersion whereupon the combined mixture was stirred at about 80° C. for one hour. The clay was then filtered, re-slurried with 2500 mL of deionized water and stirred at 80° C. for 15 minutes. After filtering the clay, an acetonitrile wash was also performed followed by a final filtration. The modified clay was dried for 24 hours under a 25° C. vacuum until it could be blended to a powder. The modified clay further in a 150° C. vacuum for 12 hours, the clay was blended again to give the organoclay composition comprising cation 14 as fine powder in about 84% yield.

Examples 15-16

Organoclay Compositions Comprising Phosphonium Cation 15 or 16

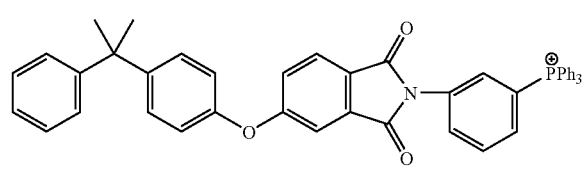

15

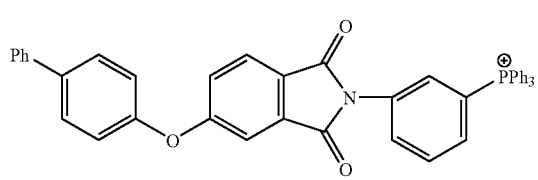

16

Additional organoclay compositions comprising organophosphonium cation 15 (Example 15, Cumyl-MMT) or 16 (Example 16) were prepared as in Example 14.

Data for organoclay compositions comprising organophosphonium cations are provided in Table 1. "CE-1" refers to Comparative Example 1, "CE-2" refers to Comparative Example 2, etc. "Ex-14" refers to "Example 14", "Ex-15" refers to "Example 15", etc.

TABLE 1

Organoclay Compositions Comprising Organophosphonium Cations

| Example | Cation Modifier | d-Spacing (A) | Wt loss at 400 deg C. under N2 for 30 min (%) |
|---|---|---|---|
| CE-1 | Tetraphenyl phosphonium | 17.8 | 3.1 |
| CE-2 | 13 | 19 | 2.3 |
| Ex-14 | 14 | 29 | 7.0 |
| Ex-15 | 15 | 25.5 | 13.0 |
| Ex-16 | 16 | 25.5 | 8.0 |

Examples 17-26

General Procedure for Organoclay Composition Preparation

An inorganic clay (sodium montmorillonite, "Na-MMT", available from Southern Clay, Inc.) was slurried in 75 volumes deionized water ("MilliQ water") with respect to the weight of clay and stirred at room temperature (22-25° C.) for 1 hour and then at 90-95° C. for 1 hour. The solution of organophosphonium salt in methanol or acetonitrile was then added protionwise to the slurry of the inorganic clay the reaction mass was stirred for 18-20 hrs at 65-95° C. Upon cooling the crude organoclay composition was filtered and washed until the washing were free of halide and then dried at 125-150° C. to constant weight.

Organoclay compositions comprising monophosphonium bisimide organophosphonium cations are gathered in Table 2 along with d-spacing data determined by x-ray diffraction (XRD).

TABLE 2
Organoclay Compositions Comprising Monophosphonium Bisimide Cations
| Example | Cation Modifier | d-Spacing (Å) |
|---|---|---|
| Ex-17 | 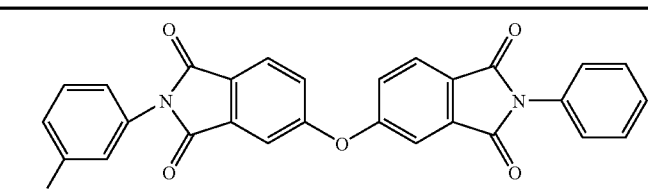 17 | 17.5 |
| Ex-18 | 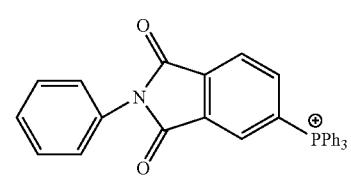 18 | 19.57 |
| Ex-19 | 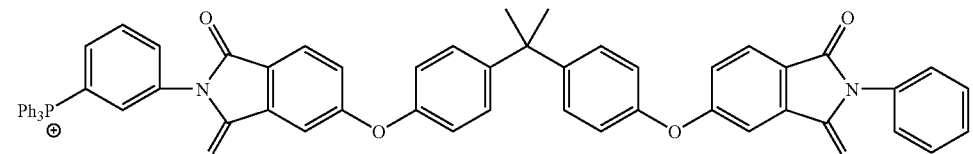 19 | 15.05 |
| Ex-20 | 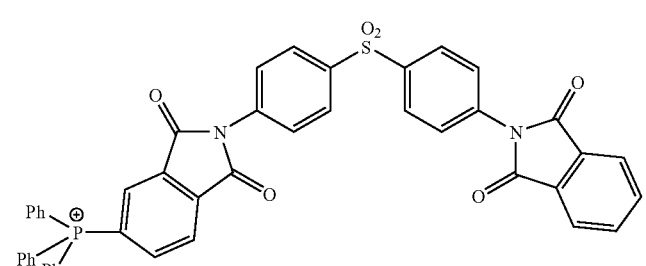 20 | 18.3 |
Organoclay compositions comprising diphosphonium bisimide organophosphonium cations are gathered in Table 3 along with d-spacing data determined by x-ray diffraction (XRD).

TABLE 3

Organoclay Compositions Comprising Diphosphonium Bisimide Cations

| Example | Cation Modifier | d-Spacing (Å) |
|---------|-----------------|---------------|
| Ex-21 | 21 | 22.29 |
| Ex-22 | 22 | 16.89 |
| Ex-23 | 23 | 19.21 |
| Ex-24 | 24 | 25.13 |

Organoclay compositions comprising amino-phosphonium monoimide organophosphonium cations are gathered in Table 4 along with d-spacing data determined by x-ray diffraction (XRD).

TABLE 4

Organoclay Compositions Comprising Amino-Phosphonium Monoimide Cations

| Example | Cation Modifier | d-Spacing (Å) |
|---------|-----------------|---------------|
| Ex-25 | (structure 25) | — |
| Ex-26 | (structure 26) | 17.27 |

Preparation of Polymer-Organoclay Composite Compositions

Comprising Quaternary Phosphonium Cations

Example 27

Polymer-Organoclay Composite Composition Comprising Cation 14

To a 1-liter 3-necked round-bottomed flask containing 150 mL dry orthodichorobenzene was added 7.96 g (4.77 g silicate) BPADA-mATPP-MMT prepared in Example 14. The nanoclay-orthodichorobenzene dispersion was sonicated for one hour with a 400 W Branson Sonificator 450 with a ½" diameter solid probe at 20% output. After sonication, 16.17 g (0.150 mol) para-phenylene diamine (pPD) and 50 mL orthodichorobenzene were added and stirred over heat until the pPD dissolved. Then, 75.31 (0.145 mol) BPADA, 1.43 g (0.0096 mol) phthalic anhydride, and 225 mL of additional orthodichorobenzene were added. The mixture was brought to reflux whereupon 225 mL of orthodichorobenzene and water were removed over time. The solution was then cooled and stirred with 300 mL of heptane. The resulting solid polymer was filtered and dried in a 150° C. vacuum oven for 15 hours to yield 89.17 g (93.4% yield) of the polymer-organoclay composite composition. The formulated degree of polymerization of the polymeric resin was 30. The formulated weight percent silicate was 3%.

Example 28

Polymer-Organoclay Composite Composition Comprising Cation 15

To a 3-liter 3-necked round-bottomed flask containing 850 mL dry veratrole was added 210.0 grams (g) (0.395 mol) BPADA and 40.1 g (23.6 g silicate) CumylPA-mATPP-MMT prepared as in Example 15. The mixture was sonicated for three hours with a 400 W Branson Sonificator 450 with a ½" diameter solid probe at 40% output. After sonication, 100.7 g (0.406 mol) 4,4'-diaminiodiphenyl sulfone (DDS), 2.0 g (0.013 mol)) phthalic anhydride (PA) and 350 mL veratrole were added. The mixture was heated to reflux and 200 ml of a veratrole-water mixture was removed over a 12 h period. Then another 400 mL of veratrole was distilled from the reaction vessel over a 3 h period. The reaction mixture was then cooled to 80° C. and poured into a high speed blender containing 2 L of methanol. The resulting solid polymer was filtered and dried at 250° C. in a vacuum oven for 15 hours. The product polymer-organoclay composite composition (253 g) was obtained in 75% yield. The formulated degree of polymerization was 35. The formulated weight percent silicate was 7%.

Example 29

Polymer-Organoclay Composite Composition Comprising Cation 14

To a 2-liter 3-necked round-bottomed flask containing 150 mL dry oDCB were added 7.51 g (4.51 g silicate) BPADA-mATPP-MMT prepared as in Example 14. The nanoclay-oDCB dispersion was sonicated for one hour with a 400 W Branson Sonificator 450 with a ½" diameter solid probe at 20% output. After sonication, 34.90 g (0.174 mol) 4,4'-oxydianiline (4,4'-ODA), 52.00 (0.168 mol) 4,4'-oxydiphthalic anhydride (ODPA), 1.987 g (0.0134 mol) phthalic anhydride, 20 mL of xylene and 300 mL of oDCB were added. The mixture was brought to reflux whereupon 225 mL of a solvent-water were removed over time. The solution was then cooled and stirred with 300 mL of heptane. The resulting solid polymer was filtered and dried in at 150° C. in vacuum oven for 15 hours to afford 88.52 g of the polymer-organoclay composite composition comprising cation 14 in 98.22% yield. The formulated degree of polymerization was 25. The formulated weight percent silicate was 5%.

Examples 30-37

Polymer-Organoclay Composite Compositions, Melt Preparation

In Examples 30-37 the following general procedure was employed. Ultem® 1010 polyetherimide (58.2 gm) was weighed and separated into two equal portions. To one portion was added 1.8 grams of the organoclay composition (modified Na-MMT) and mixed well. The two portions of the polyetherimide were then added simultaneously over about 9 minutes to a Haake mixer maintained at 350 deg. C. and then mixed for about 30 minutes at 350 deg. C. and sampled periodically. The product was then removed from the Haake mixer. The polymer-organoclay composite composition was analyzed by gel permeation chromatography (GPC). Data for various polymer-organoclay composite compositions prepared as well as molecular weight data are gathered in Table 5. The product polymer-organoclay composite compositions were also characterized by x-ray diffraction (XRD), transmission electron microscopy. In addition, coefficients of thermal expansion (CTE) were determined. For reference, the inorganic clay used to prepare the organoclay compositions employed (Na-MMT, Southern Clays, USA) exhibited a d-spacing of 9.7 angstroms. The polyetherimide employed had an initial weight average molecular weight (Mw) of 44,965 grams per mole and an initial number average molecular weight of 19,200 grams per mole, and exhibited a CTE of about 62.1 (ppm).

TABLE 5

Polymer-Organoclay Composite Compositions Comprising Polyetherimide

| Example | Cation Modifier | d-spacing* | Mw | Mn | CTE |
|---|---|---|---|---|---|
| 30 | 21 | >30 | 47,785 | 23,175 | 28.7 |
| 31 | 23 | — | 50,458 | 25,079 | — |
| 32 | 24 | — | 43,295 | 19,641 | 40 |
| 33 | 14 | — | 51,729 | 25,094 | — |
| 34 | 22 | — | 49,518 | 23,753 | — |
| 35 | 17 | — | 51,628 | 24,362 | — |
| 36 | 18 | — | 51,246 | 25,286 | — |
| 37 | 19 | — | 50,449 | 26,621 | — | d-spacing* in the polymer-organoclay composite composition

The data gathered for Examples 30-37 indicate that no little or degradation of the polyetherimide matrix is observed in the polymer-organoclay composite compositions prepared. Moreover, when detected, the d-spacing observed is significantly larger than the d-spacing observed in the corresponding organoclay composition.

Examples 38-51

Polymer-Organoclay Composite Compositions Prepared Via In Situ Polymerization Comprising a Polymeric Resin Comprising Structural Units Derived from DDS and BPADA or ODPA Polymer-organoclay composite compositions 38-43 and 46-51 were prepared as described in the following Example (Example 43). The organoclay composition comprising cation 14 (BPADA-mATPP-MMT), 9.05 g and 59.85 g of oxydiphthalic anhydride (ODPA) was added to 219 ml of orthodichorobenzene (oDCB) and 146 mL of veratrole. The mixture was mixed with a mechanical stirrer for 2 hours to dissolve the ODPA. The vessel was then immersed in a bath sonicator and sonicated until a fine dispersion of the clay was obtained. The Flask was then equipped with an overhead stirrer and a Dean-Stark trap and 46.33 g of 4,4'-diaminodiphenyl sulfone (DDS) and 0.08913 g of aniline were added. 60 mL of oDCB and 40 mL of veratrole was used to rinse the DDS into the vessel. The mixture was stirred and heated slowly to reflux over three hours and the water removed by azeotropic distillation. After heating at reflux for 18 h, a dispersion of fine powder was obtained. The dispersion was added to a larger volume of methanol, filtered and dried under vacuum at 180 C The resulting dried powder was then transferred to a Haake melt mixer and mixed at 390 C and 50 rpm for 60 min. Samples were removed at 5 min intervals. The 15 minute sample was pressed into a film between two sheets of Teflon lined foil at 760 F. The pressed film sample was then submitted for analysis by Thermal Mechanical Analysis and the CTE measured over the range 30 to 200 C.

Polymer-organoclay composite compositions 44-45 were prepared as follows. A SILVERSON mixer (Lab in line mixer assembly model L4R-PA, square hole high shear screen, pumping at ~600 mL/min) was used to mix the organoclay with solvent. 450 mL orthodichlorobenzene (oDCB) was pumped through the SILVERSON mixer. The organoclay composition comprising cation 14 (BPADA-mATPP-MMT), 13.1 g was added slowly to the recirculating oDCB. The mixture was run through the SILVERSON high shear mixer at 6000 rpm for 45 minutes in recirculation mode. The mixture was then transferred to a 1 L three-necked flask. The flask was then equipped with an overhead stirrer and a Dean-Stark trap. 74.2 g of bisphenol A dianhydride (BPADA) was added and the flask was heated to 100° C. to dissolve the dianhydride. 33.90 g of 4,4'-diaminodiphenyl sulfone (DDS) was then added and 20 mL of oDCB was used to rinse the DDS into the vessel. The mixture was stirred and heated slowly to reflux and the water by-product was removed by azeotropic distillation. After heating at reflux for 3.5 h, the heat was removed and the reaction mixture was allowed to cool to room temperature. The resulting viscous mixture was transferred to a Haake melt mixer and mixed at 390 C and 50 rpm for 60 min. Samples were removed at 5 minute intervals. The 15 minute sample was pressed into a film between two sheets of Teflon lined foil at 760 F. The pressed film sample was then submitted for analysis by Thermal Mechanical Analysis and the CTE measured over the range 30 to 200° C.

Results for the polymer-organoclay composite compositions of examples 38-51 are given in Table 6.

TABLE 6

CTE results from in situ polymerization of DDS with ODPA and BPADA Compression molded samples.

| Example | Dianhydride | Solvent | Cation Modifier[1] | Clay Loading | Mixing Method† | CTE | % Ex‡ |
|---|---|---|---|---|---|---|---|
| 38 | BPADA | Orthodichlorobenzene | NONE | 0% | NA | 58 | 0.0% |
| 39 | BPADA | Orthodichlorobenzene | DP | 7% | Sonication | 37 | 34.2% |

TABLE 6-continued

CTE results from in situ polymerization of DDS with ODPA and BPADA
Compression molded samples.

| Example | Dianhydride | Solvent | Cation Modifier[1] | Clay Loading | Mixing Method[†] | CTE | % Ex[‡] |
|---|---|---|---|---|---|---|---|
| 40 | BPADA | oDCB | CUMYL | 7% | Sonication | 34 | 39.5% |
| 41 | BPADA | V* | TPP | 3.80% | Sonication | 48 | 15.8% |
| 42 | BPADA | NMP | TPP | 3.80% | Sonication | 47 | 17.5% |
| 43 | BPADA | O/V** | DP | 3.8 | Sonication | 44 | 22.8% |
| 44 | BPADA | O/V** | DP | 7.60% | Sonication | 36 | 35.7% |
| 45 | BPADA | oDCB | DP | 7% | Silverson | 50 | 11.0% |
| 46 | BPADA | oDCB | CUMYL | 7% | Silverson | 38 | 32.4% |
| 47 | BPADA | V* | CUMYL | 3.8 | Sonication | 45 | 21.0% |
| 48 | ODPA | oDCB | NONE | 0% | NA | 49 | 0.0% |
| 49 | ODPA | O/V** | DP | 3.80% | Sonication | 34 | 29.5% |
| 50 | ODPA | V* | TPP | 5% | Sonication | 39 | 18.6% |
| 51 | ODPA | O/V** | CUMYL | 3.8 | Sonication | 36 | 25.3% |

[1]"DP" = Cation 14, "CUMYL" = Cation 15, TPP = tetraphenylphosphonium
[†]In Examples 45-46 the mixing step was carried out using a SILVERSON high shear mixer.
[‡]"% Ex" percent exfoliation of the organoclay component in the polymer-organoclay composite composition.
*"V" = veratrole.
"O/V" = a mixture of oDCB and veratrole.

Examples 52-53

And Control Polymer-Organoclay Composite Composition Prepared by Solution Blending Followed by Melt Extrusion The following procedure is generally applicable to the preparation of film samples comprising the polymer-organoclay composite compositions of the present invention.

Example 52

A organoclay composition comprising cation 15 was sonicated in veratole. The mixture subjected to sonication comprised about 2.7% organoclay composition in 500 mL of veratrole. Sonicated was carried out in a 1000 mL round-bottom flask submerged in a water bath using a Branson 450 W Sonifier fitted with a ½" sonic probe at ~40% power output for ~16 hrs. A total of five essentially identical organoclay composition-solvent batches were sonicated and then combined. To the combined batches of the sonicated organoclay composition was added a 20 weight percent solution of the BPADA-DDS polyetherimide in veratrole and the mixture was thoroughly mixed. This mixture was then added to a blender containing methanol. The resultant solid powder was filtered and dried at 220° C. under vacuum, and then blended with an amount of a second polyetherimide, ODPA-DDS polyetherimide, sufficient to give a 69:31 ratio of the BPADA-DDS polyetherimide and ODPA-DDS polyetherimide polyetherimides. The resultant mixture was extruded into film through a 3" film die. The resulting film had a nanosilicate loading of 7%, a machine direction CTE of 33.0 ppm/° C., and a $T_g$ of 255° C. (see FIG. 1 for TEM image).
Control A control film containing the same ratio of BPADA-DDS polyetherimide to ODPA-DDS polyetherimide with no clay exhibited a machine direction CTE of 48.5 ppm/° C. and a $T_g$ of 262° C.

Example 53

A film was also extruded with an BPADA-DDS polyetherimide: to ODPA-DDS polyetherimide of 60:40 and a nanosilicate loading of 7%. That film had a machine direction CTE of 28.7 ppm/° C. and a $T_g$ of 266° C.

Preparation of Quaternary Pyridinium Salts

Example 54

Preparation of 1,2,4,6-Tetraphenylpyridinium Tetrafluoroborate 27

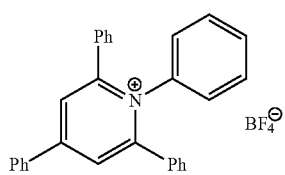

27

A 500 mL round-bottomed flask equipped with a condenser was charged with 2,4,6-triphenyl-pyrylium tetrafluoroborate (22.4 g, 0.056 mole), aniline (5.8 g, 0.060 mole) and ethanol (200 mL). The resulting solution was magnetically stirred and refluxed under a nitrogen atmosphere for 6 hours. The solution was cooled to room temperature, and the product 27 precipitated as greenish-yellow, crystalline solid. The product was collected by filtration and dried in a vacuum oven at 100° C. (23 g, 87% yield). Mp=253° C.

Example 55

Preparation of 1-(4-phenoxyphenyl)-2,4,6-triphenylpyridinium Tetrafluoroborate, 28

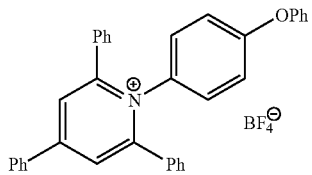

28

A 1 L round-bottom flask equipped with a condenser was charged with 2,4,6-triphenyl-pyrylium tetrafluoroborate (50.0 g, 0.126 mole), 4-phenoxyaniline (25.7 g, 0.138 mole) and ethanol (400 mL). The resulting solution was magnetically stirred and refluxed under nitrogen atmosphere for 6 hours. The solution was cooled to room temperature, the condensation product precipitate out as cream color crystal. The crystal was collected by filtration and dried in vacuum oven (100° C.) to give the desired product (68 g, 95% yield). Mp=201.7 C

Example 56

Preparation of 4-(4-(1-methyl-1-phenyl-ethyl)-phenoxy)aniline, 29

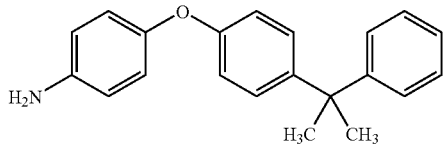

29

A 5 L round-bottom flask equipped with a Dean Stark trap, a condenser and a mechanical stirrer was charged with 1-fluoro-4-nitro-benzene (159 g, 1.128 mole), 4-cumylphenol (239 g, 1.128 mole), anhydrous potassium carbonate (103 g, 0.744 mole), N,N-dimethylformamide (1.5 L) and toluene (150 mL). The resulting mixture was stirred and refluxed for 2 hours (solution temperature ~160° C.) under nitrogen atmosphere. Water was collected at the trap during this period of time.

The reaction mixture was cooled back to room temperature. Palladium on carbon (10 wt % Pd, 25 g, 0.025 mole) was added to the reaction mixture followed by ammonium formate (350 g, 5.463 mole). Internal temperature of the solution of reaction mixture was kept below 55° C. using cold water during the reaction.

After 2 hours, the reaction was filtered and a clear solution of filtrate was collected. Water (2 L) was added to the filtrate and the desired product precipitated out of solution as a cream white powder. The precipitated powder was collected by filtration and dried in an vacuum oven at 100° C. for 12 hours to give the desired product (303 g, 88% yield)

Example 57

Synthesis 1-(4-(4-(1-Methyl-1-phenyl-ethyl)-phenoxy)-phenyl)-2,4,6-triphenylpyridinium Tetrafluoroborate, 30

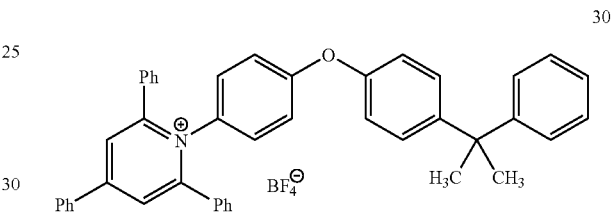

30

A 5 L round-bottom flask equipped with a condenser and a mechanical stirrer was charged with 2,4,6-triphenyl-pyrylium tetrafluoroborates (206 g, 0.519 mole), 4-[(1-methyl-1-phenyl-ethyl)-phenoxy]-aniline (174 g, 0.574 mole) and ethanol (2 L). The resulting solution was stirred and refluxed under nitrogen atmosphere for 3 hours. The solution was cooled to room temperature, the condensation product precipitated out as greenish yellow color crystal. The crystal was collected by filtration and dried in vacuum oven (100° C.) to give the desired product (333 g, 94% yield). Mp=283.7 C

Example 58

Synthesis BAPP-TPPy-BF4, 31

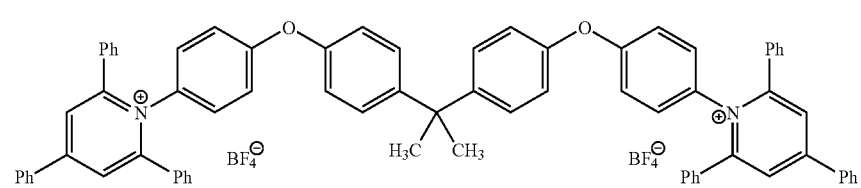

31

BAPP (4,4'-(4,4'-Isopropylidenediphenyl-1,1'-diyldioxy) dianiline) (220.0 g, 0.049 mole), triphenylpyrylium tetrafluoroborate (40.5 g, 0.102 mole) and ethanol (400 mL) was mixed together and refluxed for 5 h. The reaction mixture was cooled to room temperature, and filtered to provide the product bispyridinium salt 31 (BAPP-TPPy-BF4). Yield 54 g (95%). Mp=354° C.

Table 7 provides yield and characterization data for the pyridinium salts 27, 28, 30 and 31.

TABLE 7

Yield Characterization Data for Pyridinium Salts

| Pyridinium Salt (abbreviation) | Starting Amine | Yield % | m.p. (° C.) | TGA 5 wt % Loss Temp (° C.) |
|---|---|---|---|---|
| 27 (TPPy-BF4) | Aniline | 87 | 253 | 420 |
| 28 (Phenoxy-TPPy-BF4) | 4-Phenoxyaniline | 95 | 202 | 420 |
| 30 (CumylPhenoxy-TPPy-BF4) | Cumylphenoxyaniline | 94 | 284 | 420 |
| 31 (BAPP-TPPy-BF4) | BAPP | 95 | 354 | 400 |

The data in Table 7 show that the pyridinium salts possess a very high and unexpected level of thermal stability based on thermogravimetric analysis (TGA). The 5 wt % loss temperature observed for all pyridinium salts was above 400° C. In contrast, the starting pyrylium salt 2,4,6-triphenyl-pyrylium tetrafluoroborate exhibited a much lower stability and showed a 5 wt % loss at 340° C. under the testing protocol employed.

Preparation of Organoclay Compositions
Comprising Quaternary Pyridinium Cations

Example 59

General Method for Organoclay Composition Preparation

For purposes of illustrating generally how organoclay compositions comprising pyridinium cations were prepared the synthesis of cumylphenoxy-TPPy-MMT is give here. A 5 L round-bottom flask equipped with a mechanical stirrer was charged sodium montmorillonite (40 g, 0.041 mol. eqv.) and de-ionized water (3 L). The solution was stirred & heated to 85° C., and the sodium montmorillonite was well dispersed. A 60° C. solution of cumylphenoxy-TPPy-BF4 30 (31.4 g, 0.046 mole) in acetonitrile (625 mL) was added to the suspension of sodium montmorillonite over 10 min. After the addition of the salt solution the reaction mixture was stirred at 85° C. for another 3 hours.

The modified montmorillonite was collected by filtration, and washed with hot water (2 L, 80° C.) to remove inorganic salt by-product $NaBF_4$. The modified clay (organoclay composition) was further purified by re-dispersing it in acetonitrile (2 L) at 60° C., followed by filtration to remove the any excess pyridinium salt. The purified clay was dried under vacuum for 24 hours at 150° C. and was milled to give a fine powder (50.3 g, 80% yield).

Example 60

Large-Scale Synthesis of Modified Montmorillonite

In a Pfaudler Inc., 50 gallon, Stainless Steel vessel (vessel 1), 470 g of sodium montmorillonite (Na-MMT) clay was added to 47 liters of stirred deionized water at room temperature. When the clay was dispersed, the mixture was heated to 80° C. In a Brighton, 10 gallon, Stainless Steel Vessel (Vessel 2), a solution of organic modifier was prepared by stirring 352 g of CumylPhenoxy-TPPy-BF4 30 modifier into 7 liters acetonitrile and heating to 80° C. until all the organic salt dissolved. The salt solution was added over a period of about 10 min with constant stirring of montmorillonite at 80° C. in the main reactor, when the two liquids equilibrated to an initial temperature of 80° C. The reaction mixture was stirred for 60-90 minutes at 80° C. Mixing was efficient and no portion of the reaction mixture was excluded. After mixing, the modified clay mixture was gravity-transferred to the filtration centrifuge that was fitted with a one-micron filtration bag. The centrifuge was run at both low and high speeds to give a firm cake of modified clay. The modified clay was washed by placing the clay back in Vessel 1 with 47 liters of water and stirring at 80° C. for 15 minutes. The modified clay mixture was again filtered. Then, the modified clay was washed again by placing the clay back in Vessel 1 with 15 liters of acetonitrile and stirring at 80° C. for 15 minutes. The clay was re-filtered to remove unexchanged organic modifier. The clay in the centrifuge basket was rinsed briefly with methanol to aid in drying uniformity. The modified clay was dried overnight in either a low-temperature vacuum oven (100° C.) or in the centrifuge with a nitrogen purge. The clay was milled in a Merlin mixer to give a powder. Further drying in a 150° C. vacuum oven followed by further blending gave a very fine powder of low (<2%) moisture content in about 70% yield.

Characterization data for a series of organoclay compositions is provided in Table 8. The heading "Exp wt % of C" stands for Experimentally determined weight percentage of carbon present in the organoclay composition". The heading "Exp wt % of H" stands for Experimentally determined weight percentage of hydrogen present in the organoclay composition", etc. Similarly, the heading "Calc wt % C" stands for "Calculated weight percent carbon present in the organoclay composition", etc.

TABLE 8

Elemental Analysis Of Pyridinium Modified Montmorillites

| Nanoclay | Exp wt % of C | Exp wt % of H | Exp wt % Na | Calc wt % C | Calc wt % H |
|---|---|---|---|---|---|
| Sodium montmorillite | None | | 2.46 | None | |
| TPPy-MMT | 21.52 | 1.95 | 0.24 | 28.28 | 1.80 |
| Phenoxy-TPPy-MMT | 25.28 | 2.10 | 0.17 | 31.77 | 1.98 |
| CumylPhenoxy-TPPY-MMT | 26.41 | 2.36 | 0.24 | 36.74 | 2.52 |
| BAPP-TPPy-MMT | 24.65 | 2.09 | 0.17 | 32.52 | 2.10 |

The organoclay compositions were further characterized in terms of "d-spacing", and "percent of exchange" of inorganic ions by organic ions using the carbon combustion analysis data, the hydrogen combustion analysis data, and the sodium ion concentration data. The data are presented in Table 9 and while the degree of exchange indicated varies somewhat according to the method of analysis used in the calculation, all three methods indicate extensive exchange of sodium ion by the pyridinium cation.

TABLE 9

D-Spacing Of Organoclay Compositions And Percent Ion Exchange

| | Percent Exchange (%) | | | |
|---|---|---|---|---|
| Organoclay Composition | Based on C analysis | Based on H analysis | Based on Na analysis | d spacing (Å) by XRD |
| Sodium Montmorillite | — | — | — | 11 |
| TPPy-MMT | 76 | 108 | 91 | 19 |

TABLE 9-continued

D-Spacing Of Organoclay Compositions And Percent Ion Exchange

| | Percent Exchange (%) | | | |
|---|---|---|---|---|
| Organoclay Composition | Based on C analysis | Based on H analysis | Based on Na analysis | d spacing (Å) by XRD |
| Phenoxy-TPPy-MMT | 80 | 106 | 94 | 19 |
| CumylPhenoxy-TPPY-MMT | 72 | 94 | 91 | 23 |
| BAPP-TPPy-MMT | 75 | 100 | 94 | 19 |

Preparation of Polymer-Organoclay Composite Compositions Comprising Quaternary Phosphonium Cations Example 61

Melt Mixing Experiment with ODPA-DDS Polyetherimide Polymers

Example 61

Melt Mixing Experiment with ODPA-DDS Polyetherimide Polymers

In order to examine chain growth behavior of polyetherimide comprising structural units derived from ODPA and DDS in the presence of organoclay compositions comprising N-aryl pyridinium cations, a melt-mixing experiment was carried out on a Haake Rheomix instrument. A low molecular weight polymer consisting essentially of structural units derived from ODPA and DDS was melt mixed TPPy-MMT at 5 wt % silicate level at 390° C. and 40 rpm. The change in torque was monitored over a 60 min period. Identical experiments were carried out with the same low molecular weight polymer without added organoclay and with the organoclay composition CumylPA-mATPP-MMT which comprises phosphonium cation 15. In each of the three experiments samples were taken at various time intervals and the molecular weight was measured. From the molecular weight and torque data, it was determined that the low molecular weight polymer increased in molecular weight in the presence of the organoclay composition comprising the pyridinium cation, and in the absence of an organoclay. In contrast, in the presence of phosphonium nanoclay (CumylPA-mATPP-MMT) comprising organophosphonium cation 15, conversion of polymer to higher molecular weight polymer was slow relative to the behavior of the composition comprising the pyridinium cation and the composition containing no organoclay.

Example 62

BPADA-DDS-Aniline Polyetherimide with 7 wt % Layered Silicate TPPy-MMT

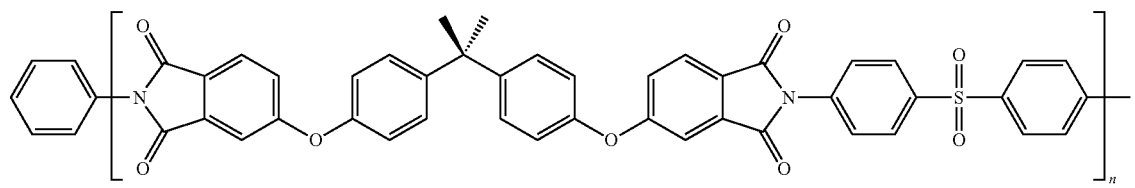

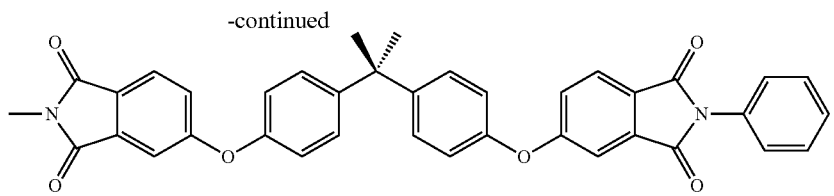

BPADA-DDS-Aniline Polyetherimide

A 3 L round bottom flask was charged with DDS (54.28 g, 0.2186 mole), cumylphenoxy-TPPy-MMT (43.8 g) and veratrole (700 g). The resulting mixture was sonicated with for 3 hour using a 450 W model of Branson Sonifier 450 with a 0.5" diameter solid probe at 40% output setting. After sonication, the mixture became very thick and difficult to stir. At this point, DDS (61.12 g, 0.2461 mole), BPADA (250 g, 0.469 mole), aniline (1.825 g, 0.0196 mole) and veratrole (700 g) were added. The reaction mixture was mechanically stirred and heated to 200° C. over a two hour period, and was kept at this temperature for another 3 hours, and azeotropically removed water was collected in a Dean-Stark trap. When the theoretical amount of water had been removed about 500 g of veratrole was removed, and the resulting mixture was allowed to cool to room temperature and poured into methanol (8 L) in a high-speed blender. The product polymer-organoclay composite composition was isolated by filtration and the filter cake was rinsed with 500 mL of methanol and dried in a vacuum oven at 150° C. for 24 hours and then at 200° C. for another 24 hour (350 g, 88% yield).

Example 63

ODPA-DDS-Aniline With 7 wt % Layered Silicate TPPy-MMT

Preparation of ODPA-DDS-Aniline Polyetherimide: A typical procedure for synthesis of the ODPA-DDS polyetherimide is as follows. ODPA (15.18 kg) was charged to a stirred glass lined reactor with 123.65 kilograms (kg) of oDCB with 0.35 kg aniline. The reactor was heated to 180° C. using oil heating and 8 kg of oDCB was removed. The reactor was cooled to about 120° C. and 11.215 kg DDS added with stirring. The oil temperature was raised to 155° C. over 210 minutes, and the slurry temperature reached about 146° C. Water began to evolve; a nitrogen sweep was used to help remove water from the reactor. The oil temperature was raised to 171° C. and held there for 115 minutes. The reaction temperature increased to about 166° C. as water evolved. The slurry was still easily stirred. The oil temperature was raised to 186° C. and the reaction temperature increased to about 177° C. over the next 25 minutes. The DDS incorporation was judged sufficient to further increase the oil temperature to 195° C. giving a reaction slurry temperature of 179° C. Over the next hour 45 kg of condensate was removed. Heat was reduced and the reaction cooled to 50° C. No stickiness of the polymer was observed. The precipitated polyetherimide was removed from solution by centrifugation at about 12° C. using a 5 micrometer centrifuge bag. The polymer was dried at 150° C. in a double cone dryer. The resultant powder passed through a 2 mm sieve.

A 3 L round bottom flask was charged with DDS (41.14 g, 0.1657 mole), cumylphenoxy-TPPy-MMT (19.9 g) and veratrole (350 g). The resulting mixture was sonicated with for 3 hour using a 450 W model of Branson Sonifier 450 with a 0.5" diameter solid probe at 40% output setting. After sonication, the mixture became very thick and difficult to stir. At this point, DDS (31.71 g, 0.1277 mole), ODPA (95 g, 0.303 mole), aniline (0.714 g, 0.0077 mole) and veratrole (300 g) were added. The reaction mixture was mechanically stirred and heated to 200° C. over a two hour period, and was kept at this temperature for another 3 hours, and azeotropically removed water was collected in a Dean-Stark trap. When the theoretical amount of water had been removed about 250 mL of veratrole was removed, and the resulting polymer mixture was allowed to cool to room temperature overnight. Methanol (300 mL) was then added with agitation. The resultant polymer-organoclay composite composition powder was isolated by filtration and was rinsed with 500 mL of methanol and dried in a vacuum oven at 150° C. for 24 hours and then at 200° C. for another 24 hour (158 g, 88% yield).

Example 64

Film Comprising an N-Aryl Pyridinium Cation-Containing Polymer-Organoclay Composite Composition A 3 inch wide and 4 mil thick film was extruded from a resin composition consisting of 31% by weight of a polymer-organoclay composite composition prepared in Example 63 (ODPA-DDS polyetherimide containing 7 wt % Layered Silicate TPPy-MMT) and 69% by weight of the polymer-organoclay composite composition prepared in Example 62 (BPADA-DDS polyetherimide containing 7 wt % layered silicate TPPy-MMT). A 16 mm PRISM extruder equipped with a venting/finishing screw and a 3-inch film die was used. The resin composition was fed at rate of about 0.5 lb per hour. The screw speed was set at 200 rpm, barrel temperature at 370° C., and film die temperature at 380° C. The die pressure was about 1500 psi, during the film extrusion. For purposes of comparing the effect of the organoclay on die pressure, a control film of similar composition but lacking the organoclay was extruded on the same extruder system and the die pressure was measured and found to be only about 900 psi. GPC analysis of the extruded film indicated that the polymer built molecular weight during the film extrusion process. Although the extruded film was creasable, the TEM images of the film indicated relatively poor dispersion of the TPPy-MMT organoclay within the polyimide matrix. The relatively poor dispersion of the organoclay was reflected in the CTE results wherein only 18% CTE reduction was observed relative to the unfilled control sample. This was equivalent to a relatively modest 2.6% reduction in CTE per wt % of silicate.

TABLE 10

GPC And CTE analysis of the extruded film

| Sample | Mp* (Kg/mol) | Mw (Kg/mol) | Mn (Kg/mol) | CTE 0-200° C. (ppm/° C.) |
|---|---|---|---|---|
| Starting material | 28.8 | 36.9 | 15.6 | N.A. |
| Extruded Film | 50.5 | 52.2 | 20.7 | 50 |

*"peak molecular weight"

The data gathered in Table 10 demonstrate that the molecular weight of polymer organoclay composition may be increased significantly by extrusion into a film.

Examples 65-72

Polymer-Organoclay Composite Compositions Comprising a Resin Blend of 31 wt % of BPADA-DDS Polyetherimide and 69 wt % of ODPA-DDS Polyetherimide and Films Made Therefrom A series of polymer-organoclay composite compositions comprising a polyetherimide (ODPA-DDS polyetherimide or BPADA-DDS polyetherimide) and an organoclay composition (CumylPhenoxy-TPPy-MMT) were prepared and are shown in Table 11 below. In each of Examples 65-68 the diamine was DDS and the endcapping agent was aniline. In each of Examples 65-68 the amount of endcapping agent was adjusted according to a "targeted" molecular weight. Two molecular weight targets, 25 Kg/mol ("Lo") and 30 Kg/mol ("Hi"), were prepared for each resin.

TABLE 11

Polyimide Compositions Comprising CumylPhenoxy-TPPy-MMT

| Example | Polymer | Anhydride | Targeted Mw | Targeted Mn (Kg/mol) | Anhydride/ Amine ratio | wt % Silicate | Mw (Kg/mol) | Mn (Kg/mol) |
|---|---|---|---|---|---|---|---|---|
| 65 | ODPA-DDS polyetherimide - Hi | ODPA | 30 | 15.6 | 1.02 | 7 | 30.6 | 14.8 |
| 66 | ODPA-DDS polyetherimide - Lo | ODPA | 25 | 13.1 | 1.02 | 7 | 26.0 | 13.0 |
| 67 | BPADA-DDS polyetherimide - Hi | BPADA | 30 | 22.0 | 1.00 | 7 | 78.9 | 30.4 |
| 68 | BPADA-DDS polyetherimide - Lo | BPADA | 25 | 18.3 | 1.00 | 7 | 58.0 | 24.6 |

Next a blend of 31 wt % of BPADA-DDS polyetherimide and 69 wt % of ODPA-DDS polyetherimide polyimide resins was prepared from each of the resins of Examples 65-68 and four films with the different molecular weight combinations were extruded (Table 11). These combinations were used to investigate the effect of molecular weight on the ductility of film at 7 wt % of silicate loading.

A 16 mm Prism extruder with venting/finishing screw equipped with a 3-inch film die was used. The combinations were fed at rate of 0.5 lb per hour. The screw was set at 200 RPM, barrel temperature at 380° C. and film die temperature at 390° C. The die pressure was about 1200 psi. Data for the extruded films is gathered in Table 12.

TABLE 12

Extruded Films Comprising Combinations Of Polyetherimides As The Polymeric Resin Component Of A Polymer-Organoclay Composite Composition

| Example | Polyimide Blend Compositions | | Resin | | Extruded Film | | $CTE_{MD}$ 1st heat, 0-200° C. (ppm/° C.) |
|---|---|---|---|---|---|---|---|
| | | | Mw (Kg/mol) | Mn (Kg/mol) | Mw (Kg/mol) | Mn (Kg/mol) | |
| 69 | 31 wt % ODPA-DDS polyetherimide - Lo | 69 wt % BPADA-DDS polyetherimide - Lo | 46.9 | 18.9 | 49.5 | 20.2 | nd* |
| 70 | 31 wt % ODPA-DDS polyetherimide - Hi | 69 wt % BPADA-DDS polyetherimide - Lo | 65.9 | 22.8 | 56.9 | 21.9 | nd |

TABLE 12-continued

Extruded Films Comprising Combinations Of Polyetherimides As The
Polymeric Resin Component Of A Polymer-Organoclay Composite Composition

| Example | Polyimide Blend Compositions | | Resin | | Extruded Film | | $CTE_{MD}$ $1^{st}$ heat, 0-200° C. (ppm/° C.) |
|---|---|---|---|---|---|---|---|
| | | | Mw (Kg/mol) | Mn (Kg/mol) | Mw (Kg/mol) | Mn (Kg/mol) | |
| 71 | 31 wt % ODPA-DDS polyetherimide - Lo | 69 wt % BPADA-DDS polyetherimide - Hi | 46.3 | 19.1 | 51.8 | 21.2 | nd |
| 72 | 31 wt % ODPA-DDS polyetherimide - Hi | 69 wt % BPADA-DDS polyetherimide - Hi | 57.8 | 20.8 | 61.0 | 23.6 | 44 |
| Control | 31 wt % PDFS48 ODPA-DDS polyetherimide | 69 wt % com. BPADA-DDS polyetherimide | 40.1 | 15.3 | 50.5 | 21.7 | 61 |

*nd = "not determined"

The data for the extruded films indicate that molecular weight build of the ODPA-DDS polyetherimide resin is well behaved in polymer-organoclay composite compositions comprising the organoclay composition CumylPhenoxy-TPPy-MMT. Thus, in Example 69, the film prepared from a polymer-organoclay composite composition formulation of low molecular weight ODPA-DDS polyetherimide resin and low molecular weight BPADA-DDS polyetherimide resin has a post-extrusion molecular weight comparable to a control blend comprising no organoclay. However, while the control is ductile, the film sample of Example 69 was brittle. Among the four film samples of Table 12 comprising the polymer-organoclay composite composition only the film of Example 72 ("Hi"-"Hi") was found to be a creaseable film, creasability being a reliable and often used indicator of ductility. The result suggest that a higher molecular weight polymeric resin is needed to offset the decrease in ductility caused by the presence of the relatively large amount (7 weight percent) of silicate in the film. TEM images of the film with CumylPhenoxy-TPPy-MMT indicated that the organoclay was well dispersed in the polymer matrix. The TEM analysis was consistent with the CTE measurement wherein an overall CTE reduction of 28% was observed compared to the unfilled control. This is equivalent to 4% reduction in CTE per percent of silicate loading. Films comprising a polymer-organoclay composite composition such as those illustrated in Examples 69-72 are at times referred to as "nanocomposite films" owing to the very high level of exfoliation of the organoclay composition containing in the polymer-organoclay composite composition used to prepare the films.

Preparation of Phenone-Containing Quaternary Phosphonium Salts

Example 73

Preparation of 4-Iodo-phenoxy-benzophenone

A 1000 mL 3-necked round-bottomed flask fitted with a Dean-Stark trap, condenser, stir-bar and nitrogen gas adaptor was charged with 4-iodophenol (19.0 g, 0.086 mol), 4-fluorobenzophenone (15.72 g, 0.079 mol), potassium carbonate (7.16 g, 0.0518 mol), DMF (157 mL) and toluene (16 mL). The resulting mixture was stirred and refluxed for 2 hours (solution temperature ~160° C.) under nitrogen atmosphere. Water was collected at the trap during this period of time. After 2 hours, the reaction was cooled to room temperature, and water (400 mL) was added to the reaction mixture and the desired product precipitated out of solution as a cream white solid. The product was further purified by re-crystallization isopropanol (400 mL) to give the desired product as a white crystalline solid (25 g, 87% yield).

Example 74

Synthesis of 4-(4-Benzoyl-phenoxy)-phenyl Triphenyl Phosphonium Iodide, 32

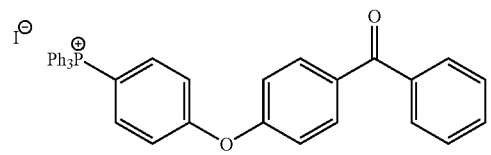

32

To a 250 mL 3-necked round-bottomed flask fitted with a condenser and nitrogen gas inlet were added 4-iodo-phenoxy-benzophenone (25.00 g, 0.0624 mol), triphenylphosphine (16.38 g, 0.0624 mol), palladium acetate (0.14 g, 0.624 mmol) and degassed xylene (125 mL). Argon was bubbled through the solution for 1 hour to eliminate oxygen. The mixture was refluxed for 2 hours whereupon a dark-orange solution was formed. The reaction mixture was cooled to room temperature, and the phosphonium salt phase-separated from xylene as a dark orange solid. Reaction progress was monitored using TLC with a 90/10 methylene chloride/methanol developing solution. The product was further purified by flash chromatography using silica gel 60 (500 g) and methylene chloride with 5% methanol as solvent. A red impurity was eluted first followed by the desired phosphonium salt 32 (40 g, 82% yield) which was isolated as a cream colored powder after removal of solvent.

Preparation of Bis-4-(triphenylphosphonium) Benzophenone dichloride

A 20 mL capped test tube was fitted with a nitrogen purge and the reagents dichlorobenzophenone 1.0 g (0.00398 mol) and triphenylphosphine 2.1 g (0.00769 mol) were added. The reaction was heated to 270 C using an aluminum hot block for 2 h. Following cooling to room temperature the solid was dissolved in chloroform and added dropwise to hexanes. The resulting water soluble purple solid was redissolved in chloroform and reisolated by first adding the chloroform solution to 20 mL of ethylether and collection by vacuum filtration. Analysis by GC-MS showed two peaks, one corresponding to the monophosphonium product and a second to the diphosphonium product. Final isolated yield was 1.1 g.

Preparation of Polymer-Organoclay Composite
Compositions Comprising Phenone-Containing
Quaternary Phosphonium Cations Example 75

Synthesis of PhEK-MMT, the Organoclay
Composition Derived from
4-(4-Benzoyl-phenoxy)-phenyl-triphenylphosphonium
iodide and Sodium Montmorillonite A 5 L round-bottom flask equipped with a mechanical stirrer was charged with sodium montmorillonite (30 g, 0.03 mole) and deionized water (2.5 L). The solution was stirred and heated at 85° C. until the sodium montmorillonite was well dispersed. A solution of phosphonium salt 32 (22.8 g, 0.034 mole) in acetonitrile (600 mL) was warmed to about 60° C. and was then added to the suspension of sodium montmorillonite over 10 min. After the addition of the salt solution, the reaction mixture was stirred at 85° C. for about 3 hours.

The organoclay composition (also at times referred to as a modified montmorillonite, or simply "the modified clay") was collected by filtration, and washed with hot water (2 L, 80° C.) to remove inorganic salt impurities and the sodium iodide by-product of the exchange reaction. The modified clay was further purified by re-dispersing in acetonitrile (2 L) at 60° C., followed by filtration to remove any excess phosphonium salt. The purified clay was dried under vacuum for 24 hours at 150° C. and was milled to give PhEK-MMT as a fine powder (40 g, 72% yield)

Synthesis of Bis-4-(triphenylphosphonium)
Benzophenone-MMT

A 500 Ml Beaker was charged with 200 mL of water and 0.7183 g of bis-4-(triphenylphosphonium) benzophenone dichloride. The mixture was heated to reflux for 2 h. After cooling to room temperature the organocaly was isolated by centrifugation, washed with two 200 mL portions of deionized water and recollected by centrifugation.

Preparation of Polymer-Organoclay Composite
Compositions Comprising Phenone-Containing
Quaternary Phosphonium Cations Examples 76-78

Polymer-Organoclay Composite Composition
Comprising PEEK 450G

PEEK 450G resin was cryogenically ground with a 3 mm mesh. The resulting material had a mix of fine powder and larger granules. The ground material was passed through a 1 mm screen and the fine powder granules were collected. The grinding was necessary to feed the material through the small diameter 16 mm extruder, and to insure good mixing of the ground clay.

The ground resin was blended with powdered PhEK-MMT (See Example 75 for preparation) in an amount corresponding to an inorganic silicate loading of 5%. To compare the effect of the chemical structure of the organic cation on the properties of the polymer-organoclay composite composition two other organically modified clays were prepared as well (Examples 77 and 78). Thus blends of the ground PEEK 450G resin were also prepared with the organoclay compositions Cumyl-MMT (Example 77) and TPP-MMT (Example 78). The preparation of Cumyl-MMT, an organoclay composition comprising organophosphonium cation 15 is given in Example 15 of this disclosure. TPP-MMT is an organoclay composition comprising silicate layers derived from sodium montmorillonite clay and a tetraphenyl phosphonium halide and can be prepared by methods disclosed herein. The amounts of organoclay composition and polymeric resin used in Examples 76-78 are given in Table 13. The formulations were mixed by placing both components in a plastic bag and shaking for several minutes.

TABLE 13

|  | Example | | | |
| --- | --- | --- | --- | --- |
|  | Control | 76 | 77 | 78 |
| Polymeric resin | PEEK 450G | PEEK 450G | PEEK 450G | PEEK 450G |
| Silicate Loading | 0% | 5% | 5% | 5% |
| Organoclay composition | None | PhEK-MMT | Cumyl-MMT* | TPP-MMT** |
| Weight % Silicate in Clay | 0% | 65% | 58% | 75% |
| Weight Organoclay composition† | 0 grams | 16.92 grams | 18.97 grams | 14.67 grams |
| Weight PEEK 450G | 220.00 grams | 203.08 grams | 201.3 grams | 205.33 grams |
| Total Weight of Formulation | 220.00 grams | 220.00 grams | 220.00 grams | 220.00 grams |

*The preparation of the Organoclay composition Cumyl-MMT is given in Example 15.
**TPP-MMT is an organoclay composition derived from sodium montmorillonite clay and a tetraphenyl phosphonium halide salt After shaking, the mixture of the organoclay composition and the polymeric resin was extruded at 0.5 pounds per hour on a 16 mm twin screw extruder (L/D=25) with a co-rotating and intermeshing screw, and the extrudate was pelletized. The pellets collected for each material at the low throughput (0.5 lb/hr) were compression molded to thin disks using a hot press. The disks were submitted for TEM analysis to determine the extent of dispersion. Results are gathered in Table 14.

TABLE 14

TEM Analysis Results

| Example | Organoclay composition | Polymeric Resin | TEM Rating |
|---------|------------------------|-----------------|----------------|
| 76 | PhEK-MMT | PEEK 450G | Good Dispersion |
| 77 | Cumyl-MMT | PEEK 450G | Poor Dispersion |
| 78 | TPP-MMT | PEEK 450G | Poor Dispersion |

Transmission electron microscopy (TEM) analysis of the extruded polymer-organoclay composite composition comprising the PhEK-MMT modified clay in PEEK (Example 76) indicated good dispersion of the organoclay composition into the polymer matrix. The dispersion obtained was superior to that observed in Examples 77 and 78. No large tactoids of clay were visible and most of the clay appears to be in the form of small stacks of silicate layers indicating a high degree of exfoliation of the organoclay composition into the polymer matrix. It is believed that the enhanced dispersion observed for the polymer-organoclay composite composition of Example 76 is due to the structural similarities between the polymeric resin used, PEEK 450G, and the organoclay composition used, PhEK-MMT. The PEEK 450G resin and the organoclay composition PhEK-MMT comprise 4-aryloxy substituted benzophenone moieties. Neither of the organoclay compositions employed in Examples 77 and 78 comprise a 4-aryloxy substituted benzophenone moiety.

Transmission electron microscopy (TEM) analysis of the extruded polymer-organoclay composite composition of Example 78 (cumyl-MMT modified clay in PEEK) indicated relatively poor dispersion. Large tactoids of the organoclay composition were visible in the transmission electron micrographs taken, which indicated that at least a portion of the organoclay composition did not exfoliate completely into the PEEK polymer matrix.

TEM results for the TPP-MMT modified clay in PEEK (Example 78) likewise indicated relatively poor dispersion of the organoclay composition in the polymeric resin. Large tactoids of clay were visible in the transmission electron micrographs taken, which indicated that at least a portion of the organoclay composition did not exfoliate completely into the PEEK polymer matrix.

Preparation of Polymer-Organoclay Composite Compositions Using Melt Mixing Techniques in Compositions Substantially Free of Polyetherimides Examples 79-81

The following Examples illustrate the use of methodology provided by the present invention for the preparation of polymer-organoclay composite composition which are substantially free of polyetherimides and which the degree of exfoliation of the constituent organoclay composition is at least 10 percent. Thus, 70 grams of a polymeric resin (See Table 15 below) was combined with 4.98 grams of the organoclay composition BAPP-TPPy-MMT. The powders were blended by shaking in a closed container for 2 minutes. The resulting mixture was heated in a HAAKE mixing bowl at 50 rpm. The mixture was held at temperature according to Table 15. The molten mixture in the HAAKE mixing bowl was sampled every five minutes. The 15 minute sample was pressed into a film between two sheets of Teflon lined foil at 760° F. The pressed film sample was then submitted for analysis by Thermal Mechanical Analysis and the CTE measured over the range 30 to 200 C. The pressed film had a CTE values listed in Table 15.

TABLE 15

Polymer-Organoclay Composite Compositions Prepared By Melt Mixing

| Example | Polymeric Resin | Organoclay composition | Mixing Temperature | CTE of Film (30-230° C.) |
|---------|-----------------|------------------------|--------------------|--------------------------|
| 79 | PEEK 150P | BAPP-TPPy-MMT | 380° C. | 67 ppm/° C. |
| 80 | PPSU* | BAPP-TPPy-MMT | 340° C. | 61 ppm/° C. |
| 81 | PES** (ULTRASON E2010) | BAPP-TPPy-MMT | 330° C. | 54 ppm/° C. |

*PPSU = RADEL R,
**PES = POLYETHERSULFONE

The data in Table 15 demonstrate that polymer-organoclay composite compositions which are substantially free of polyetherimides may be prepared according to the method of the present invention by melt mixing a quaternary organoclay composition with a polymeric resin at a temperature in a range between about 300° C. and about 450° C. The data suggest that in order to attain high levels of exfoliation (>10% exfoliation) the polymeric resin and the organoclay composition should be melt mixed at greater shear than is typically provided in a low shear mixer such as a Haake mixer. It is believed that the compositions of 79-81 would have attained a % exfoliation of greater than 10% had the melt mixing been carried out in a higher shear environment such as a twin screw extruder operated at a temperature in a range between about 300° C. and about 450° C.

Preparation of Polymer-Organoclay Composite Compositions Using Melt Mixing Techniques in Compositions Comprising a Polyetherimide Example 82

Preparation of Polymer-Organoclay Composite Composition Comprising Polyetherimide 2.0 g of sodium cloisite clay (Southern Clay, Inc. 0.000926 cation equivalents per g) was dispersed in 200 ml of water with vigorous stirring. 0.692 g of methylene blue was added to the dispersion and the mixture heated at reflux for 60 min. The mixture was then cooled to room temperature and the product organoclay composition (modified clay) was isolated by centrifugation. The wet clay was washed by twice by being redispersed in 200 ml of DI water and reisolated by centrifugation. The washed wet clay was dried at 120° C. for 2 h and then ground to give a fine bluish gray solid.

5.19 g of the organoclay composition (methylene blue modified clay) (4 wt % silica) prepared as above and 59.85 g of oxydiphthalic anhydride was added to 365 ml of oDCB and the vessel was immersed in a bath sonicator and heated until a fine dispersion of the clay that resisted settling was obtained. The Flask was then equipped with an overhead stirrer and a Dean-Stark trap and 46.35 g of DDS and 0.08978 g of aniline were added. 100 mL of oDCB was used to rinse the DDS into the vessel. The mixture was stirred and heated slowly to reflux over three hours and the water removed by azeotropic distillation. After heating at reflux for 18 h, a dispersion of fine powder was obtained. The dispersion was then transferred to a Haake melt mixer and the solvent removed by devolatilization at 390 C and 50 rpm for 60 min. Samples were pulled at 5 min intervals during the devolatilization. The 15 minute sample pressed into a film between two sheets of Teflon lined foil at 760 F. The pressed film sample was then submitted for analysis by Thermal Mechanical Analysis and the CTE measured over the range 30 to 200 C. The pressed film had a CTE of 41 ppm/C, 14.8% exfoliated.

Examples 83-93

A series of polymer-organoclay composite compositions comprising polyetherimide were first prepared using one of the melt mixing, the in situ polymerization, or the solvent mixing techniques described herein. (See for example, Examples 27-29 which illustrate the in situ polymerization technique). The materials were obtained from the polymerization process as a large solid block of dried cake. The cake is broken into several ~1" pieces and the pieces were ground to a fine powder using a retsch mill and a 3 mm mesh screen. The fine powdered polymer-organoclay composite composition was then extruded alone or mixed with another powdered polymer-organoclay composite composition and extruded. The extruder employed was a 16 mm twin screw extruder (L/D=25) with a co-rotating and intermeshing screw configured such that the polymer-organoclay composite compositions could be extruded directly into films or first pelletized and then formed into a film in a second extrusion step. The screw design provided for melting, mixing, devolatilizing, and conveying the powdered polymer-organoclay composite composition from the feed inlet to the film-forming die outlet of the extruder. A 3" (3 inch) or a 6" (6 inch) die was routinely used to convert the molten polyetherimide-containing polymer-organoclay composite composition into films.

In the Control and Examples 83-85 the powdered polymer-organoclay composite composition was first pelletized using the 16 mm Prism extruder with a venting/finishing screw and 3 mm pelletizing die. The organoclay composition-polymeric resin mixture (polymer powder blends) were "starve-fed" at rate of 1 lb per hour. The screw speed was set at 250 RPM, the barrel temperature at 385° C., and die temperature at 385° C. The pellets obtained from the finishing extrusion were dried overnight in a vacuum oven at 150° C. and were extruded to film using a Welex 1¼" single screw extruder with a 6" wide film die and barrier-type screw. The extruder screw was "starve-fed" at rate of 4 lb/hr and screw rotation speed of 25 RPM. The die gap was approximately 8 mils, and the extruded film was pulled with a film take-off unit at various speeds to obtain film of many different thicknesses.

In general, upon exiting the die in a slit flow, the molten resin was pulled by a set of rollers, the roll speed which could be adjusted to pull the film faster than the rate at which the molten polymer-organoclay composite composition exited the die, thereby thinning and orienting the product film. Circulating oil through the interior of the rollers allowed for maintenance of a specified temperature. Typically, the films were extruded using a chill casting process in which the rollers were configured in an "S wrap" configuration, where the film was wound around the middle and bottom rollers to allow sufficient time for cooling heat transfer. The film was then pulled by another set of rollers, the nip rolls, which put tension in the film, keeping the film in close contact with the front rollers. The film then passed through the nip rollers and was collected on a winder. Other conventional film handling equipment may also be used.

Exemplary films comprising polyetherimide-containing polymer-organoclay composite compositions were prepared and the thermal expansion coefficients (CTE) for selected film samples were measured in the machine and transverse directions. Test results are gathered in Table 16.

TABLE 16

CTE and Glass Transition Temperature (Tg) For Extruded Films Comprising A Polymer-Organoclay Composite Composition Containing As The Polymeric Component A 100% BPADA-DDS Polymer.

| Example | % Silicate | Modifier | Process | $CTE^1$ | $CTE^2$ | % Exfoliation MD/TD | Tg° C. | No. Extrusions |
|---|---|---|---|---|---|---|---|---|
| Control | 0 | — | — | 58.2 | — | — | | 2x |
| 83 | 5 | TPP | Melt mix* | 48.4 | — | 15%/— | | 2x |
| 84 | 5 | 14 | Melt mix | 45.0 | — | 20.9%/— | | 2x |
| 85 | 10 | 14 | Melt mix | 39.9 | — | 28.2%/— | | 2x |
| 86 | 5 | 15 | Solvent mix** | 48.7 | 50.9 | 14.5%/10.5% | 233 | |
| 87 | 10 | 15 | Solvent mix | 38.4 | 41.8 | 30.9%/24.9% | 226 | |
| 88 | 5 | 14 | In situ polym.† | 39.6 | 42.0 | 30.5%/26.3% | 240 | |
| 89 | 10 | 14 | In situ polym. | 33.7 | 34.2 | 39.3%/38.5% | 236 | |
| 90 | 5 | 15 | In situ polym. | 39.9 | 44.6 | 29.9%/21.6% | 241 | |
| 91 | 10 | 15 | In situ polym. | 31.6 | 33.5 | 43.1%/39.7% | 233 | |
| 92 | 5 | 15 | In situ polym. | 39.2 | 44.9 | 31.2%/21.1% | 239 | |
| 93 | 5 | 15 | In situ polym. | 43.6 | 45.2 | 23.3%/20.6% | 238 | |

*The melt mixing technique (See Examples 76-78) was used to prepare the polymer-organoclay composite composition.
**The solvent mixing technique (See Examples 52-53) was used to prepare the polymer-organoclay composite composition.
†The in situ polymerization technique (See Examples 27-29 and 38-51) was used to prepare the polymer-organoclay composite composition.

Preparation of Polymer-Organoclay Composite Compositions Via In Situ Polymerization Coupled with Verification Stoichiometry

Example 94

Preparation of an Organoclay Composition Comprising the 1,2-Dimethyl-3-hexadecylimidazolium Cation To a 2 L three-necked round bottom flask equipped with overhead mechanical stirrer were added 1-chlorohexadecane (260 g, 1.00 moles), 1,2 dimethylimidazole (91.0 g, 0.95 moles), and $CH_3CN$ (500 mL) and the two-phase reaction mixture was vigorously stirred in an oil bath at 80° C. After 72 h, the reaction mixture was cooled to room temperature and the product was crystallized overnight. The crystallized solid was filtered, thoroughly washed with cold $CH_3CN$, and vacuum dried at 70° C. for 3 days to give 1,2-dimethyl-3-hexadecylimidazolium chloride as a slightly off-white solid, 220 g, 62% yield.

To a 2 L three-necked round bottom flask equipped with an overhead stirrer was added sodium cloisite (30 g, Southern Clay, USA) and deionized water (1 L) and the clay was mechanically stirred for 2 h at room temperature. To this dispersion of clay was added an aqueous solution of 1,2-dimethyl-3-hexadecylimidazolium chloride (16 g in 200 mL) via pipette and the reaction mixture was briefly heated to 80° C. for 2 h and stirred at room temperature overnight. The precipitate was filtered, thoroughly washed with cold water and finally with $CH_3OH$, and vacuum dried at 70° C. for 3 day to afford the product organoclay composition as an off-white solid (33 g, 94% yield).

Example 95

In Situ Polymerization Coupled with Verification of Stoichiometry to Afford a Polymer-Organoclay Composite Composition Comprising BPADA-DDS Polyetherimide and an Imidazolium Modified Clay (7% Silicate Loading)

To a SILVERSON high shear mixer are added the imidazolium modified clay (14 g) and oDCB (450 mL) and the mixture is heated to 120° C. for 2 hours while maintaining vigorous mixing. The mixing system comprising the SILVERSON high shear mixer was equipped with a reservoir fitted with heat tape and a temperature controller. The contents of the reservoir were introduced into the bottom of the SILVERSON mixer. A recycle line further connected the SILVERSON mixer back to the reservoir. After cooling to room temperature, the reaction mixture is transferred to a 2 L three-necked round bottom flask equipped with overhead mechanical stirrer, dean-stark trap, and condenser. To this flask is added BPADA (74.2 g) and the mixture was stirred at 150° C. After 2 h, DDS (29.4 g) is added and the oil bath temperature was gradually increased to 210° C. and the reaction is carried on for another 3 h. The reaction mixture is assayed at least once during the polymerization and diamine or dianhydride is added as needed in order to a achieve the desired preselected stoichiometry. The polymerization is then continued. Following polymerization, the reaction mixture is cooled, precipitated into $CH_3OH$, filtered, and vacuum dried to afford the product polymer-organoclay composite composition as a brown solid exhibiting a CTE of about 37 ppm/° C.

Example 96

In Situ Polymerization with Verification of Stoichiometry BPADA-DDS Polyetherimide in the Presence of 7 Wt % Cumylphenoxy-Tppy-MMT Layered Silicate The targeted degree of polymerization was 30. Aniline was used as an end-capper. A 12 L round bottom flask was charged with DDS (280 g, 1.128 mole), CumylPhenoxy-TPPy-MMT (280 g) and veratrole (5.5 kg). The mixture was homogenized using a Fisher Scientific PowerGen rotor-stator homogenizer (manufactured by Omni International) fitted with a 32 mm saw-tooth tip running at 9000 RPM for 45 minutes. The resulting mixture was sonicated for 2 hours using a 1500 W model of Autotune Series High Intensity Ultrsonic Processor equipped with a 1-inch diameter solid probe at 70% setting. After sonication, the mixture became very thick and difficult to stir.

A 10 gal reactor was charged with the dispersed clay mixture, DDS (458.8 g, 1.848 mole), BPADA (1600 g, 3.004 mole), aniline (11.68 g, 0.125 mole) and veratrole (4 kg). The reaction mixture was mechanically stirred and heated to 200° C. over a two-hour period, and was kept at this temperature for another 2 hours, and water distilled from the reaction mixture was collected.

A 10 g sample of the reaction mixture was the taken and the solvent was removed under nitrogen at 350° C. The residual polymer sample was pressed into a film and the infrared (IR) spectrum of the film was measured and the ratio of amine end-group to anhydride end-group was determined. From the IR spectrum it was found that that the polymer sample contained 0.4 mole % excess amine. Using this information the reaction stoichiometry was adjusted by adding BPADA (6.4 g) to correct for the excess amine content. The reaction mixture was then kept at 200° C. for an additional hour.

When no further evolution of water was observed, 3 L of veratrole was distilled from the reactor, and the resulting mixture was allowed to cool to room temperature overnight. The reaction mixture at ambient temperature was poured into methanol (50 L) in a high-speed blender and the resultant powder was transferred to a filtration centrifuge fitted with a one-micron filtration bag. The product polymer-organoclay composite composition was rinsed with another 10 L of methanol. The powder was collected and dry in an vacuum oven at 150° C. for 24 hours and then at 200° C. for another 24 hour to give the purified polymer-organoclay composite composition (2175 g, 86% yield).

Example 97

In Situ Polymerization with Verification of Stoichiometry, BPADA-DDS Polyetherimide in the Presence of CLOISITE 30B Layered Silicate A SILVERSON mixer (Lab in line mixer assembly model L4R-PA, square hole high shear screen, pumping at ~600 mL/min equipped as in Example 95) was used to mix the organoclay with solvent. 270 mL ortho-dichlorobenzene (oDCB) and 180 mL of veratrole was heated to 80 C and pumped through the SILVERSON mixer. The organoclay composition comprising CLOISITE 30B (13.56 g) and Bisphenol A dianhydride (BPADA) (74.51 g) was added slowly to the recirculating solvent. The mixture was run through the SILVERSON high shear mixer at 6000 rpm for 45 minutes in recirculation mode. The solution temperature increased from 56 C to 79 C. The resulting solution was transparent indicating exfoliation of the organoclay mixture. The mixture was transferred to a 1 L three-necked flask. The Flask was then equipped with an overhead stirrer and a Dean-Stark trap and placed in an oil bath that was heated to 100° C. 33.88 g of 4,4'-diaminodiphenyl sulfone (DDS) was added. The mixture was stirred and heated to reflux. The water removed by azeotropic distillation. Phthalic anhydride (0.86 g) was added and allowed to react for 2 hours. A 10 g sample of the reaction mixture was the taken and the solvent was removed under nitrogen at 350° C. The residual polymer sample was pressed into a film and the infrared (IR) spectrum of the film was measured and the ratio of amine end-group to anhydride end-group was determined. From the IR spectrum it was found that the polymer sample contained 0.5 mole % excess anhydride. Using this information the reaction stoichiometry was adjusted by adding DDS (0.182 g) to correct for the excess anhydride content. The reaction mixture was then kept at 200° C. for an additional hour. A second 10 g sample or the reaction mixture was treated as above. From the IR spectrum it was found that the polymer sample contained 0.5 mole % excess anhydride. An additional 0.189 g of DDS was added to the reaction mixture and allowed to react for 1 hour. At that time, the heat was removed and the reaction allowed to cool to room temperature. The resulting viscous mixture was transferred to a Haake melt mixer and mixed at 390 C and 50 rpm for 60 min. Samples were removed at 5 min intervals. The 15 minute sample was pressed into a film between two sheets of Teflon lined foil at 760 F. The pressed film sample was then submitted for analysis by Thermal Mechanical Analysis and the CTE measured over the range 30 to 200 C.

Example 98

In Situ Polymerization with Verification of Stoichiometry, BPADA-DDS Polyetherimide in the Presence of CLOISITE 15A Layered Silicate A SILVERSON mixer (Lab in line mixer assembly model L4R-PA, square hole high shear screen, pumping at ~600 mL/min) was used to mix the organoclay with solvent. 270 mL ortho-dichlorobenzene (oDCB) and 180 mL of veratrole was heated to 60 C and pumped through the SILVERSON mixer. The organoclay composition comprising CLOISITE 15A (13.51 g), 4,4'-diaminodiphenyl sulfone (DDS) (33.90 g), and 1 mL acetic acid was added slowly to the recirculating solvent. The mixture was run through the SILVERSON high shear mixer at 6000 rpm for 45 minutes in recirculation mode. The solution temperature increased from 60 C to 86 C. The resulting solution was viscous indicating exfoliation of the organoclay. The mixture was transferred to a 1 L three-necked flask using 50 mL of oDCB to complete the transfer. The Flask was then equipped with an overhead stirrer and a Dean-Stark trap and placed in an oil bath that was heated to 140° C. 70.02 g of bisphenol A dianhydride (BPADA) was added in two portions over 15 minutes. The mixture was stirred and heated to reflux for 2 hours. The water removed by azeotropic distillation. Phthalic anhydride (0.86 g) was added and allowed to react for 3 hours. A 10 g sample of the reaction mixture was the taken and the solvent was removed under nitrogen at 350° C. The residual polymer sample was pressed into a film and the infrared (IR) spectrum of the film was measured and the ratio of amine end-group to anhydride end-group was determined. From the IR spectrum it was found that the polymer sample contained 4.7 mole % excess anhydride. Using this information the reaction stoichiometry was adjusted by adding DDS (1.55 g) to correct for the excess anhydride content. The reaction mixture was then kept at 200° C. for 3 hours. An additional 0.6 g of DDS was added and allowed to react for 1 hour. A second 10 g sample or the reaction mixture was treated as above. From the IR spectrum it was found that the polymer sample contained 0.8 mole % excess anhydride. An additional 0.3 µg of DDS was added to the reaction mixture and allowed to react for 1 hour. At that time, the heat was removed and the reaction allowed to cool to room temperature. The resulting viscous mixture was transferred to a Haake melt mixer and mixed at 390 C and 50 rpm for 60 min. Samples were removed at 5 min intervals. The 15 minute sample was pressed into a film between two sheets of Teflon lined foil at 760 F. The pressed film sample was then submitted for analysis by Thermal Mechanical Analysis and the CTE measured over the range 30 to 200 C giving 40.1 ppm/C (28.6% Exfoliation).

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. An organoclay composition comprising alternating inorganic silicate layers and organic layers, said organic layers comprising a quaternary phosphonium cation having structure X

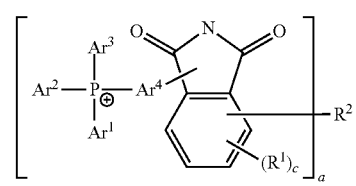

wherein $Ar^1$, $Ar^2$, and $Ar^3$ are independently $C_3$-$C_{50}$ aromatic radicals; $Ar^4$ is a bond or a $C_3$-$C_{50}$ aromatic radical; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_3$-$C_{50}$ aromatic radical; and $R^2$ is a halogen atom, a $C_1$-$C_{20}$ aliphatic radical, a $C_5$-$C_{20}$ cycloaliphatic radical, a $C_3$-$C_{50}$ aromatic radical, or a polymer chain.

2. The organoclay composition according to claim 1, wherein $Ar^4$ is a bond.

3. The organoclay composition according to claim 1, wherein $R^2$ is a polyetherimide polymer chain.

4. The organoclay composition according to claim 1, wherein $R^2$ is a polyether ketone polymer chain.

5. The organoclay composition according to claim 1, wherein $R^2$ is a polymer chain having a number average molecular weight $M_n$ in a range from about 1000 to about 50,000 grams per mole.

6. The organoclay composition according to claim 1, wherein $R^2$ is a polymer chain having a number average molecular weight $M_n$ in a range from about 1000 to about 20,000 grams per mole.

7. The organoclay composition according to claim 1, wherein $R^2$ is a polymer chain having a number average molecular weight $M_n$ in a range from about 1000 to about 5,000 grams per mole.

8. The organoclay composition according to claim 1, wherein $R^2$ is a polyetherimide polymer chain having a number average molecular weight $M_n$ in a range from about 1000 to about 50,000 grams per mole.

9. The organoclay composition according to claim 1, wherein $R^2$ is a polyetherimide polymer chain having a number average molecular weight $M_n$ in a range from about 1000 to about 20,000 grams per mole.

10. The organoclay composition according to claim 1, wherein said quaternary phosphonium cation has structure XI 11. The organoclay composition according to claim 1, wherein said quaternary phosphonium cation has structure XII

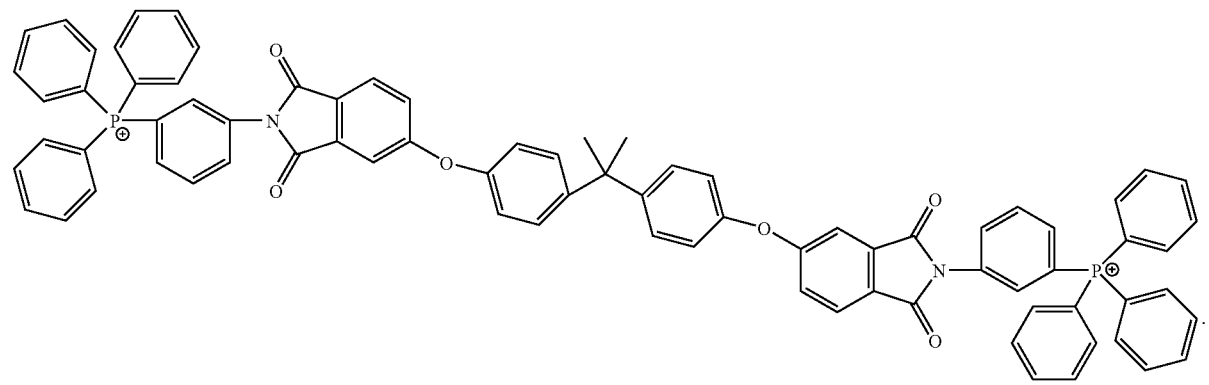

XI

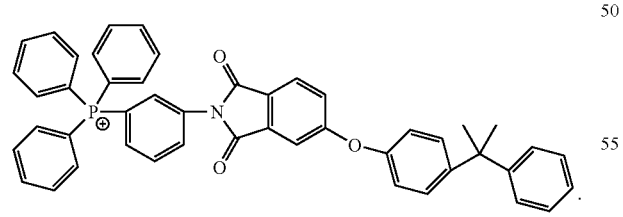

XII

12. The organoclay composition according to claim 1, wherein the inorganic silicate layers are derived from an inorganic clay selected from the group consisting of kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, and combinations thereof.

13. The organoclay composition according to claim 1, wherein the inorganic silicate layers are derived from an inorganic clay comprising a synthetic clay.

14. The organoclay composition according to claim 1, wherein the inorganic silicate layers are derived from montmorillonite.

15. The organoclay composition according to claim 1, wherein the organoclay composition is characterized by an interlayer distance of from about 5 to about 100 Angstroms.

16. A method for the preparation of an organoclay composition comprising a quaternary phosphonium cation having structure X

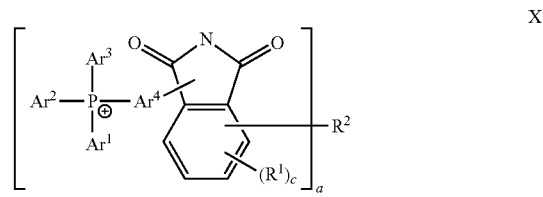

X wherein $Ar^1$, $Ar^2$, and $Ar^3$ are independently $C_3$-$C_{50}$ aromatic radicals; $Ar^4$ is a bond or a $C_3$-$C_{50}$ aromatic radical; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_3$-$C_{50}$ aromatic radical; and $R^2$ is a halogen atom, a $C_1$-$C_{20}$ aliphatic radical, a $C_5$-$C_{20}$ cycloaliphatic radical, a $C_3$-$C_{50}$ aromatic radical, or a polymer chain;

said method comprising:
(a) contacting in a first reaction mixture an organophosphonium salt having structure I

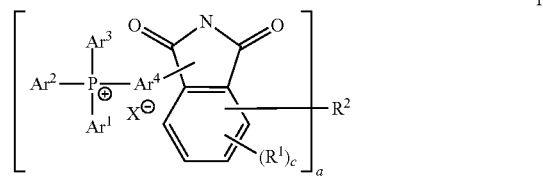

I wherein $Ar^1$, $Ar^2$, and $Ar^3$ are independently $C_3$-$C_{50}$ aromatic radicals; $Ar^4$ is a bond or a $C_3$-$C_{50}$ aromatic radical; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_3$-$C_{50}$ aromatic radical; $R^2$ is a halogen atom, a $C_1$-$C_{20}$ aliphatic radical, a $C_5$-$C_{20}$ cycloaliphatic radical, a $C_3$-$C_{50}$ aromatic radical, or a polymer chain; and $X^-$ is a charge balancing counterion;

with a layered silicate in the presence of a solvent; and
isolating the product organoclay composition
(b) isolating the product organoclay composition.

17. The method according to claim 16, wherein said contacting is carried out in a solvent comprising at least one organic solvent.

18. The method according to claim 16, wherein said contacting is carried out in a solvent comprising water.

19. The method according to claim 16, wherein said layered silicate comprises an inorganic clay selected from the group consisting of kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, and combinations thereof.

20. The method according to claim 16, wherein the inorganic silicate layers are derived from an inorganic clay comprising a synthetic clay.

21. The method according to claim 16, wherein said layered silicate comprises montmorillonite clay.

22. An organoclay composition comprising alternating inorganic silicate layers and organic layers, said organic layers comprising a polymeric quaternary phosphonium cation, wherein said polymeric quaternary phosphonium cation comprises structure XIII

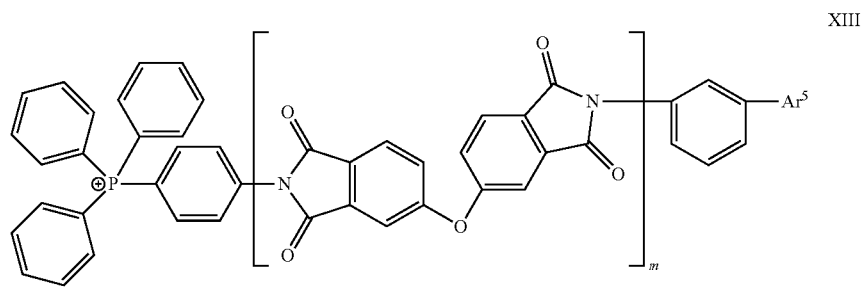

XIII wherein m is a number in a range from about 10 to about 1000; and $Ar^5$ is a $C_2$-$C_{50}$ aromatic radical, or a polymer chain.

23. The organoclay composition according to claim 22, wherein $Ar^5$ is an aromatic radical having structure XIV

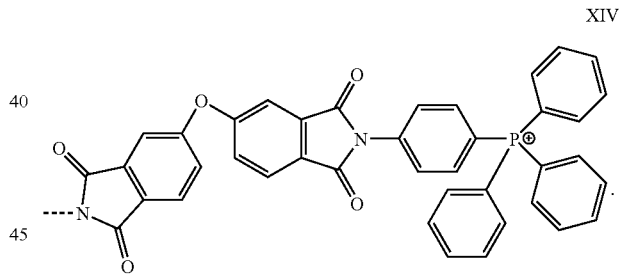

XIV

* * * * *